(12) United States Patent
Modin et al.

(10) Patent No.: US 10,994,502 B2
(45) Date of Patent: May 4, 2021

(54) LAMINATION SYSTEM AND METHOD USING A PLURALITY OF STATIC LAMINATION HEADS

(71) Applicant: The Boeing Company, Chicago, IL (US)

(72) Inventors: Andrew E. Modin, Charleston, SC (US); Darrell D. Jones, Mill Creek, WA (US); Kurtis S. Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/862,010

(22) Filed: Apr. 29, 2020

(65) Prior Publication Data

US 2020/0254701 A1 Aug. 13, 2020

Related U.S. Application Data

(63) Continuation-in-part of application No. 16/178,434, filed on Nov. 1, 2018.

(51) Int. Cl.
*B29C 70/38* (2006.01)
*B29C 70/54* (2006.01)
*B32B 38/00* (2006.01)

(52) U.S. Cl.
CPC .......... *B29C 70/386* (2013.01); *B29C 70/545* (2013.01); *B32B 38/0004* (2013.01); *Y10T 156/10* (2015.01)

(58) Field of Classification Search
CPC ... B29C 70/382; B29C 70/388; B29C 70/545; B29C 70/384; B32B 38/0004; Y10T 156/10
See application file for complete search history.

(56) References Cited

U.S. PATENT DOCUMENTS

| | | |
|---|---|---|
| 4,285,752 A | 8/1981 | Higgins |
| 5,024,862 A | 6/1991 | Frank |
| 7,137,182 B2 | 11/2006 | Nelson |

(Continued)

FOREIGN PATENT DOCUMENTS

| | | |
|---|---|---|
| EP | 3377308 | 9/2018 |
| WO | WO2017084823 | 5/2017 |

OTHER PUBLICATIONS

EPO, European Search Report for Appl. No. EP19203878, dated Mar. 30, 2020.

*Primary Examiner* — Mark A Osele
*Assistant Examiner* — Christopher C Caillouet

(57) ABSTRACT

A manufacturing system includes a plurality of lamination heads statically positioned in end-to-end relation to each other and defining a lamination station, and configured to dispense a layup material along a dispensing direction. The manufacturing system also includes a lamination surface movable underneath the lamination station. The lamination heads are configured to sequentially apply the layup material onto the lamination surface and onto previously applied layup material as the lamination surface passes through the lamination station to thereby form a composite laminate having a stack of composite plies arranged in a desired ply stacking sequence defined by positions of the lamination heads relative to each other within the lamination station.

29 Claims, 31 Drawing Sheets

(56) References Cited

U.S. PATENT DOCUMENTS

| | | |
|---|---|---|
| 7,527,759 B2 | 5/2009 | Lee et al. |
| 7,655,168 B2 | 2/2010 | Jones et al. |
| 7,879,177 B2 | 2/2011 | McCowin et al. |
| 7,922,856 B2 | 4/2011 | Hagman et al. |
| 8,012,291 B2 | 9/2011 | Kisch et al. |
| 8,206,540 B2 | 6/2012 | Evans |
| 8,336,596 B2 | 12/2012 | Nelson et al. |
| 8,465,613 B2 | 6/2013 | Roller et al. |
| 8,640,757 B2 | 2/2014 | McCowin et al. |
| 8,758,538 B2 | 6/2014 | Borgmann et al. |
| 8,808,490 B2 | 8/2014 | Hagman et al. |
| 9,314,974 B2 | 4/2016 | Buttrick |
| 9,399,338 B1 | 7/2016 | Metschan |
| 2004/0026025 A1* | 2/2004 | Sana .................. B29C 70/386 156/256 |
| 2013/0032287 A1 | 2/2013 | Hagman |
| 2019/0224928 A1* | 7/2019 | Danninger ............ B29C 31/085 |

* cited by examiner

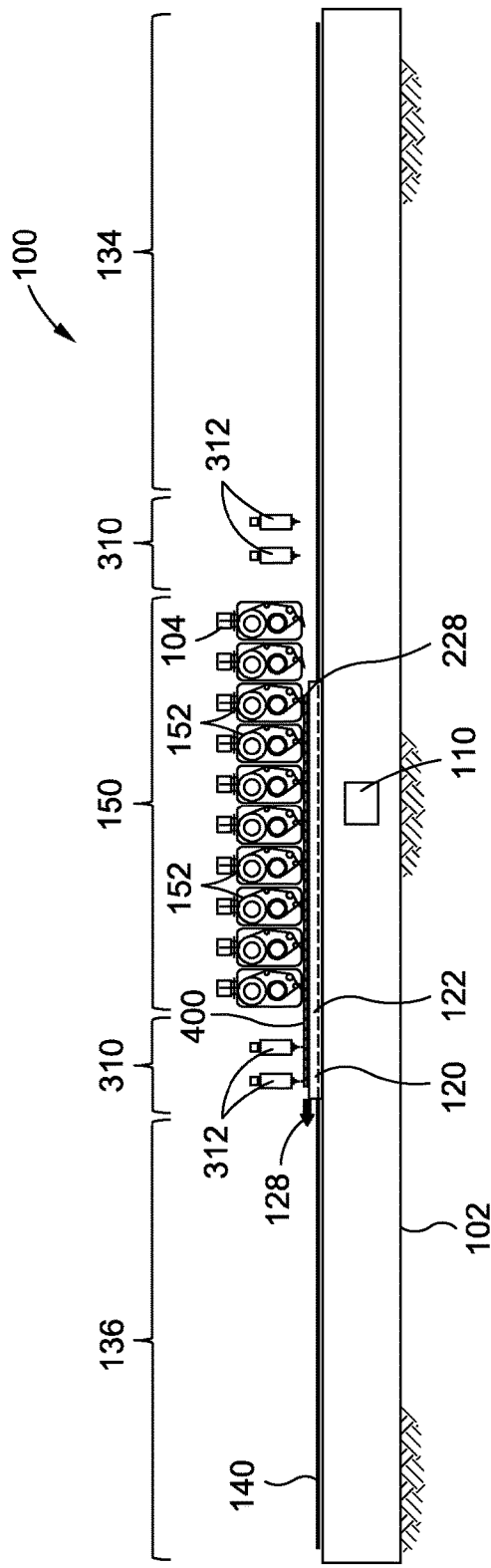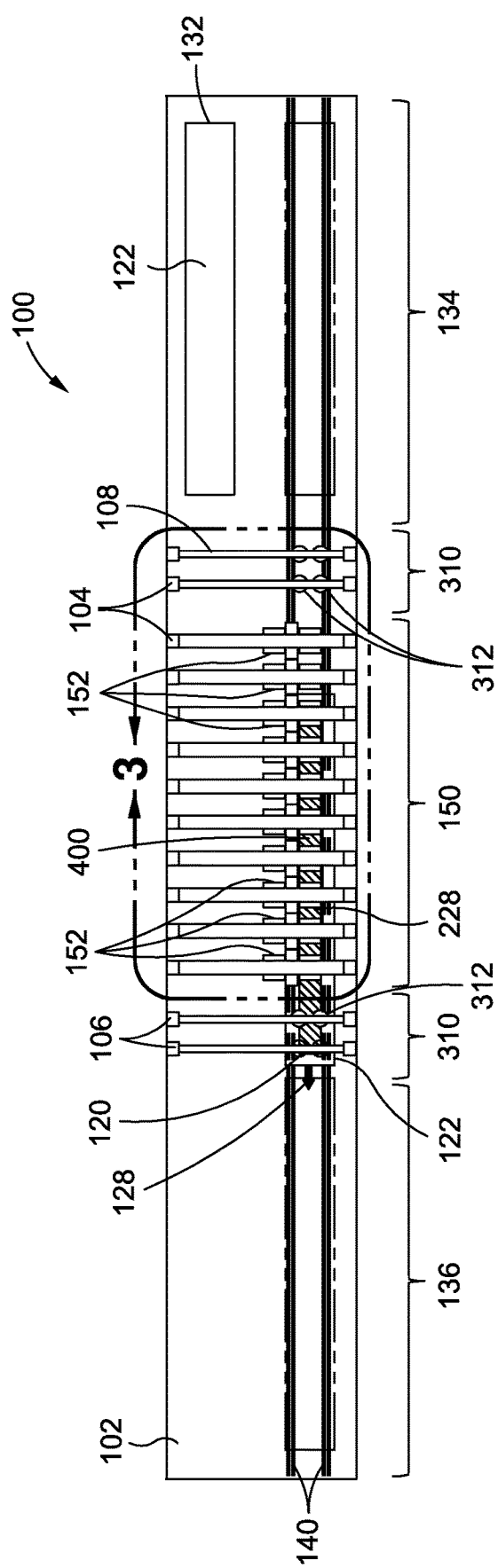

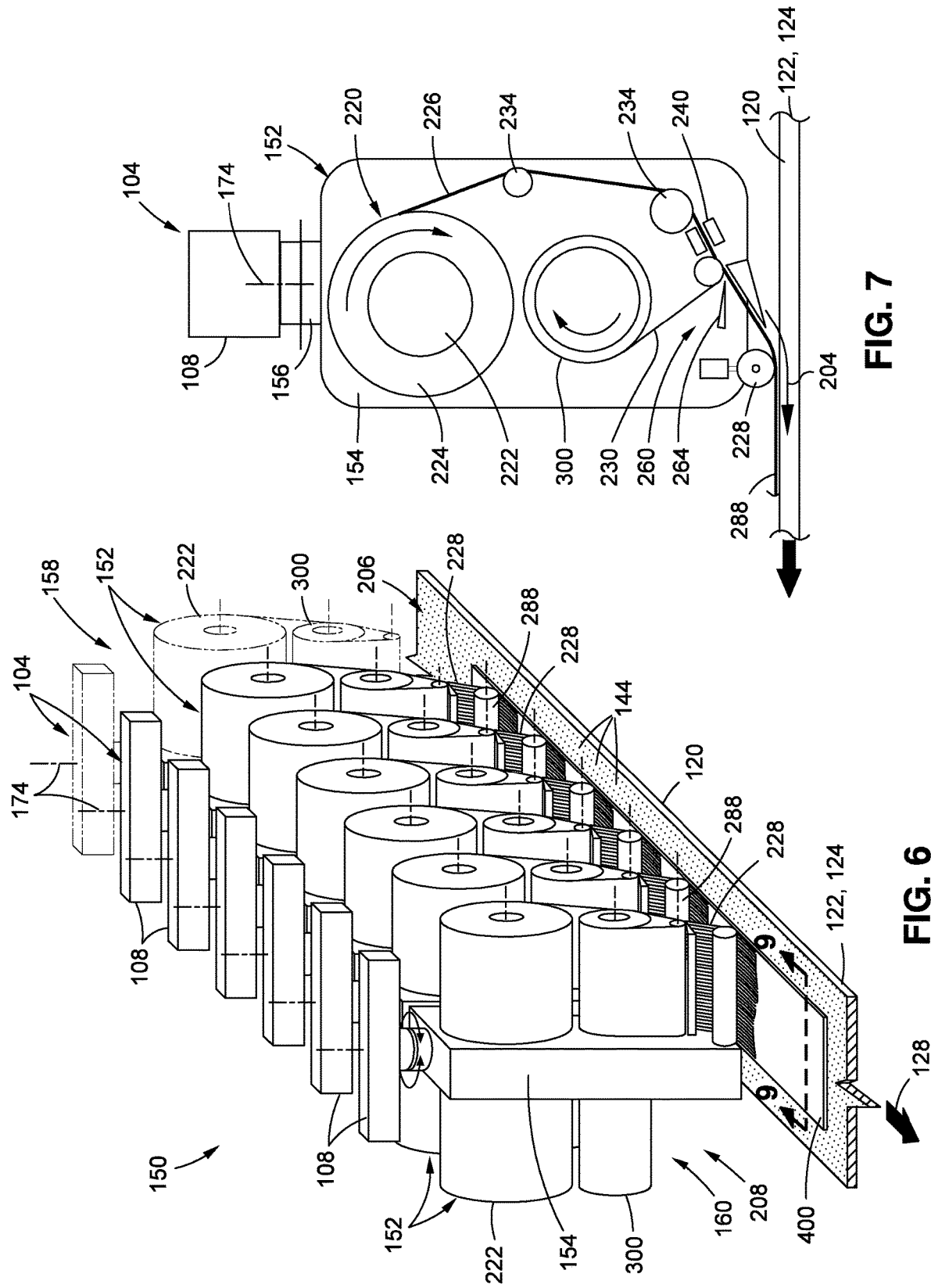

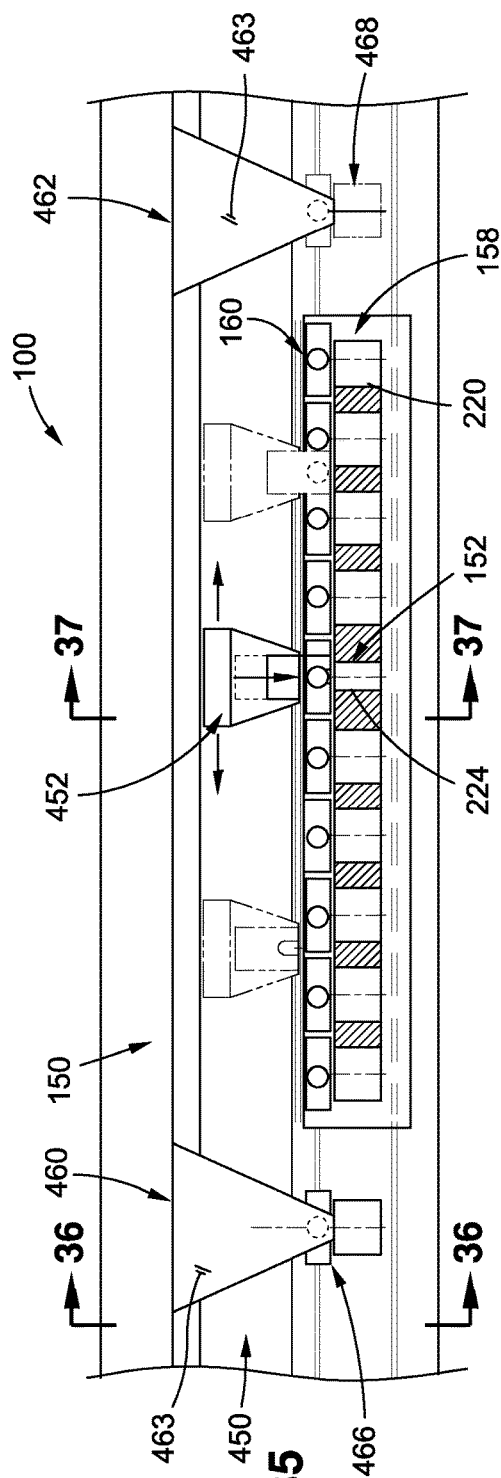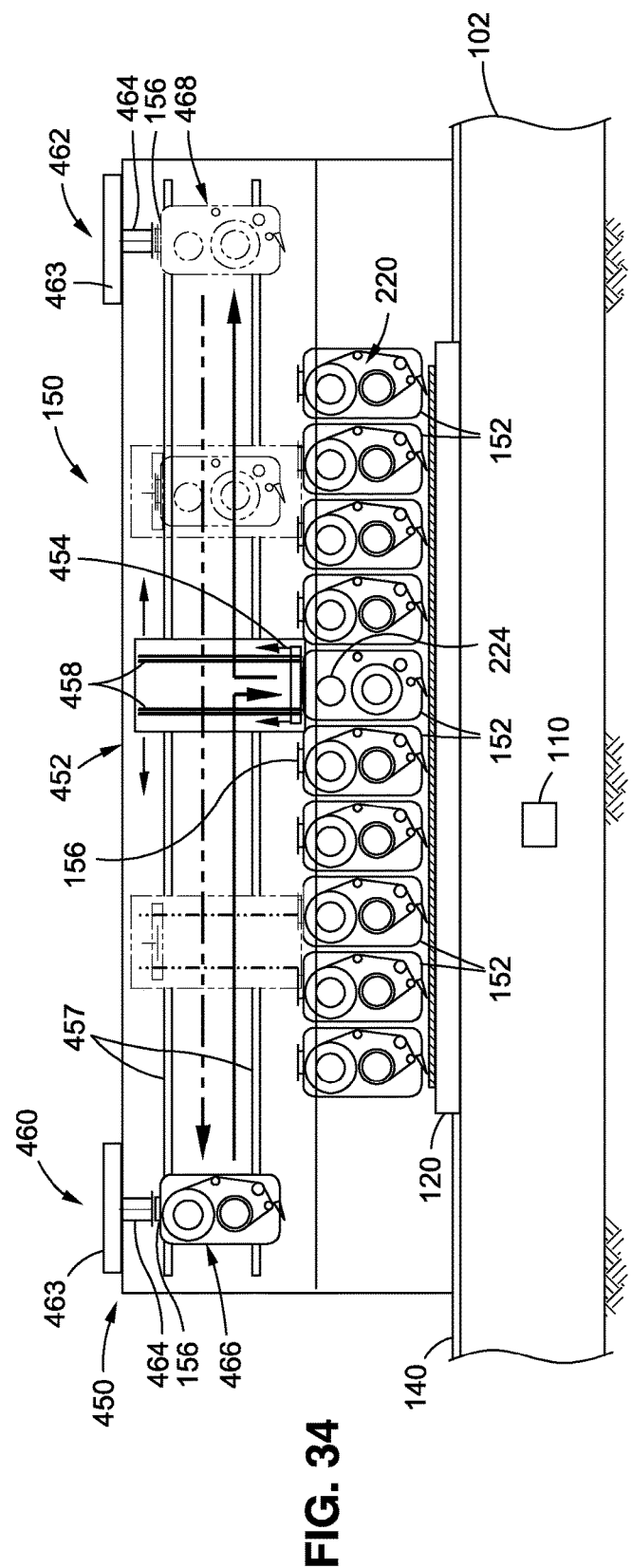

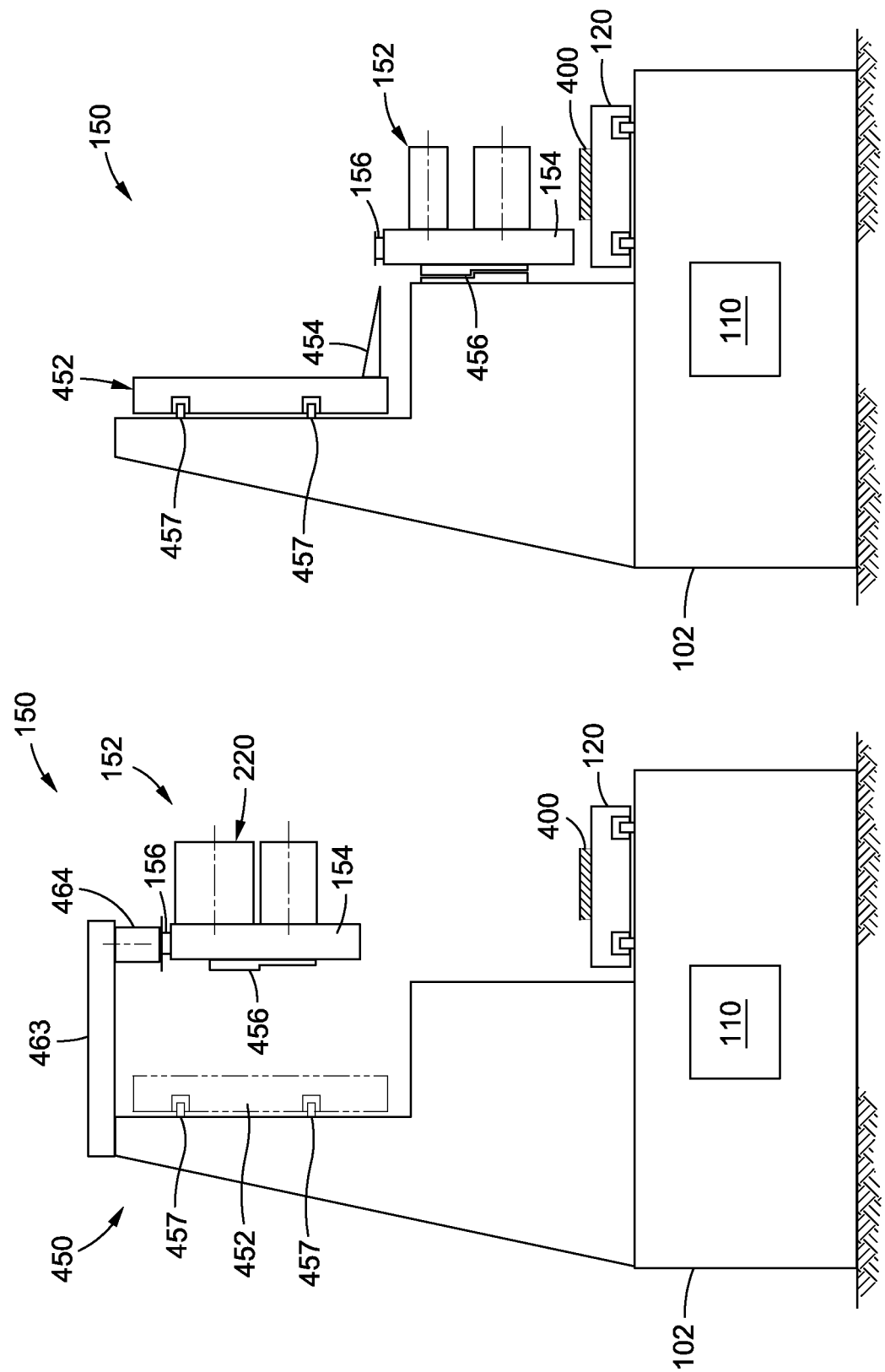

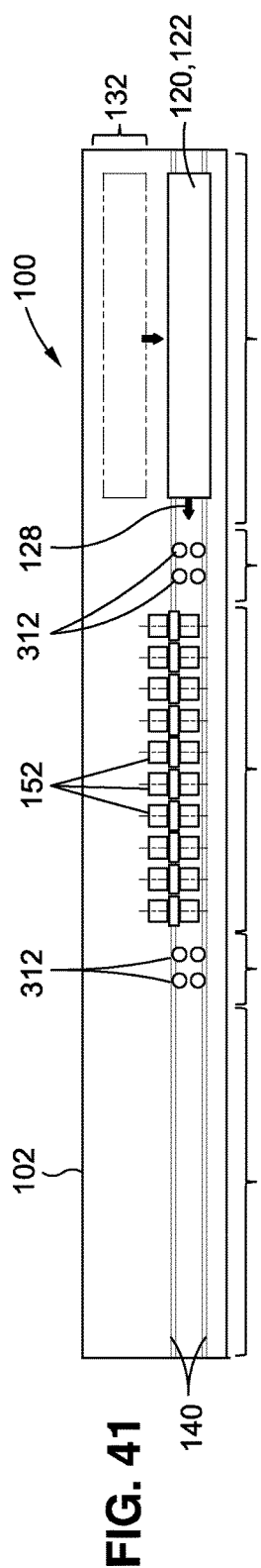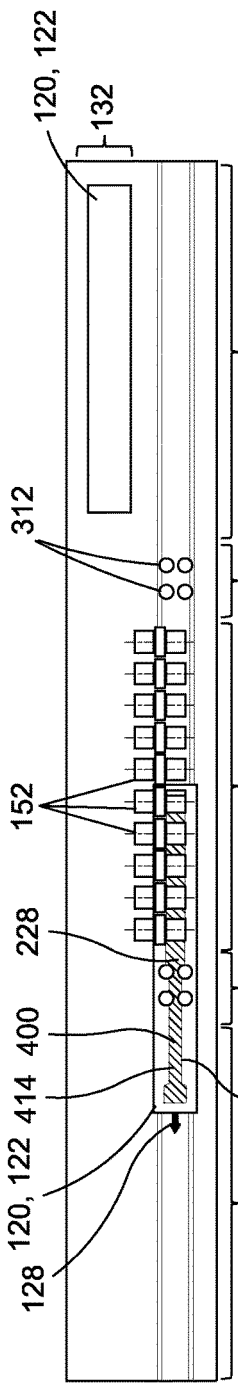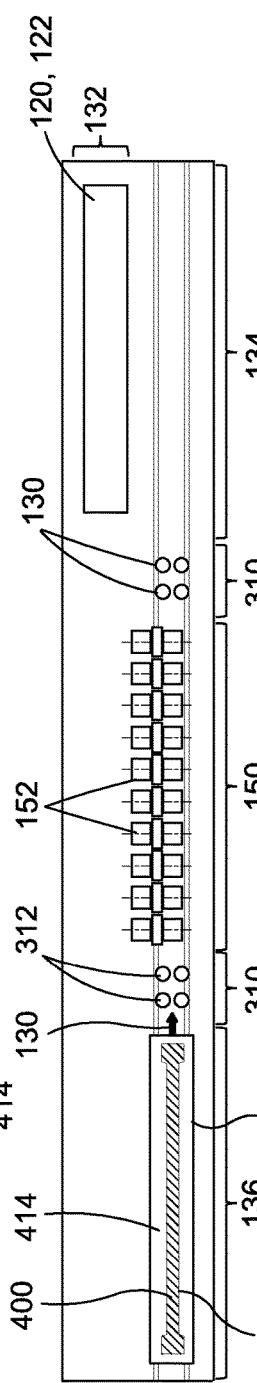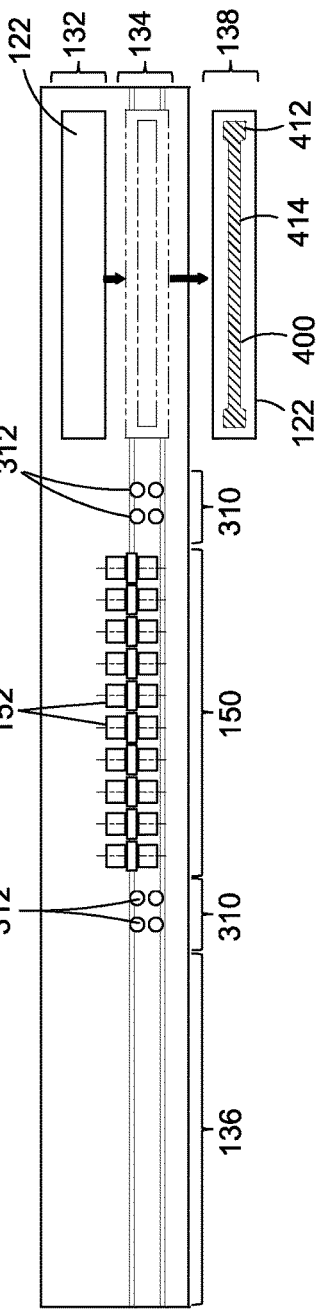

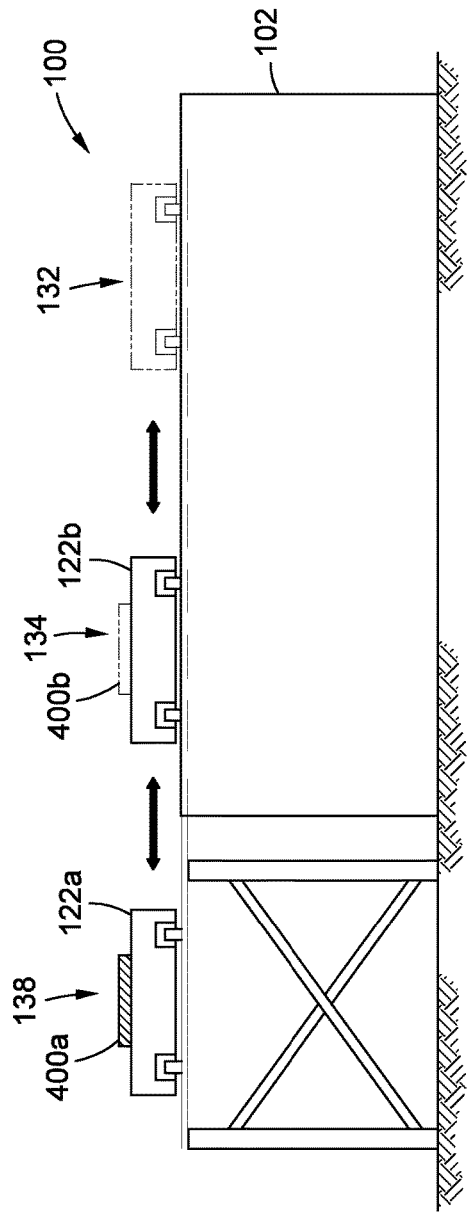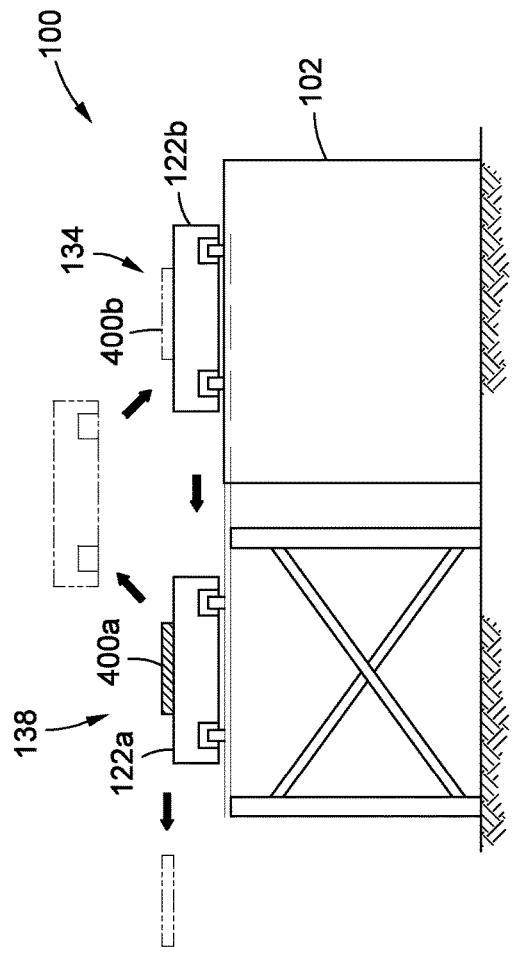

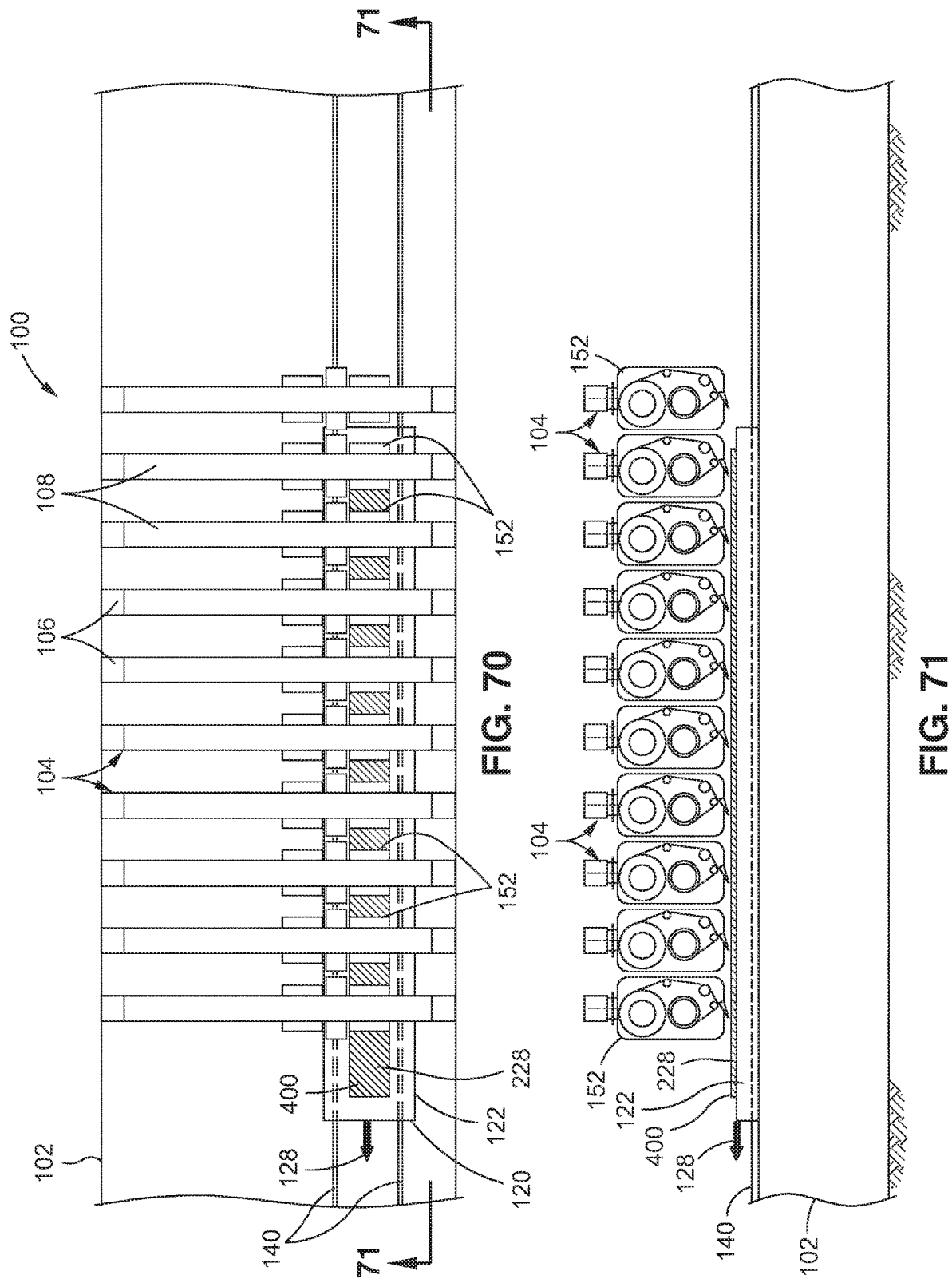

LAMINATION SYSTEM AND METHOD USING A PLURALITY OF STATIC LAMINATION HEADS

CROSS-REFERENCE TO RELATED APPLICATIONS

The present application is a continuation-in-part of and claims priority to pending application Ser. No. 16/178,434, filed Nov. 1, 2018, and entitled SYSTEM AND METHOD FOR CONCURRENTLY LAMINATING AND TRIMMING A COMPOSITE LAMINATE, the entire contents of which is incorporated herein by reference.

FIELD

The present disclosure relates generally to manufacturing systems and, more particularly, to a system and method for laminating a composite laminate.

BACKGROUND

Composite materials are used in a wide variety of applications due to their favorable properties such as high specific strength, high specific stiffness, and high corrosion resistance. The manufacturing of a composite structure typically involves the layup of multiple plies of composite laminate material onto a mandrel to form a composite laminate. The layup material is typically a fibrous material that is pre-impregnated with resin (e.g., prepreg). For example, the layup material may be epoxy-impregnated carbon fiber prepreg.

Current methods of laying up a composite laminate include ply-by-ply lamination in which a single lamination head makes multiple passes over a lamination mandrel. During each pass, the lamination head applies a single ply of layup material. At the end of each pass, the lamination head may return to the start of the most recently applied ply and apply another ply of layup material over the most recently applied ply. The process is repeated until the composite laminate has the desired ply quantity and ply stacking sequence. As may be appreciated, serial application of single plies of layup material limits the rate at which composite laminates can be manufactured.

As can be seen, there exists a need in the art for a system and method for manufacturing a composite laminate that avoids the above-noted limitations associated with ply-by-ply lamination.

SUMMARY

The above-noted needs associated with manufacturing composite laminates are specifically addressed and alleviated by the present disclosure which provides a manufacturing system having a plurality of lamination heads statically positioned in end-to-end relation to each other and defining a lamination station. Each lamination head is configured to dispense a layup material along a dispensing direction. The manufacturing system includes a lamination surface that is movable underneath the lamination station along a direction generally aligned with the dispensing direction between a lamination surface home position and a lamination surface aft position. The lamination heads are configured to sequentially apply the layup material onto the lamination surface and onto previously applied layup material as the lamination surface passes through the lamination station to thereby form a composite laminate having a stack of composite plies arranged in a desired ply stacking sequence defined by positions of the lamination heads relative to each other within the lamination station. The manufacturing system also includes one or more trimming devices located proximate at least one of opposing ends of the lamination station. The trimming devices are configured to trim the composite laminate during movement of the lamination surface from the lamination station to the lamination surface home position, and/or during movement of the lamination surface from the lamination station to the lamination surface aft position.

In a further embodiment, disclosed is a manufacturing system having a series of lamination heads statically positioned in end-to-end relation to each other and defining a lamination station. Each lamination head within the series is configured to dispense a layup material along a dispensing direction. The manufacturing system also includes a lamination belt having an outer surface movable underneath the lamination station along a direction generally aligned with the dispensing direction. The lamination heads are configured to sequentially apply the layup material onto the outer surface of the lamination belt and onto previously applied layup material as the outer surface of the lamination belt moves through the lamination station to thereby form a composite laminate having a stack of composite plies arranged in a desired ply stacking sequence defined by positions of the lamination heads relative to each other within the lamination station. The manufacturing system additionally includes one or more trimming devices located downstream of the lamination station and configured to periodically form transverse cuts in the composite laminate to divide the composite laminate into lengthwise segments.

Also disclosed is a method of manufacturing a composite laminate. The method includes dispensing layup material along a dispensing direction from one or more of a series of lamination heads statically positioned in end-to-end relation to each other and defining a lamination station. The method includes moving a lamination surface underneath the lamination station along a direction generally aligned with the dispensing direction between a lamination surface home position and a lamination surface aft position. In addition, the method includes applying the layup material from one or more of the lamination heads onto the lamination surface and onto previously applied layup material as the lamination surface passes through the lamination station to thereby form a composite laminate having a stack of composite plies arranged in a desired ply stacking sequence. The lamination heads are arranged within the series of lamination heads to sequentially apply layup material according to the ply stacking sequence. The method additionally includes trimming, using one or more trimming devices, the composite laminate during movement of the lamination surface from the lamination station to the lamination surface home position, and/or during movement of the lamination surface from the lamination station to the lamination surface aft position.

In addition, disclosed is a manufacturing system having a plurality of lamination heads statically positioned in end-to-end relation to each other and defining a lamination station. Each lamination head is configured to dispense a layup material along a dispensing direction. The manufacturing system further includes a lamination surface movable underneath the lamination station along a direction generally aligned with the dispensing direction between a lamination surface home position and a lamination surface aft position. The lamination heads are configured to sequentially apply the layup material onto the lamination surface and onto previously applied layup material as the lamination surface passes through the lamination station to thereby form a composite laminate having a stack of composite plies arranged in a desired ply stacking sequence defined by positions of the lamination heads relative to each other within the lamination station.

Also disclosed is a manufacturing system having a series of lamination heads statically positioned in end-to-end relation to each other and defining a lamination station, and wherein each lamination head within the series configured to dispense a layup material along a dispensing direction. The manufacturing system further includes a lamination belt having an outer surface movable underneath the lamination station along a direction generally aligned with the dispensing direction. The lamination heads are configured to sequentially apply the layup material onto the outer surface of the lamination belt and onto previously applied layup material as the outer surface of the lamination belt moves through the lamination station to thereby form a composite laminate having a stack of composite plies arranged in a desired ply stacking sequence defined by positions of the lamination heads relative to each other within the lamination station.

Additionally, disclosed is a method of manufacturing a composite laminate. The method includes dispensing layup material along a dispensing direction from one or more of a series of lamination heads statically positioned in end-to-end relation to each other and defining a lamination station. In addition, the method includes moving a lamination surface underneath the lamination station along a direction generally aligned with the dispensing direction between a lamination surface home position and a lamination surface aft position. The method also includes applying the layup material from one or more of the lamination heads onto the lamination surface and onto previously applied layup material as the lamination surface passes through the lamination station to thereby form a composite laminate having a stack of composite plies arranged in a desired ply stacking sequence. The lamination heads are arranged within the series of lamination heads to sequentially apply layup material according to the ply stacking sequence.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a side view of an example of a manufacturing system having a stationary lamination station comprising a series of lamination heads and having one or more trimming devices for concurrent lamination and trimming of a composite laminate;

FIG. 2 is a top view of the manufacturing system of FIG. 1;

FIG. 6 is a perspective view of an example of a series of lamination heads applying layup material to a lamination surface moving underneath the lamination heads;

FIG. 7 is a side view of an example of a lamination head applying layup material to a lamination surface;

FIG. 34 is a side view of an example of a manufacturing system having a reloading system for automated replacement of a lamination head within the series;

FIG. 35 is a top view of the manufacturing system of FIG. 34;

FIG. 36 is a section view taken along line 36 of FIG. 35 and illustrating an example of a head holder configured to support a replacement lamination head;

FIG. 37 is a section view taken along line 37 of FIG. 35 and illustrating an example of a head transfer mechanism configured to remove and replace any one of the lamination heads with a replacement lamination head;

FIG. 41 is a top view of an example of a manufacturing system showing a lamination mandrel in a lamination surface home position during an initial stage of manufacturing a composite laminate involving lamination of the composite laminate while the lamination mandrel moves through the lamination station along a first direction of travel;

FIG. 42 is a top view of the manufacturing system of FIG. 41 showing the concurrent lamination and trimming of a composite laminate as the lamination mandrel moves along the first direction of travel through the lamination station and through a trimming station toward the lamination surface aft position;

FIG. 43 is a top view of the manufacturing system of 42 showing the lamination mandrel in the lamination surface aft position and showing the composite laminate in a trimmed condition;

FIG. 44 is a top view of the manufacturing system of FIG. 43 showing the lamination mandrel after moving along a second direction of travel back toward the lamination surface home position prior to being translated laterally into a lamination surface off-loading position;

FIG. 49 is an end view of an example of horizontal movement of one or more lamination mandrels between the lamination surface staging position, the lamination surface home position, and the lamination surface off-loading position;

FIG. 50 is an end view of an example of vertical movement of one or more of the lamination mandrels between the lamination surface staging position and the lamination surface home position;

FIG. 70 is a magnified view of the encircled region identified by reference numeral 70 of FIG. 68 and illustrating a lamination surface configured as at least one lamination mandrel movable underneath the lamination station and receiving layup material applied by the series of lamination heads;

FIG. 71 is a side view of the portion of the manufacturing system of FIG. 70 illustrating the lamination mandrel passing underneath the plurality of lamination heads;

DETAILED DESCRIPTION

Figure 3:
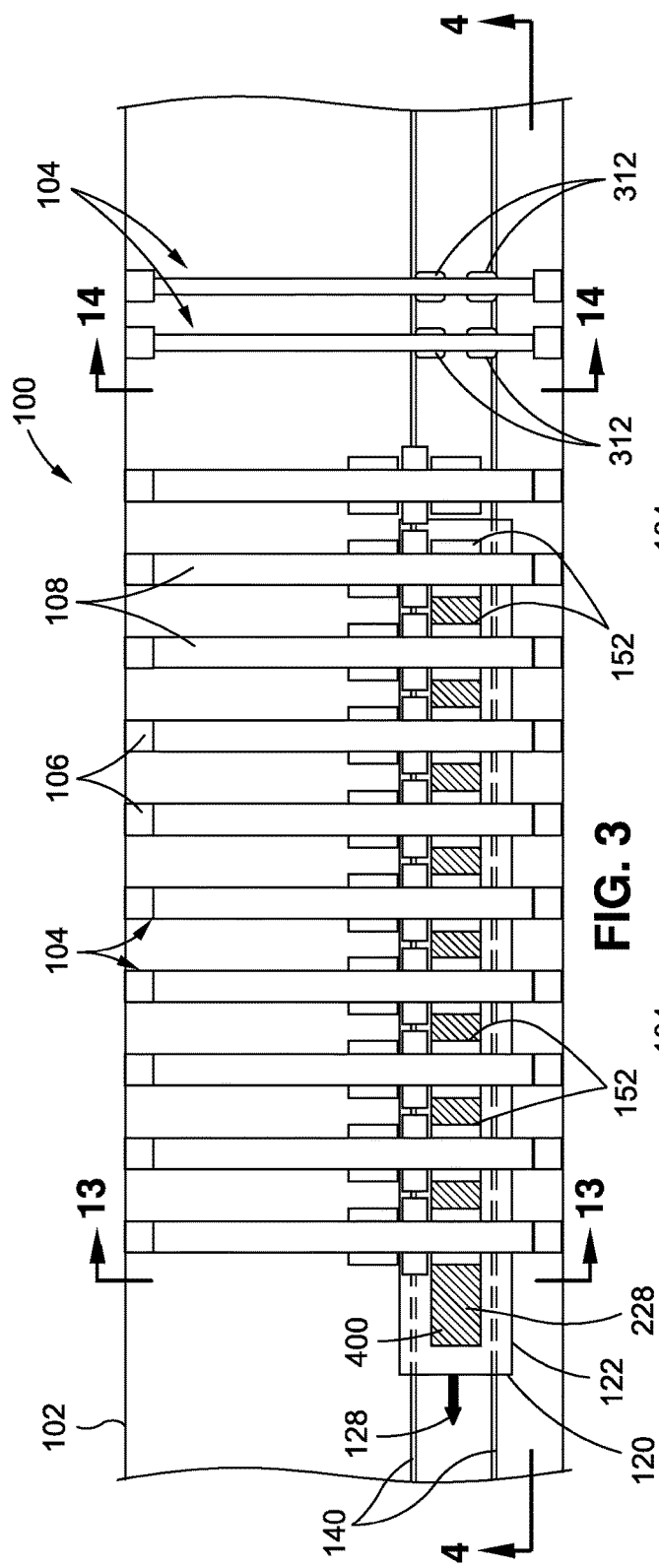
FIG. 3 is a magnified view of the encircled region identified by reference numeral 3 of FIG. 1 and illustrating each of the lamination heads supported by a support frame and further illustrating a lamination surface configured as at least one lamination mandrel movable underneath the lamination station and receiving layup material applied by one or more of the series of lamination heads.
Figure 4:
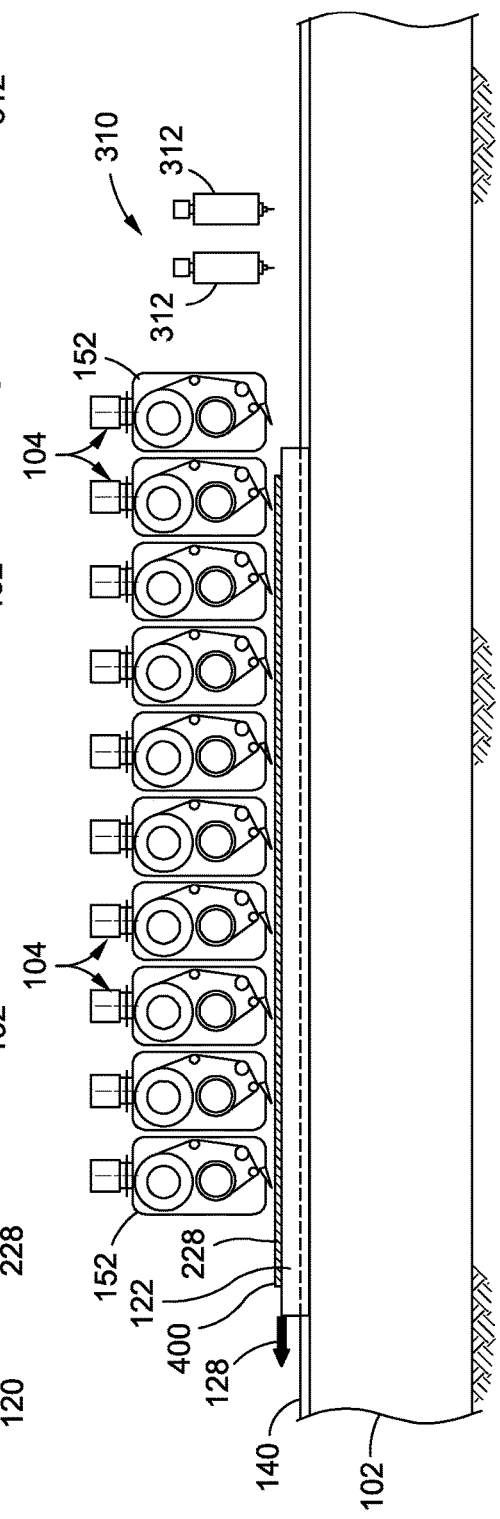
FIG. 4 is a side view of the portion of the manufacturing system of FIG. 3 illustrating the lamination mandrel passing underneath the series of lamination heads.

Referring now to the drawings which illustrate preferred and various embodiments of the disclosure, shown in FIG. 1 is a side view of an example of the presently-disclosed manufacturing system 100 for manufacturing an uncured composite laminate 400. FIG. 2 is a top view of the manufacturing system 100. The manufacturing system 100 has a stationary lamination station 150 and a movable lamination surface 120. The lamination station 150 has a plurality of lamination heads 152 each configured to dispense layup material 228. The plurality of lamination heads 152 are configured to sequentially apply the layup material 228 onto the lamination surface 120 and onto previously applied layup material 228 during at least one pass of the lamination surface 120 through the lamination station 150. Although the figures show the lamination heads 152 as being identically configured, a lamination station 150 may include one or more different types of lamination heads 152.

The lamination heads 152 are arranged in end-to-end relation (FIG. 6) to each other to form at least one series of lamination heads 152. The lamination heads 152 collectively dispense multiple plies 402 (FIG. 9) of layup material 228 (FIG. 9) as the lamination surface 120 passes underneath the lamination heads 152 for bulk lamination of a composite laminate 400 according to a desired ply stacking sequence 410 (e.g., FIGS. 8-9). In this regard, each one of the lamination heads 152 in a series is assigned a layup material 228 having a material configuration 406 (FIG. 8) that corresponds to the ply stacking sequence 410 of the composite laminate 400. The ply stacking sequence 410 is defined by the relative positions of the lamination heads 152 within the lamination station 150, as described in greater detail below. In addition, the manufacturing system 100 has one or more trimming devices 312 located within one or more trimming stations 310 for trimming the composite laminate 400. The trimming of the composite laminate 400 may be performed concurrently with the lamination of the composite laminate 400, as described below.

Advantageously, bulk lamination of a composite laminate 400 onto a moving lamination surface 120 by a plurality of end-to-end lamination heads 152 in the presently disclosed manufacturing system 100 enables higher rates of manufacturing than is achievable with conventional methods of ply-by-ply lamination using a lamination head 152 making multiple passes over a lamination surface. In addition, the trimming of the composite laminate 400 concurrent with the lamination of the composite laminate 400 further increases manufacturing rates beyond that which is achievable using the conventional practice of trimming a composite laminate 400 as a separate step that is performed at a different location.

Referring to FIGS. 1-4, the manufacturing system 100 may include a base member 102 supported on a surface such as a factory floor. The base member 102 may include a lamination surface home position 134 on one end of the lamination station 150, and a lamination surface aft position 136 on an opposite end of the lamination station 150. The lamination surface 120 may be supported on the base member 102. For example, the lamination surface 120 may be an outer surface of at least one lamination mandrel 122 (e.g., FIGS. 1-4) that is movable or slidable along longitudinal rails 140 extending along the length of the base member 102. The lamination mandrel 122 may be movable via a linear translation mechanism (not shown) such as a screw drive coupled to a drive motor. Alternatively, one or more lamination mandrel 122 may be manually moved between the lamination surface home position 134, the lamination station 150, and the lamination surface aft position 136. In a still further embodiment, one or more lamination mandrels 122 may be moved between the lamination surface home position 134, the lamination station 150, and the lamination surface aft position 136 using an autonomous vehicle (not shown) that is not on rails, or by using one or more robotic devices (not shown).

Although FIGS. 1-4 show a single lamination mandrel 122 being moved through the lamination station 150, a manufacturing system 100 may be provided in an embodiment in which a series of end-to-end lamination mandrels 122 are continuously moved through the lamination station 150 to enable continuous dispensing of layup material 228 by the lamination heads 152 for laying up a composite laminate 400 separately on each of the series of lamination mandrels 122. The series of lamination mandrels 122 may be arranged in spaced (e.g., up to several inches) end-to-end relation to each other, or the series of lamination mandrels 122 may be arranged in butted end-to-end relation to each other. Alternatively, the manufacturing system 100 may be provided in an embodiment in which a continuous composite laminate 400 is laid up on a series of butted end-to-end lamination mandrels 122, and which composite laminate 400 may be subsequently transversely cut using one or more trimming devices 312 to divide the continuous composite laminate 400 into a series of end-to-end lengthwise segments 401, as shown in FIGS. 59-62 and described below.

The manufacturing system 100 may include a means for aligning and/or indexing the lamination surface 120 to the lamination station 150. For example, in addition to the above-described longitudinal rails 140 which may maintain lateral alignment of one or more lamination mandrels 122 relative to the lamination heads 152 in the lamination station 150, the manufacturing system 100 may include a means for indexing the longitudinal location of the lamination mandrel 122 relative to the lamination heads 152 each time the lamination mandrel 122 enters and passes through the lamination station 150. Such a means for indexing the longitudinal location of the lamination mandrel 122 may allow the lamination heads 152 to independently start and stop the dispensing of layup material 228 at predetermined locations on the lamination mandrel 122. For the example of the manufacturing system 100 having a lamination belt 124 (FIG. 5), a similar means for longitudinal indexing of the lamination belt 124 relative to the lamination heads 152 may allow the lamination heads 152 to independently start and stop the dispensing of layup material 228 at predetermined locations on the lamination belt 124. Such means for indexing may include an optical system (e.g., a laser device—not shown) mounted at the lamination station 150 and configured to detect and register one or more targets (not shown) that may be included on a lamination surface 120 (e.g., one or more lamination mandrels 122, a lamination belt 124) moving through the lamination station 150. As may be appreciated, the manufacturing system 100 may include any one or more of a variety of system configurations for indexing a lamination surface 120 to a lamination station 150.

Figure 5:
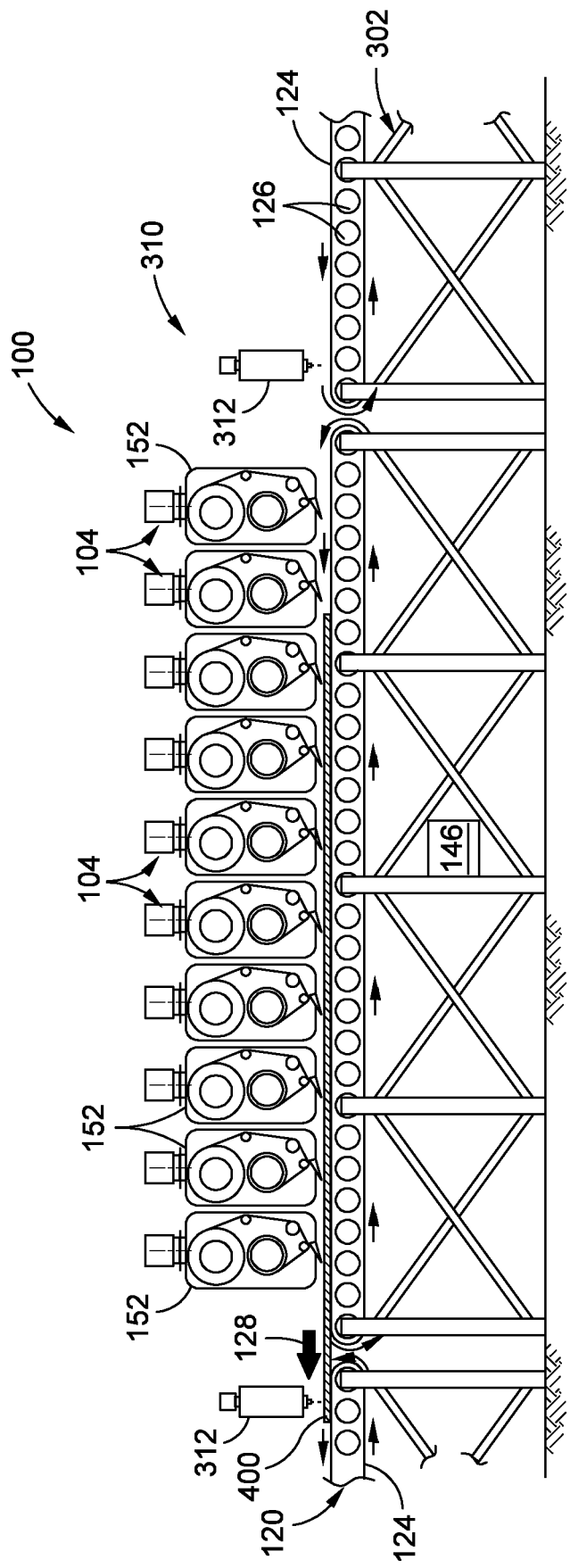
FIG. 5 is a side view of an example of a manufacturing system in which the lamination surface is configured as one or more lamination belts.

Referring to FIG. 5, shown is a side view of an example of a lamination station 150 in which the lamination surface 120 is the outer surface (e.g., upper surface) of one or more continuous loop lamination belts 124. In the example shown, a plurality of lamination belts 124 are arranged in end-to-end relation to each other and supported by one or more base members 102. Each lamination belt 124 may be made up of a bendable material such as rubber, plastic, hinged metal mesh, or a series of short rigid plates connected in end-to-end relation. However, the lamination belt 124 may be provided in any one a variety of other configurations. Each lamination belt 124 may be supported by a series of internal belt rollers 126 arranged in parallel relation to each other and configured to support the lamination belt 124 in a manner preventing excessive deflection of at least the outer surface of the lamination belt 124 upon which composite laminate 400 is supported. One or more of the belt rollers 126 may be rotatably driven by a drive motor (not shown) for moving the lamination belt 124.

Regardless of the configuration of the lamination surface 120, the lamination surface 120 is movable along a first direction of travel 128 from the lamination surface home position 134 (FIGS. 1-2), through the lamination station 150, and to the lamination surface aft position 136. The lamination surface 120 is also movable along a second direction of travel 130 (not shown) from the lamination surface aft position 136 (FIGS. 1-2), through the lamination station 150, and to the lamination surface home position 134. The movement of the lamination surface 120 is generally aligned with a dispensing direction 204 (FIG. 6) of the lamination heads 152. In FIG. 5, the manufacturing system 100 is shown as having at least one trimming device 312 positioned at each of opposing ends of the lamination station 150 to allow for trimming of the composite laminate 400 moving with the lamination belt 124 along the first direction of travel 128 shown in FIG. 5, and/or allowing the trimming of the composite laminate 400 moving along a second direction of travel 130 upon reversing the direction of movement of the lamination belt 124.

The manufacturing system 100 may include a lamination surface staging position 132 (FIGS. 1-2) and a lamination surface off-loading position 138 (e.g., FIGS. 44, 48, 54) located adjacent the lamination surface home position 134. As described in greater detail below, the lamination surface staging position 132 may provide a location for holding a lamination surface 120 (e.g., a second lamination mandrel) while another lamination surface 120 (e.g., a first lamination mandrel) occupies the lamination surface home position 134. The lamination surface off-loading position 138 may provide a location for holding a lamination surface 120 (e.g., one or more lamination mandrels) supporting a completed (e.g., laid up and trimmed) composite laminate 400 while the composite laminate 400 is off-loaded to another location for further processing such as de-bulking, forming, and/or curing.

Referring briefly to FIGS. 3-6 and 14, the lamination heads 152 may be supported on a support frame 104. In the example shown, each one of the lamination heads 152 is supported on a dedicated support frame 104. Each support frame 104 may include a generally horizontally-oriented crossbeam 108 having opposing ends that are respectively coupled to a pair of generally vertically-oriented posts 106 extending upwardly from the base member 102. Each one of the crossbeams 108 may include a linear actuation mechanism (e.g., a screw drive rotatably driven by a servo motor—not shown) configured to horizontally translate the lamination head 152 along the crossbeam 108 to allow for laterally moving the lamination head 152 out of alignment from the remaining lamination heads 152 to allow for servicing of the laterally-moved lamination head 152, as described in greater detail below. The posts 106 of each one of the support frames 104 may include a linear actuation mechanism (not shown). The linear actuation mechanisms of the posts 106 of each support frame 104 may be operated in a coordinated manner to vertically translate the crossbeam 108 as a means for vertically positioning the lamination head 152 relative to the lamination surface 120, as described below.

In addition, each support frame 104 may include a rotary actuation mechanism (e.g., a servo motor—not shown) for rotating the lamination head 152 about a vertical axis 174 (FIG. 14) in order to rotate a first side 158 (e.g., FIGS. 6 and 14) of the lamination head 152 out of a material application position 206 (e.g., FIGS. 6 and 14) and into a material reload position 208 (FIG. 6), and/or to rotate a second side 160 (e.g., FIGS. 6 and 14) of the lamination head 152 into the material application position 206. Rotating the first side 158 into the material reload position 208 may allow access to the first side 158 for servicing of the head components 220 on the first side 158 such as for replacing a depleted material roll 224 (FIG. 16) or performing maintenance on the head components 220. Rotating the second side 160 into the material application position 206 allows the lamination head 152 to dispense layup material 228 before or after servicing of the first side 158.

Although the lamination heads 152 are described as being supported by a plurality of support frames 104 as shown in FIGS. 1-6, the lamination heads 152 may be supported by any one of a variety of alternative structural arrangements including, but not limited to, cantilevered beams (not shown), robotic devices (not shown), or any one a variety of other structural arrangements and/or mechanisms for holding the lamination heads 152 in end-to-end relation to each other while the lamination heads 152 apply layup material 228 onto a lamination surface 120 moving underneath the lamination heads 152.

Referring to FIGS. 3-6, the series of lamination heads 152 may be in a linear arrangement for forming a composite laminate 400 having a linear shape. However, in an embodiment not shown, the manufacturing system 100 may include a series of lamination heads 152 in a non-linear arrangement such as for forming a composite laminate 400 having a non-linear shape such as an arc shape. The lamination surface 120 may be configured to move along a path that is complementary to the arrangement (e.g., linear or non-linear) of the lamination heads 152. In a further example not shown, the lamination heads 152 may be arranged in a two-dimensional array of lamination heads 152 defining a length and a width of the lamination station 150. In this regard, the lamination heads 152 may be arranged as two or more series of lamination heads 152 arranged in side-by-side relation to each other. For example, the lamination heads 152 may be arranged as a first series of lamination heads (not shown) and a second series of lamination heads (not shown) located in side-by-side relation to the first series of lamination heads.

Referring to FIGS. 5-6, in any one of the embodiments of the manufacturing system 100 disclosed herein, a lamination surface 120 (e.g., lamination mandrel 122, lamination belt 124) may include a plurality of apertures 144 (FIG. 6) that may be fluidly coupled (e.g., via internal fluid conduits—not shown) to a vacuum pressure source 146 (FIG. 5) that may be included with the manufacturing system 100. The vacuum pressure source 146 may generate vacuum pressure via the apertures 144 at the outer surface of the lamination surface 120 as a means to non-movably secure a composite laminate 400 to the outer surface at least during the application of layup material 228 onto the lamination surface 120 or onto layup material 228 previously applied to the lamination surface 120. In some examples, a processing layer (not shown) such as a layer of peel ply (e.g., fluorinated ethylene propylene) may be applied onto a lamination surface 120 prior to the dispensing of layup material 228 onto the lamination surface 120. The layer of peel ply may prevent contamination of the outermost surfaces of the composite laminate 400 and may thereby preserve the bondability of the composite laminate 400 after layup is complete and the peel ply is removed. The vacuum pressure may secure the layer of peel ply to the lamination surface 120. The tackiness of the layup material 228 may adhere to the peel ply to an extent that prevents the layup material 228 from shifting (e.g., laterally) relative to the lamination surface 120 during the layup process.

In FIGS. 1-6, the lamination heads 152 are shown uniformly spaced apart from each other. However, in an embodiment not shown, the lamination heads 152 may be non-uniformly spaced apart from each other. Although the lamination heads 152 are shown in FIGS. 1-6 as being positioned in close proximity to each other, in an alternative embodiment, the lamination heads 152 may be arranged such that there are gaps (e.g., uniform gaps and/or non-uniform gaps) between the lamination heads 152 that allow each lamination head 152 to pivot about a vertical axis 174 without contacting adjacent lamination heads 152 and without moving (e.g., horizontally translating or vertically translating) the lamination head 152 out of alignment from the remaining lamination heads 152. As described below, a lamination head 152 may be pivoted about its vertical axis 174 in order to rotate the first side 158 of the lamination head 152 out of alignment from the lamination heads 152 and move the first side 158 into a material reload position 208 for servicing of the head components 220 on the first side 158.

Referring briefly again to FIGS. 1-4, as mentioned above, the manufacturing system 100 includes one or more trimming devices 312 for trimming the composite laminate 400. For example, one or more trimming devices 312 may be located proximate at least one of opposing ends of the lamination station 150. In the example of FIGS. 1-2, the manufacturing system 100 includes a trimming station 310 between the lamination surface home position 134 and the lamination station 150, and/or a trimming station 310 between the lamination station 150 and the lamination surface aft position 136. In the example shown, each trimming station 310 includes four (4) trimming devices 312 for trimming the composite laminate 400. However, a trimming station 310 may include any number of trimming devices 312 including a single trimming device 312. In an embodiment, the trimming devices 312 may be configured to trim at least one of opposing side edges 414 of the composite laminate 400 during movement of the lamination surface 120 from the lamination station 150 to the lamination surface aft position 136 (e.g., see FIG. 42) and/or during movement of the lamination surface 120 from the lamination station 150 to the lamination surface home position 134 (e.g., see FIG. 47), as described in greater detail below. The trimming devices 312 may be configured to trim the side edges of the composite laminate 400 at any location along the length of the composite laminate 400. For example, the trimming devices 312 may be configured to trim the composite laminate 400 to form tab outs 412 (e.g., FIG. 44) at one or both of opposing ends of the composite laminate 400. However, one or more of the trimming devices 312 in a lamination station 150 may be configured to trim portions of the composite laminate 400 other than the side edges 414. For example, one or more of the trimming devices 312 may be configured to trim one or both of the opposing ends of a composite laminate 400 or form geometric features (e.g., holes) within any location of the composite laminate 400 between the opposing side edges 414. The trimming devices 312 may be controlled by the controller 110 to trim the composite laminate 400 in coordination with the movement (e.g., speed and location) of the lamination surface 120.

Referring to FIGS. 6-7, each lamination head 152 includes at least one material supply drum 222 supporting a material roll 224. In the example shown, the lamination heads 152 are configured to dispense layup material 228 backed by a backing layer 230. The backing layer 230 may be formed of a material that prevents adjacent wraps of layup material 228 from sticking to each other on the material roll 224. For example, the backing layer 230 may be a silicone-coated paper or the backing layer 230 may be a thin plastic film such as polyethylene film. For lamination heads 152 configured to dispense layup material 228 having a backing layer 230, the head components 220 may include the material supply drum 222, a material dispensing mechanism 260, and a backing layer collection drum 300. A lamination head 152 142 may additionally include one or more redirect rollers 234 for orienting or guiding the layup material 228 (e.g., optionally back by a backing layer 230) through the head components 220 and/or for maintaining tension in the layup material 228 and/or backing layer 230 during the dispensing of layup material 228 from the lamination head 152.

The layup material 228 may be provided as a continuous strip of fiber-reinforced polymer matrix material such as pre-impregnated tape. The layup material 228 may be provided in any one of a variety of thicknesses and widths. For example, the layup material 228 may be provided as prepreg tape in thicknesses of 0.007 inch or more and in widths of 9-12 inches although the layup material 228 may be provided in thicknesses greater than 0.007 inch and/or in widths narrower than 9 inches or wider than 12 inches. A lamination station 150 may include one or more lamination heads 152 supporting material rolls 224 formed of slit tape which may be narrower than the prepreg tape supported on other lamination heads 152 in the lamination station 150. The fibers in prepreg tape may be unidirectional or the fibers may be arranged as a woven fabric. The polymer matrix material of the prepreg tape may be a thermosetting resin or a thermoplastic resin. The fibers may be carbon fibers or the fibers may be formed of alternative materials such as glass, boron, aramid, ceramic or other non-metallic materials or metallic materials. Prepreg tape may also be provided with carbon fibers and metallic fibers or mesh to provide integral lighting strike protection for the composite laminate 400.

In some examples, the material supply drum 222 may be configured to support a material roll 224 of non-composite material. For example, the material roll 224 of one or more of the lamination heads 152 may be formed of a layup material 228 such as metallic foil or metallic mesh and which may be dispensed by a lamination head 152 to form one of the plies 402 of a composite laminate 400. In still further examples, the material roll 224 of one or more of the lamination heads 152 may include layup material 228 provided as processing layers for the composite laminate 400. Such processing layers may include a release film, a tackifier film, a breather layer, a bleeder layer, peel ply, or any one a variety of other layers, films, or adhesives that may be laid up prior to or during the laying up of the composite laminate 400 to facilitate layup, debulking, forming, and/or curing of the composite laminate 400 during or after the laying up and trimming of the composite laminate 400. In one example, the material roll 224 of one or more of the lamination heads 152 may be formed of material designed to enhance impact toughness or reduce moisture ingression or improve other properties of the composite laminate. For lamination heads 152 loaded with layup material 228 for which there may not be a backing layer 230 (e.g., thermoplastics, metal foils, processing layers such as non-tacky films), the above-mentioned backing layer collection drum 300 and associated backing layer separation hardware (e.g., backing layer separation device 264) may be omitted from such lamination head 152, or such backing layer collection drum 300 and associated backing layer separation hardware may be non-used or inactive during the dispensing of such materials.

Referring still to FIGS. 6-7, for examples where the material roll 224 is comprised of a backed material 226 made up of layup material 228 backed by a backing layer 230, the material dispensing mechanism 260 is configured to receive the backed material 226 from the material supply drum 222, separate the layup material 228 from the backing layer 230, and dispense the layup material 228 along a dispensing direction 204 onto a lamination surface 120. The material dispensing mechanism 260 may include a backing layer separation device 264 for separating the layup material 228 from the backing layer 230, a cutter assembly 240 for cutting the layup material 228 while leaving the backing layer 230 intact, and one or more compaction devices 288 such as a compaction roller and/or a compaction shoe for compacting the layup material 228 onto the lamination surface 120 or onto previously applied layup material 228 as the layup material 228 is dispensed from the lamination head 152.

The backing layer collection drum 300 is configured to take up the backing layer 230 after separation from the layup material 228. In the example of FIGS. 6-7, each lamination head 152 is configured to dispense layup material 228 onto a lamination surface 120 moving along a single direction of travel such as along either a first direction of travel 128 or along a second direction of travel 130 opposite the first direction of travel 128. However, as mentioned below, one or more of the lamination heads 152 may have bi-directional layup capability in which the lamination head 152 is capable of dispensing layup material 228 onto a lamination surface 120 moving along both the first direction of travel 128 and along the second direction of travel 130.

In the present disclosure, the operation of the manufacturing system 100 including the movement of the lamination surface 120, the operation of the head components 220 of each lamination head 152, and the movement (e.g., lateral translation, vertical translation, and/or rotation about a vertical axis 174) of each lamination head 152 within the lamination station 150 may be controlled by a controller 110 (FIG. 1) executing computable readable program instructions (e.g., a numerical-control program) that may be pre-programmed for manufacturing a composite laminate 400.

Each lamination head 152 may include a cutter assembly 240 controlled by the controller 110 and configured to cut the layup material 228 as the lamination head 152 approaches each designated start location (not shown) of a ply 402 of layup material 228 applied by the lamination head 152, and as the lamination head 152 approaches each designated end location (not shown) of the ply 402. The controller 110 may control the lamination heads 152 and the corresponding cutter assemblies 240 in a manner to start applying layup material 228 either at the same starting location on the lamination surface 120 or at different starting locations on the lamination surface 120. Alternatively or additionally, the controller 110 may control the lamination heads 152 and the corresponding cutter assemblies 240 in a manner to stop applying layup material 228 either at the same stopping location on the lamination surface 120 or at different stopping locations on the lamination surface 120 as described below. As also described below, the controller 110 may also control the lamination heads 152 to independently start, stop and/or restart the application of layup material 228 from any one or more of the lamination heads 152 at any location along the lamination surface 120 to form ply additions, ply drops, and/or partial plies within a composite laminate 400.

Figure 8:
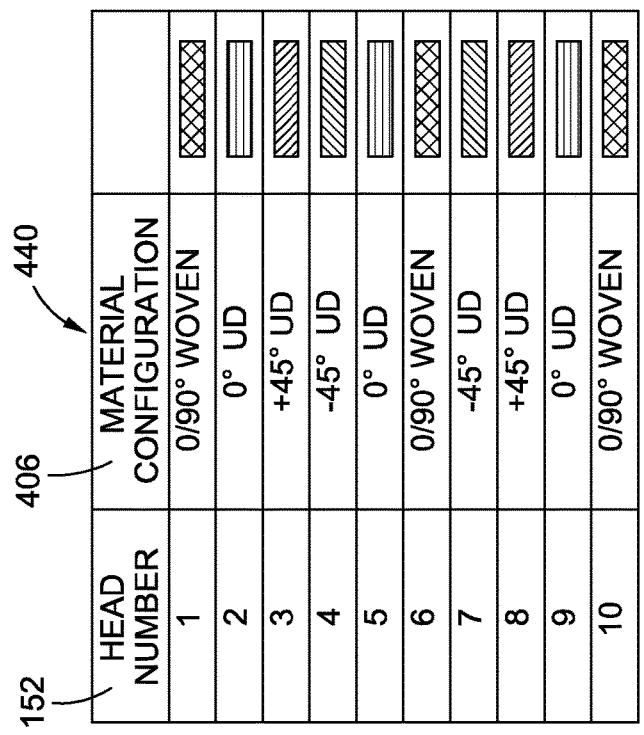
FIG. 8 is a table listing the material configuration of the layup material dispensed by each one of 10 lamination heads in a lamination station.
Figure 9:
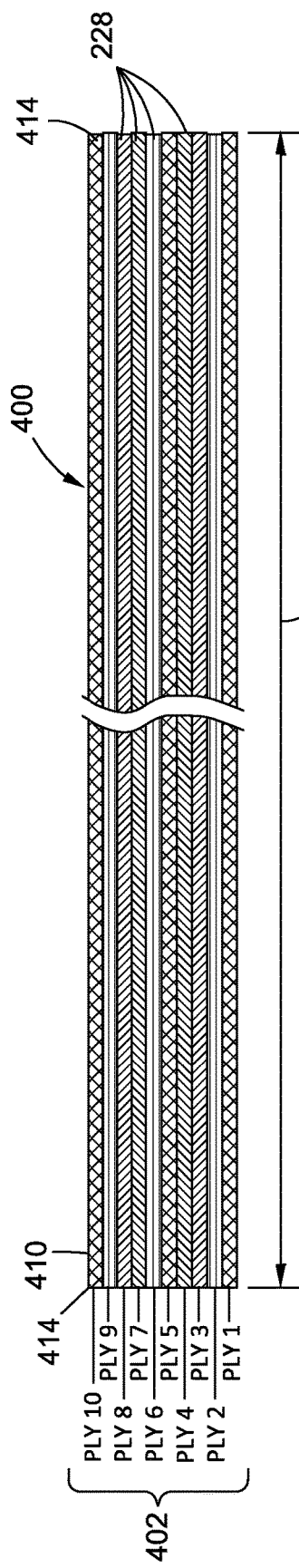
FIG. 9 is a sectional view of a composite laminate taken along line 9 of FIG. 6 and having a ply stacking sequence resulting from the sequential application of layup material dispensed by the lamination heads listed in FIG. 8.
Figure 10:
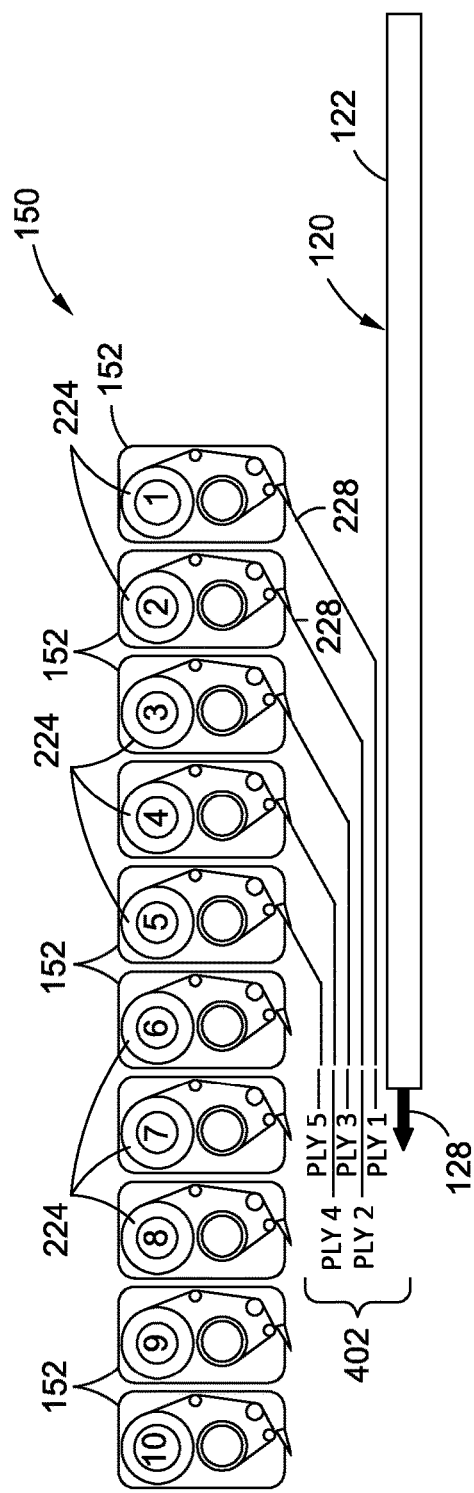
FIG. 10 is a schematic diagram of a series of lamination heads applying layup material to a lamination mandrel at a first point in time during movement of the lamination mandrel through the lamination station.

Referring to FIG. 8-10, shown in FIG. 8 is a table of an example of material configurations 406 of layup material 228 dispensed by each one of ten (10) lamination heads 152 (FIG. 10) in the lamination station 150 (FIG. 10). Each lamination head 152 is loaded with a material roll 224 of layup material 228 having a material configuration 406 that corresponds to the desired ply stacking sequence 410 of the composite laminate 400. As mentioned above, the ply stacking sequence 410 of the composite laminate 400 is defined by the positions of the lamination heads 152 relative to each other within the lamination station 150. The ply stacking sequence of a composite laminate 400 may be based on the end use of the composite laminate 400. More specifically, the composite laminate 400 may be designed with a certain ply stacking sequence based on a set of predetermined design loads to which the final composite laminate 400 (e.g., after curing) may be subjected when in service. In this regard, the order of the lamination heads 152 may be dictated by the end use of the composite laminate 400.

For example, in FIG. 8, the lamination head 152 designated as Head Number 1 is loaded with layup material 228 having a material configuration 406 comprised of 0/90-degree woven prepreg tape. Head Number 2 is loaded with layup material 228 having a material configuration 406 comprised of 0-degree unidirectional tape. Head Number 3 is loaded with layup material 228 having a material configuration 406 comprised of 0-degree unidirectional (UD) prepreg tape. FIG. 9 is a sectional view of a composite laminate 400 having a ply stacking sequence 410 resulting from the sequential application of layup material 228 dispensed by all ten (10) of the lamination heads 152 listed in FIG. 8 during a single pass of the lamination surface 120 through the lamination station 150. In FIG. 9, Ply 1 of the composite laminate 400 of FIG. 9 is applied by Head Number 1, Ply 2 of the composite laminate 400 is applied by Head Number 2, Ply 3 of the composite laminate 400 is applied by Head Number 3, and so forth.

In FIG. 9, the composite laminate 400 has a total of ten (10) plies 402 as a result of a single pass (e.g., along a first direction of travel 128 or along a second direction of travel 130) of the lamination surface 120 through the lamination station 150. However, a composite laminate 400 may be formed by multiple passes of the lamination surface 120 through the lamination station 150. In an example not shown, a composite laminate 400 having a total of 20 plies 402 may result from ten (10) lamination heads 152 respectively applying ten (10) plies 402 of layup material 228 as the lamination surface 120 moves along a first direction of travel 128 from the lamination surface home position 134 to the lamination surface aft position 136, and applying an additional ten (10) plies 402 of layup material 228 in reverse order to the first ten (10) plies 402 as the lamination surface 120 moves along a second direction of travel 130 from the lamination surface aft position 136 to the lamination surface home position 134.

In FIG. 9, the layup material 228 dispensed by each one of the ten (10) lamination heads 152 has the same material width 408. However, as mentioned below, the layup material 228 dispensed by one or more of the lamination heads 152 may have different material widths 408. In some examples, the material widths 408 of the layup material 228 loaded onto each lamination head 152 may be selected such that one or both of the opposing lateral side edges 414 of the composite laminate 400 are formed at a bevel angle 416 (e.g., FIGS. 12-13) oriented non-perpendicular to the surface of the composite laminate 400. Selecting material widths 408 that result in a bevel angle 416 may advantageously avoid the need for trimming the side edges 414 at the bevel angle 416.

In the present disclosure, the manufacturing system 100 (FIGS. 1-2) may be configured such that the lamination heads 152 (FIGS. 1-2) are controlled by the controller 110 (FIG. 1) in a manner to start applying layup material 228 (FIGS. 1-2) at the same starting location on the lamination surface 120 (FIGS. 1-2) and/or stop applying layup material 228 at the same stopping location on the lamination surface 120, and resulting in a constant laminate thickness along an entire length of the composite laminate 400 (FIGS. 1-2) when completed. Alternatively, the lamination heads 152 may be controlled by the controller 110 to start applying layup material 228 at different locations on the lamination surface 120 and/or to stop applying layup material 228 at different locations on the lamination surface 120, and resulting in a laminate thickness that varies along the lengthwise direction of the composite laminate 400 when completed. Additionally, any one of the lamination heads 152 in the lamination station 150 may be controlled by the controller 110 to start, stop and/or restart the application of layup material 228 at any point along a lamination surface 120 during the laying up of a composite laminate 400.

Any one or more of the lamination heads 152 may be controlled by the controller 110 to stop applying layup material 228 at any location along the lamination surface 120 while the remaining lamination heads 152 within the lamination station 150 continue applying layup material 228. In some examples, a lamination head 152 that has been commanded to stop applying layup material 228 at one point along a lamination surface 120 may be restarted to resume applying layup material 228 at another point along the lamination surface 120, and resulting in a lengthwise gap 404 (FIG. 11), or ply drop, in one of the plies 402 of the composite laminate 400 as described below. As may be appreciated, multiple lamination heads 152 within the lamination station 150 may be stopped and restarted at one or more points during the laying up of a composite laminate 400, and resulting in one or more gaps 404 within multiple plies 402 of the composite laminate 400.

Figure 11:
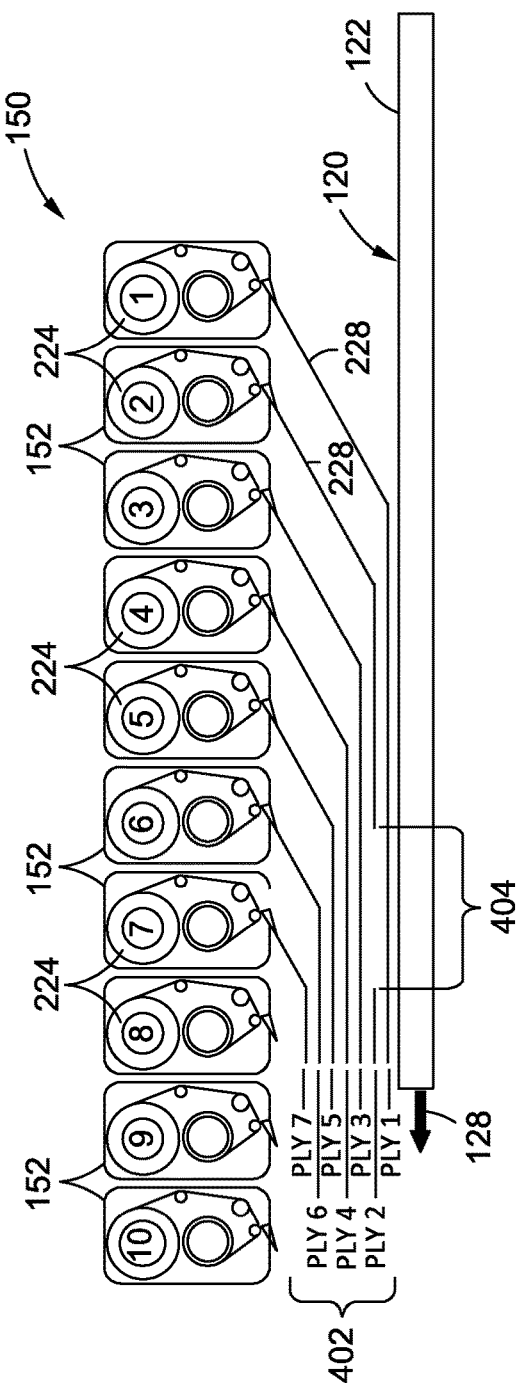
FIG. 11 is a schematic diagram of the series of lamination heads of FIG. 10 at a second point in time during movement of the lamination mandrel through the lamination station and illustrating a gap in Ply 2 as a result of the temporary stopping and restarting of Head Number 2.

Referring to FIGS. 10-11, shown are schematic diagrams of a series of lamination heads 152 applying layup material 228 to a lamination surface 120. FIG. 10 shows a series of ten (10) lamination heads 152 of which Head Numbers 1-5 are applying layup material 228 to a lamination surface 120 at a first point in time during movement of the lamination surface 120 along the first direction of travel 128 through the lamination station 150. FIG. 11 shows the series of ten (10) lamination heads 152 at a second point in time during which Head Numbers 1-7 are applying layup material 228 to the lamination surface 120 during movement along the first direction of travel 128. As shown in FIG. 11, the composite laminate 400 includes a gap 404 in Ply 2 as a result of the stopping and restarting of the application of layup material 228 by Head Number 2. On each side of the gap 404, the portions of Ply 2 remain between Plies 1 and 3 which are continuous at least in FIG. 11. The manufacturing system 100 may be configured such that as the lamination surface 120 moves through the lamination station 150, any one or more of the lamination heads 152 may independently start, stop, and/or restart applying layup material 228 at one or more points in time. In addition, the lamination heads 152 may be operated in a manner such that less than the total number of lamination heads 152 within the lamination station 150 start applying layup material 228 at the same location on a lamination surface 120. For example, for a lamination station 150 having a total of ten (10) lamination heads 152 including Head Numbers 1-10, only Head Numbers 2-10 may initially dispense layup material 228 onto a moving lamination surface 120, after which Head Number 1 may be activated to the start dispensing layup material 228 at a different point in time while Head Numbers 2-10 continue to apply layup material 228.

Figure 13:
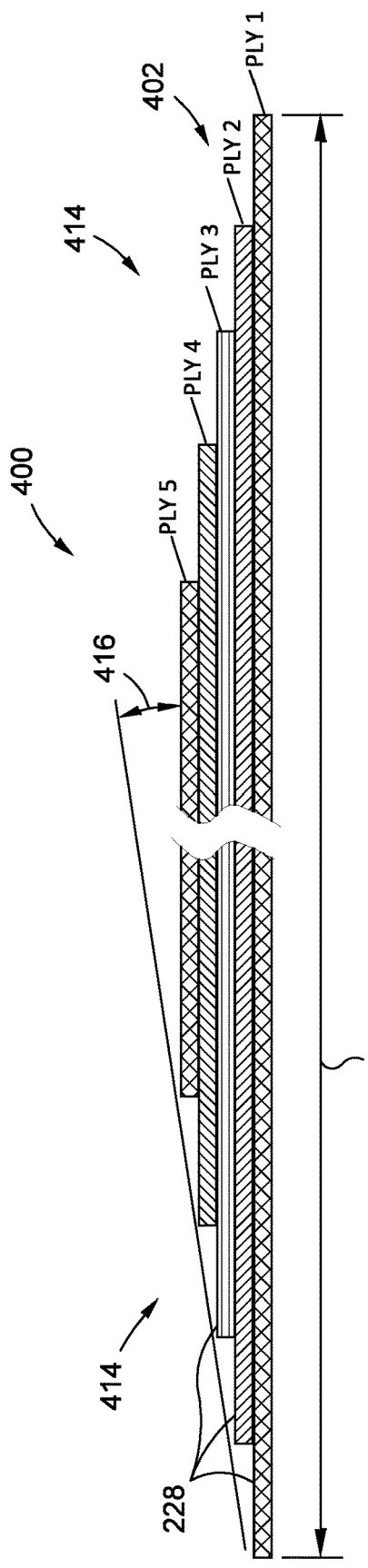
FIG. 13 is a sectional view of an example of a composite laminate in which a reduced quantity of the 10 lamination heads dispense layup material resulting in the composite laminate having a reduced thickness and a smaller bevel angle than the composite laminate shown in FIG. 12.
Figure 12:
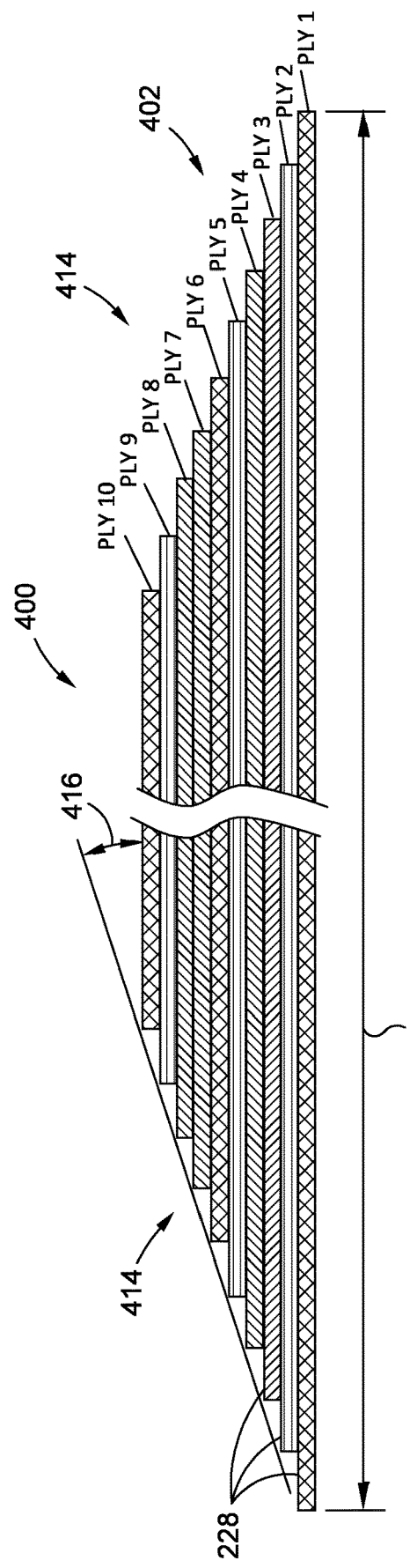
FIG. 12 is a sectional view of an example of a composite laminate in which the layup material dispensed by the lamination heads has different material widths resulting in the opposing side edges of the composite laminate being formed at a bevel angle.

Referring to FIGS. 12-13, shown are transverse sectional views of examples of a composite laminate 400 made up of layup material 228 having different material widths 408. In some examples, the different material widths 408 may be achieved by pre-slitting prepreg tape which is then wound onto a material roll 224 (FIGS. 10-11) for loading onto a lamination head 152 (FIGS. 10-11). FIG. 12 is a sectional view of an example of a composite laminate 400 in which the layup material 228 dispensed by each of ten (10) lamination heads 152 (e.g., Head Numbers 1-10 in FIG. 8) has a different material width 408 and which results in each one of the opposing side edges 414 of the composite laminate 400 being formed at a bevel angle 416. The material width 408 of the layup material 228 on the material roll 224 on each lamination head 152 may be selected such that both of the opposing side edges 414 of the composite laminate 400 are formed at a predetermined bevel angle 416.

In FIG. 12, the material widths 408 are such that the bevel angle 416 on each side edge 414 is approximately 20 degrees. However, as may be appreciated, the material widths 408 of the layup material 228 may be selected to result in any one of a variety of different bevel angles 416. FIG. 13 is a sectional view of a composite laminate 400 (e.g., the composite laminate 400 of FIG. 12) manufactured by dispensing layup material 228 from less than the total quantity of lamination heads 152 used in the same lamination station 150 used for manufacturing the composite laminate 400 of FIG. 12. In FIG. 13, the section of the composite laminate 400 includes layup material 228 dispensed from Head Numbers 1, 3, 5, 7 and 10, and resulting in the section consisting of Plies 1, 2, 3, 4 and 5. The output of Head Number 1 is Ply 1, the output of Head Number 3 is Ply 2, the output of Head Number 5 is Ply 3, the output of Head Number 7 is Ply 4 and the output of Head Number 10 is Ply 5. The reduced ply quantity in FIG. 12 results in a smaller bevel angle 416 (e.g., approximately 9 degrees) relative to the bevel angle 416 of the cross section in FIG. 12.

Referring still to FIGS. 12-13, the layup material 228 for each cross-section may be applied such that the centerlines (not shown) of the plies 402 are laterally aligned or coincident with each other, and resulting in the transverse cross-section of the composite laminate 400 being symmetric about a laminate vertical axis (not shown). However, in an embodiment not shown, the lamination heads 152 may apply layup material 228 such that the centerline of at least one of the plies 402 is laterally offset from the centerlines of other plies 402, and resulting in the transverse cross-section of the composite laminate 400 being asymmetric about a laminate vertical axis.

Figure 14:
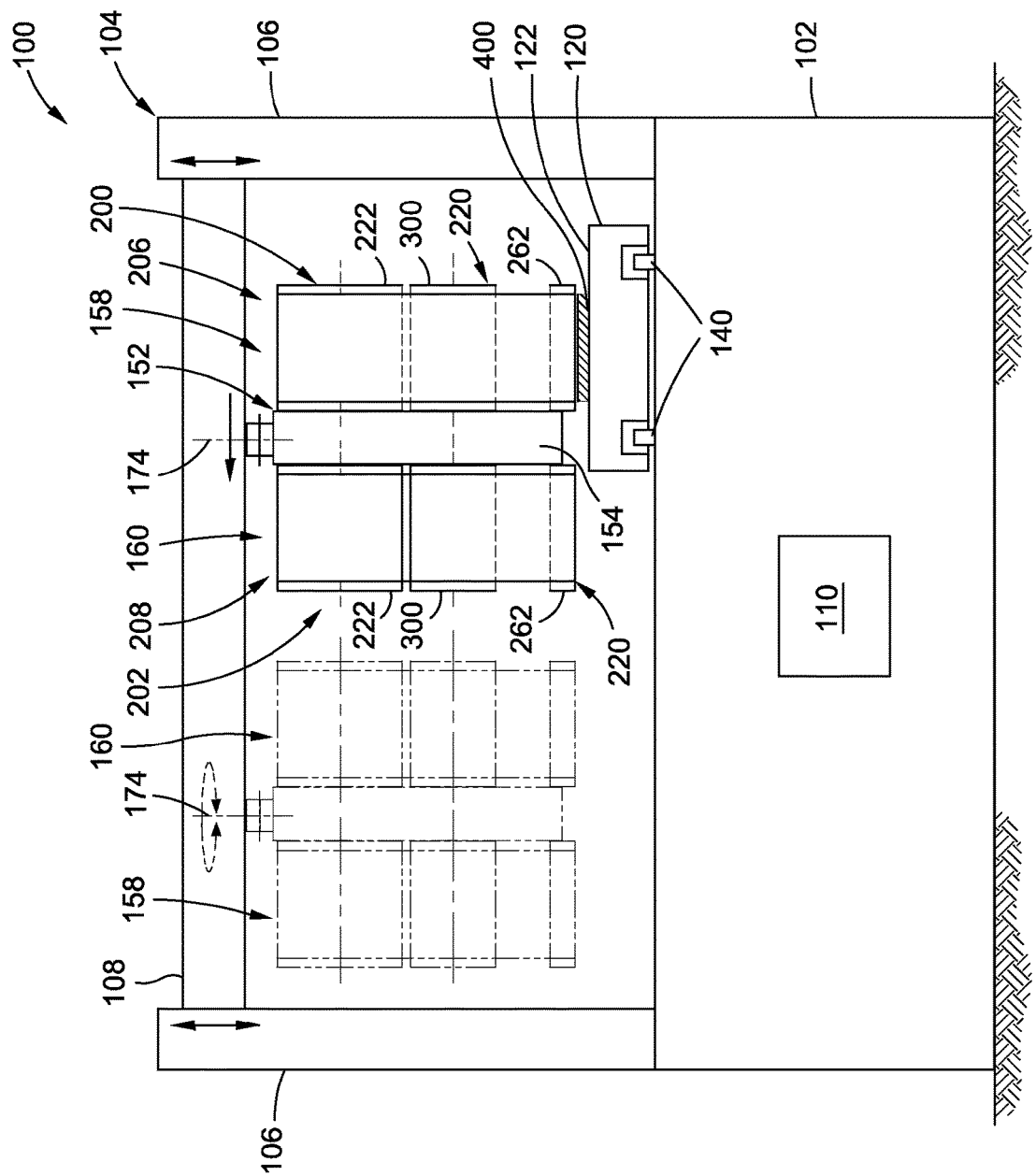
FIG. 14 is an end view of an example of the manufacturing system taken along line 13 of FIG. 3 and illustrating a support frame supporting a lamination head.

Referring to FIG. 14, shown is an example of a lamination head 152 supported over a lamination mandrel 122 by a support frame 104. In the example shown, the lamination head 152 includes laterally opposing sides including a first side 158 and a second side 160 each having the above-described head components 220. For example, the lamination head 152 includes a first lamination assembly 200 mounted to the first side 158. The first lamination assembly 200 includes a material supply drum 222, a backing layer collection drum 300, and a backing layer separation assembly 262 as described above. The lamination head 152 also includes a second lamination assembly 202 mounted to the second side 160 and which may have the same arrangement of the material supply drum 222, the backing layer collection drum 300, and the backing layer separation assembly 262 as in the first lamination assembly 200. However, in an embodiment not shown, the head components 220 of the second lamination assembly 202 may be arranged differently or may have different configurations than the head components 220 of the first lamination assembly 200.

In the present disclosure, a lamination head 152 may be configured such that the first side 158 is movable into a material application position 206 aligned with the dispensing direction 204 (FIG. 7) of the other lamination heads 152 in the lamination station 150. When the first side 158 of a lamination head 152 is in the material application position 206, the first lamination assembly 200 may apply layup material 228 (FIG. 7) onto the lamination surface 120 or onto previously applied layup material 228. When the first side 158 is in the material application position 206, the second side 160 may be in a material reload position 208 which may allow for servicing of the second side 160 of the lamination head 152. As mentioned above, servicing of a lamination head 152 may include replacing a material roll 224, performing maintenance on the head components 220, or other activities. As an alternative to moving the first side 158 into the material application position 206, the second side 160 of the lamination head 152 may be movable into the material application position 206 such that the second side 160 is aligned with the remaining lamination heads 152 in the lamination station 150 and allowing the second lamination assembly 202 to apply layup material 228 to the lamination surface 120 or to previously applied layup material 228. When the second side 160 is in the material application position 206, the first side 158 may be in the material reload position 208 which may allow for servicing of the first side 158.

Referring still to FIG. 14, one or more of the lamination heads 152 within the lamination station 150 may be configured to independently rotate 180 degrees about the vertical axis 174. Prior to rotating the lamination head 152 about the vertical axis 174, the lamination head 152 may be translated until the lamination head 152 is moved out of alignment with the remaining lamination heads 152 which may remain positioned over the lamination surface 120. In the example of FIG. 14, the lamination head 152 is shown being translated horizontally along the crossbeam 108 out of alignment with the remaining lamination heads 152 by means of a linear actuation mechanism (not shown) that may be included with the crossbeam 108. Moving a lamination head 152 out of alignment from the remaining lamination heads 152 may provide clearance for rotating the lamination head 152 without contacting the remaining lamination heads 152. Rotation of the lamination head 152 by an amount of 180 degrees about the vertical axis 174 may result in positioning the first side 158 or second side 160 in the material application position 206, and may also result in positioning the remaining one of the first side 158 or second side 160 in the material reload position 208. In the present disclosure, when a side (i.e., either the first side 158 or the second side 160) of the lamination head 152 is in the material reload position 208, the side faces away from the lamination surface 120 (e.g., lamination mandrel) and/or the side is non-aligned with the lamination surface 120.

Figure 15:
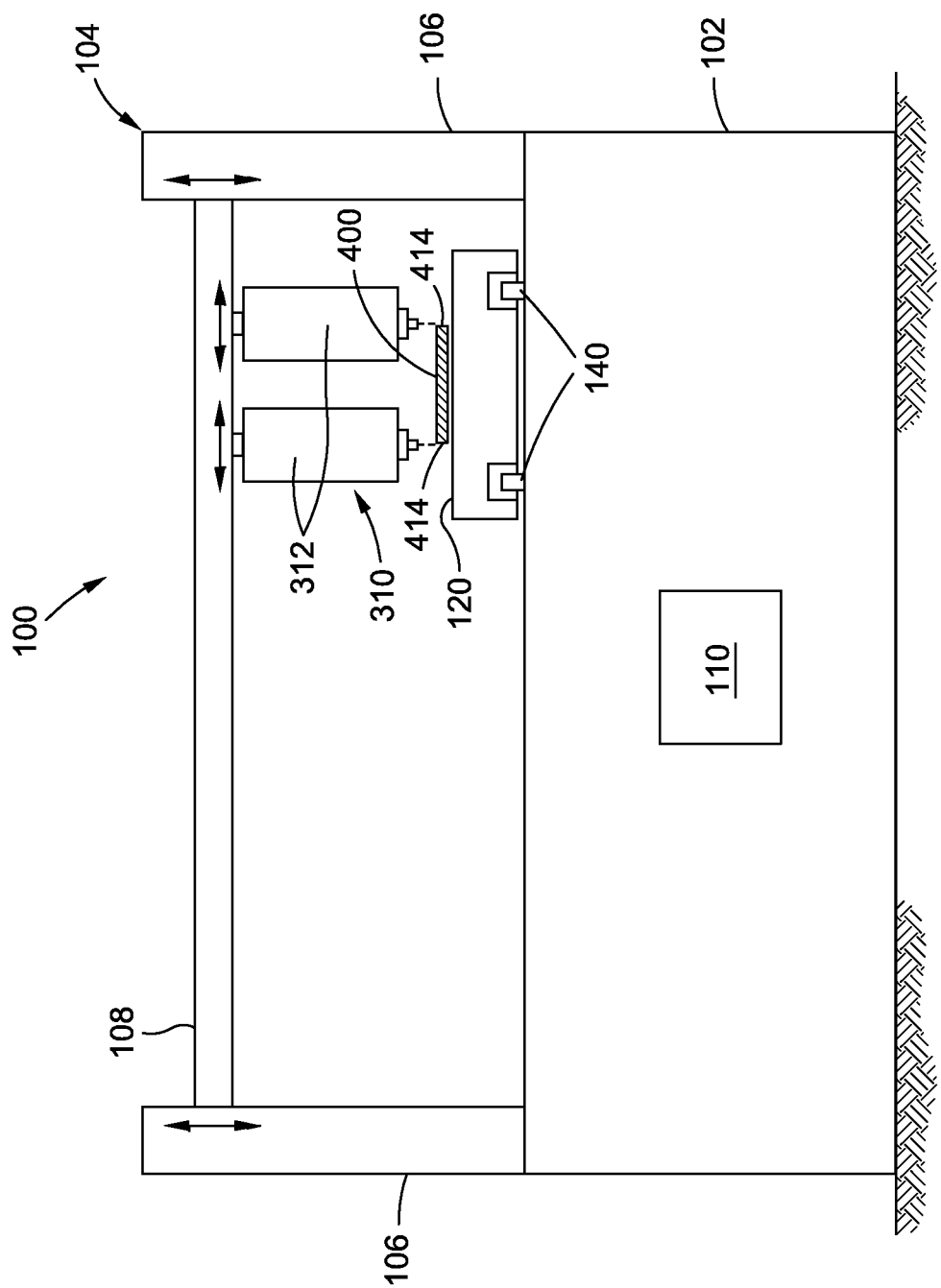
FIG. 15 is an end view of an example of the manufacturing system taken along line 14 of FIG. 3 and illustrating a support frame supporting trimming devices.

Referring to FIG. 15, shown is an example of an arrangement for supporting one or more trimming devices 312. The arrangement includes a support frame 104 configured similar to the above-described support frame 104 for supporting a lamination head 152. For example, the support frame 104 for one or more trimming devices 312 may be a generally horizontally-oriented crossbeam 108 coupled at each end to a pair of generally vertically-oriented posts 106 extending upwardly from the base member 102. A trimming device 312 may be laterally translated along the crossbeam 108 by a linear actuation mechanism (not shown) during trimming of the composite laminate 400 or during other operations of the manufacturing system. Lateral translation of a trimming device 312 may facilitate the cutting or trimming any one of a variety of geometric shapes in the composite laminate 400 such as the above-mentioned tab outs 412 (e.g., FIG. 44).

In a further embodiment, the vertical height of the trimming devices 312 may be adjusted by vertically translating the crossbeam 108 via linear actuation mechanisms (not shown) that may be included in each one of the posts 106. Adjustment of the vertical height of the trimming devices 312 may accommodate the trimming of different laminate thicknesses, such as trimming a composite laminate 400 that has a laminate thickness that varies along the length of the composite laminate 400. In some examples, one or more of the trimming devices 312 may be coupled to the crossbeam 108 or other structure by a multi-axis connection element (e.g., a five-axis pivot element—not shown) to allow pivoting of the trimming device 312 to change the orientation of the trimming device 312 while trimming the composite laminate 400. As an alternative to the support frame 104 shown in FIG. 15, one or more of the trimming devices 312 may be supported by a cantilevered beam arrangement (not shown), a robotic device (not shown), or any one a variety of other structures or mechanisms.

In FIG. 15, one or more of the trimming devices 312 may be configured as an ultrasonic knife, a laser device, a mechanical cutter blade, or any one of a variety of other types of trimming devices 312. As mentioned above, the trimming devices 312 may be configured to trim one or both of the side edges 414 of the composite laminate 400. Alternatively or additionally, one or more trimming devices 312 may trim or cut other location of the composite laminate 400 such as the ends of the composite laminate 400 for an interior region of the composite laminate 400. In the embodiment shown of FIGS. 42, 47, 52 and 57 described below, one or more of the trimming devices 312 may trim the composite laminate 400 concurrently with the lamination of the composite laminate 400. For example, a downstream portion of composite laminate 400 exiting the lamination station 150 may be trimmed while the upstream portion of the composite laminate 400 is being laid up as the lamination mandrel 122 passes through the lamination station 150. The trimming of a composite laminate 400 may involve one or more of the trimming devices 312 forming a perpendicular cut on the composite laminate 400 such as on one or both of the side edges 414. A perpendicular cut may be oriented perpendicular to the uppermost lamination surface 120. Alternatively or additionally, one or more trimming devices 312 may form a bevel cut on one or both of the side edges 414 of the composite laminate 400. A bevel cut may be oriented non-perpendicular to an uppermost lamination surface 120 and may be formed on one or both side edges 414 of a composite laminate 400.

Figure 16:
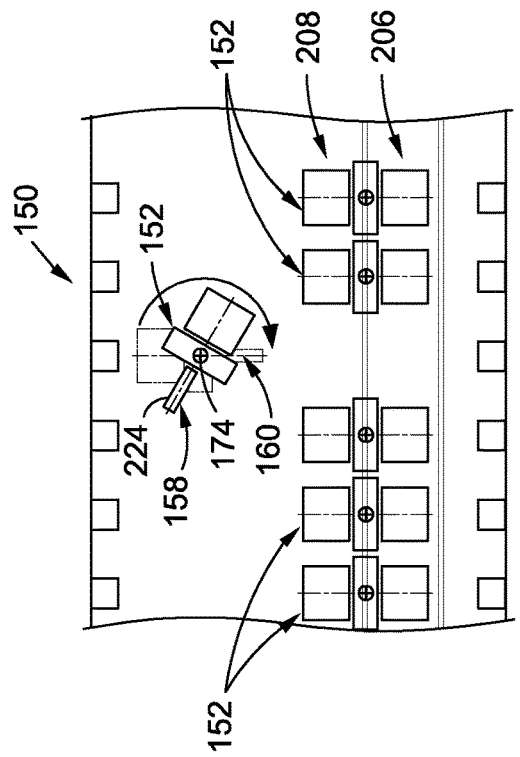
FIG. 16 is a top view of a portion of the lamination station of a manufacturing system in which the lamination heads each have a first side and a second side each configured to dispense layup material and illustrating one of the lamination heads being laterally translated out of alignment from the series of lamination heads to allow for replacement of a depleted material roll on the first side of the lamination head.
Figure 17:
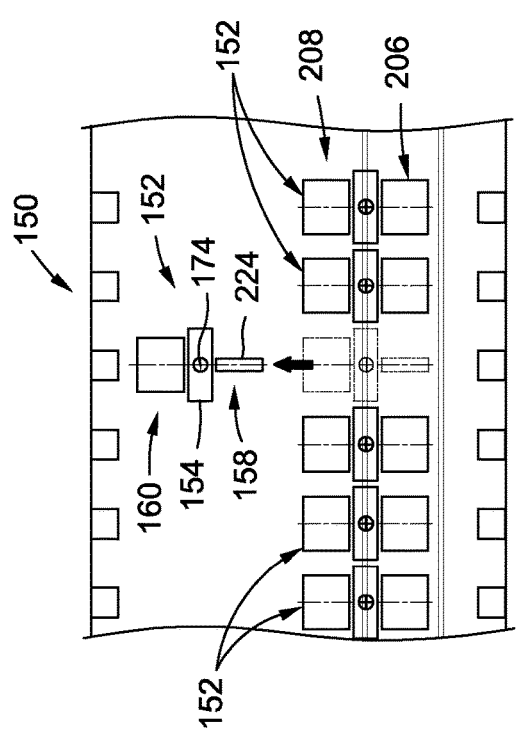
FIG. 17 is a top view of the lamination station of FIG. 16 showing the lamination head being rotated 180 degrees about a vertical axis such that the second side of the lamination head is rotated into the position formerly occupied by the first side of the lamination head.

Referring to FIGS. 16-19, shown are top views of a portion of the lamination station 150 illustrating the process of one of the lamination heads 152 being translated laterally out of alignment with the remaining lamination heads 152 in the lamination station 150 prior to rotating the translated lamination head 152 by an amount of 180 degrees about the vertical axis 174 (FIG. 14). As described above and shown in FIG. 14, one or more of the lamination heads 152 of the lamination station 150 may have a first side 158 and a second side 160 each configured to dispense layup material 228 (FIG. 7). FIG. 16 shows one of the lamination heads 152 being laterally translated out of alignment from the series of lamination heads 152 to allow for replacement of a depleted material roll 224 on the first side 158 of the lamination head 152. FIG. 17 shows the lamination head 152 being rotated 180 degrees about the vertical axis 174 such that the second side 160 of the lamination head 152 is rotated into the position formerly occupied by the first side 158 of the lamination head 152.

Figure 18:
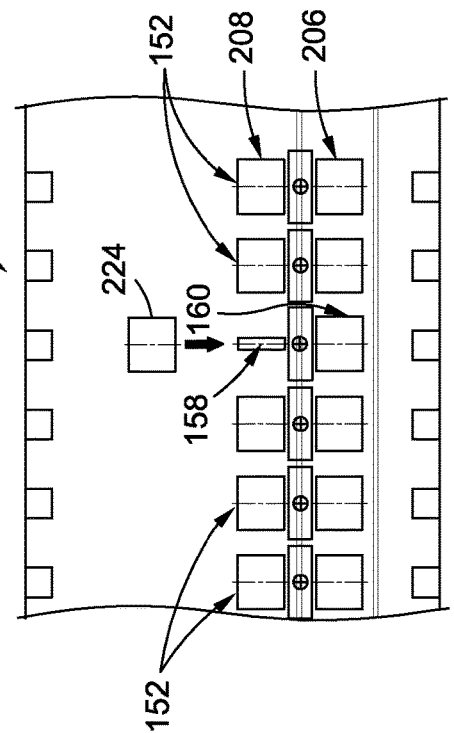
FIG. 18 is a top view of the lamination station of FIG. 17 showing the lamination head being translated back into alignment with the series of lamination heads to allow the second side of the lamination head to dispense layup material.
Figure 19:
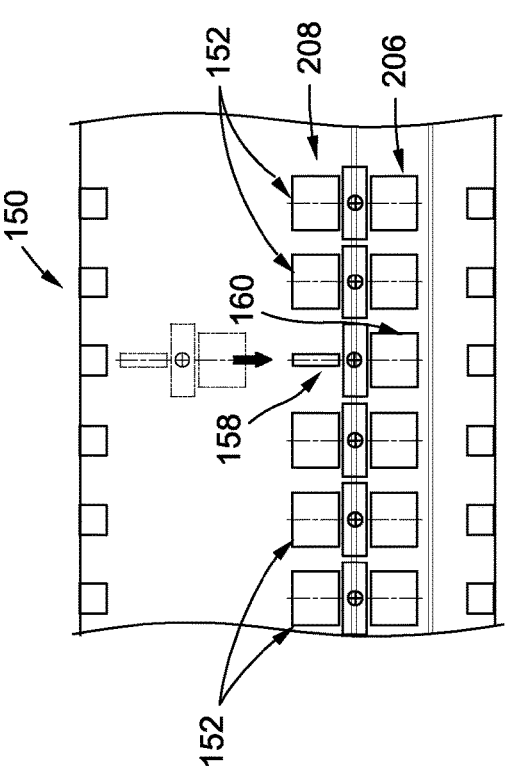
FIG. 19 is a top view of the lamination station of FIG. 18 showing a replacement material roll being installed on the first side of lamination head.

As mentioned above, the lamination head 152 may be translated laterally out of alignment with the remaining lamination heads 152 to provide clearance for rotating the lamination head 152. FIG. 18 shows the lamination head 152 being translated laterally back into alignment with the series of lamination heads 152 which places the second side 160 in the material application position 206. FIG. 19 shows a replacement material roll 224 being installed on the first side 158 of the lamination head 152 which is in the material reload position 208. The replacement material roll 224 may be installed after removal of the depleted material roll 224 from the first side 158. The advantage of quickly translating a lamination head 152 out of alignment from the remaining lamination heads 152 for rotating the lamination head 152 and then quickly moving the second side 160 of the lamination head 152 into position for dispensing layup material 228 is a minimization of downtime in laying up composite laminates 400 which thereby maximizes throughput of the manufacturing system 100.

Figure 21:
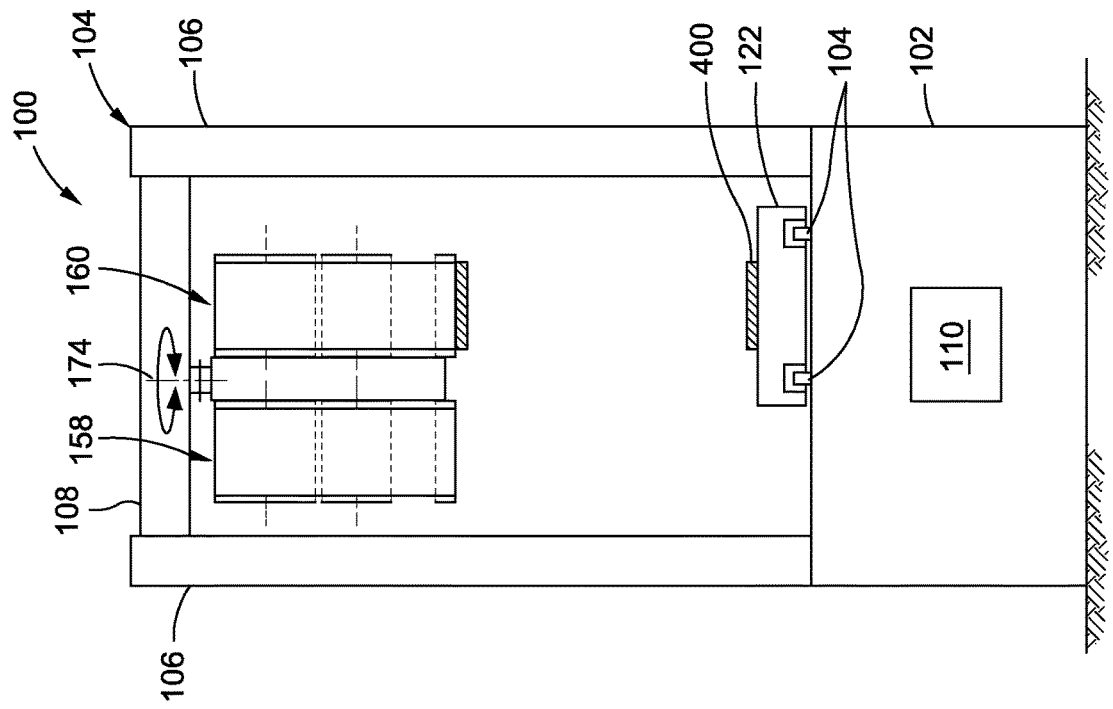
FIG. 21 illustrates one of the lamination heads of FIG. 20 after vertical translation by an amount allowing for rotation of the lamination head 180 degrees about the vertical axis as a means to rotate the second side of the lamination head into the position formerly occupied by the first side of the lamination head.
Figure 20:
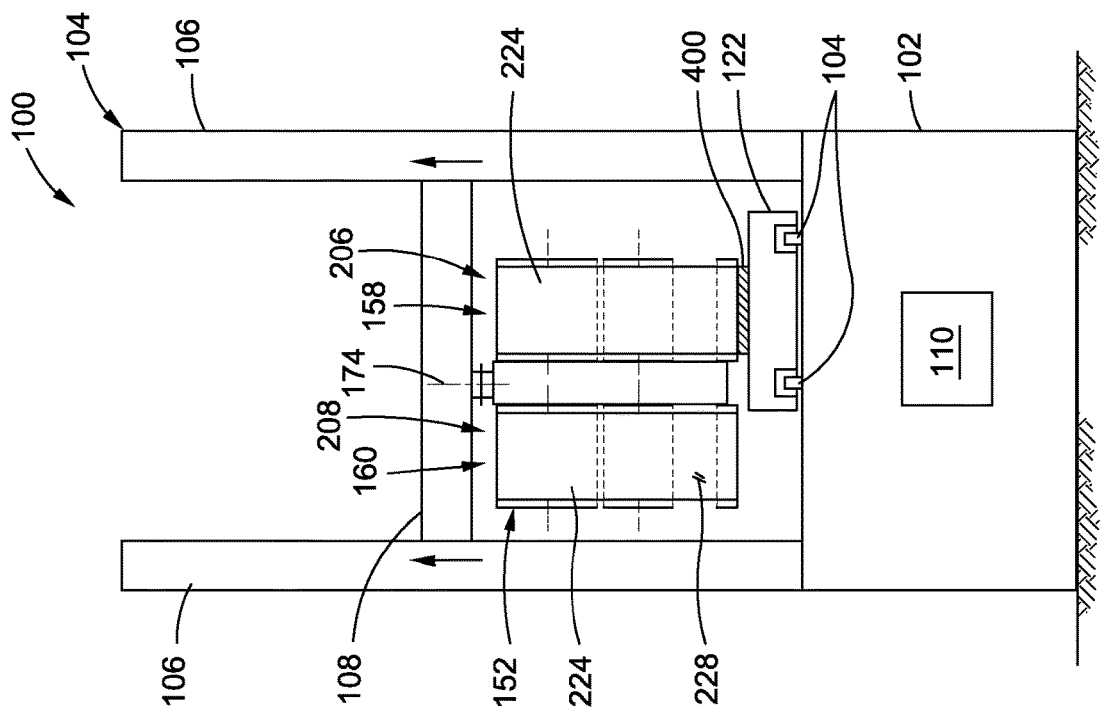
FIG. 20 is an end view of an example of a manufacturing system configured to allow vertical translation of one or more of the lamination heads out of alignment with the series of lamination heads.

Referring to FIGS. 20-21, shown are end views of an example of a manufacturing system 100 configured to allow vertical translation of one or more of the lamination heads 152 out of alignment with the series of lamination heads 152. Similar to the above-described arrangement shown in FIG. 14, the lamination head 152 shown in FIG. 20 has a first side 158 and a second side 160 each configured to dispense layup material 228. The lamination head 152 is supported by a crossbeam 108 that is vertically translatable such as by coordinated actuation of a pair of linear actuation mechanisms (not shown) that may be respectively included with the posts 106 extending upwardly from the base member 102. FIG. 21 shows the lamination head 152 after being independently translated upwardly out of alignment from the remaining lamination heads 152 to provide clearance for rotating the lamination head 152 without contacting the remaining lamination heads 152 in the lamination station 150. In FIG. 21, the lamination head 152 may be rotated 180 degrees about the vertical axis 174 (FIG. 14) such that the second side 160 of the lamination head 152 is rotated into the position formerly occupied by the first side 158 of the lamination head 152, after which the lamination head 152 may be translated downwardly back into alignment with the remaining lamination heads 152. With the first side 158 of the lamination head 152 is in the material reload position 208 (FIG. 20), the depleted material roll 224 on the first side 158 of lamination head 152 may be replaced with a replacement material roll 224. As mentioned above, the ability to quickly upwardly translate a lamination head 152 out of alignment from the remaining lamination heads 152 and then rotate the lamination head 152 and downwardly translate the second side 160 of the lamination head 152 into the material application position 206 (FIG. 20) for dispensing layup material 228 minimizes downtime of the manufacturing system 100 in laying up composite laminates 400.

Figure 22:
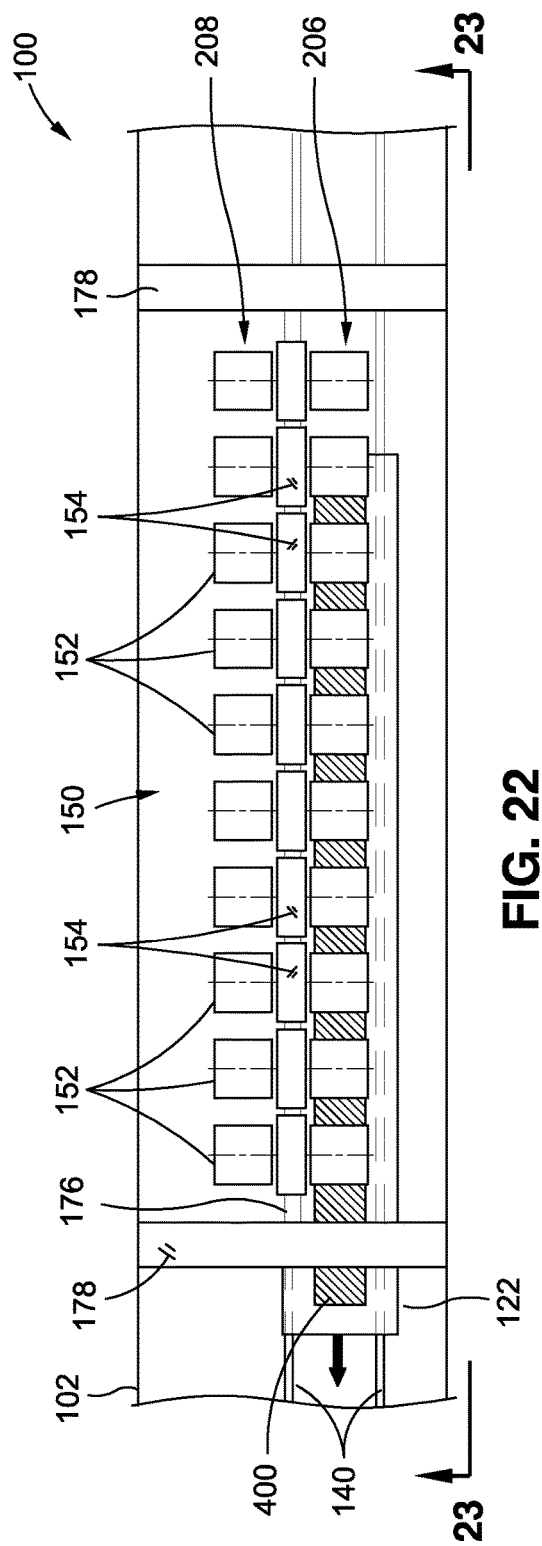
FIG. 22 is a top view of a further example of the lamination system in which the series of lamination heads are supported on a horizontal shaft configured to allow for independent rotation of each one of lamination heads 180 degrees about the horizontal shaft to rotate a second side of each lamination head into the position formerly occupied by the first side of the lamination head to allow the second side to dispense a layup material.
Figure 23:
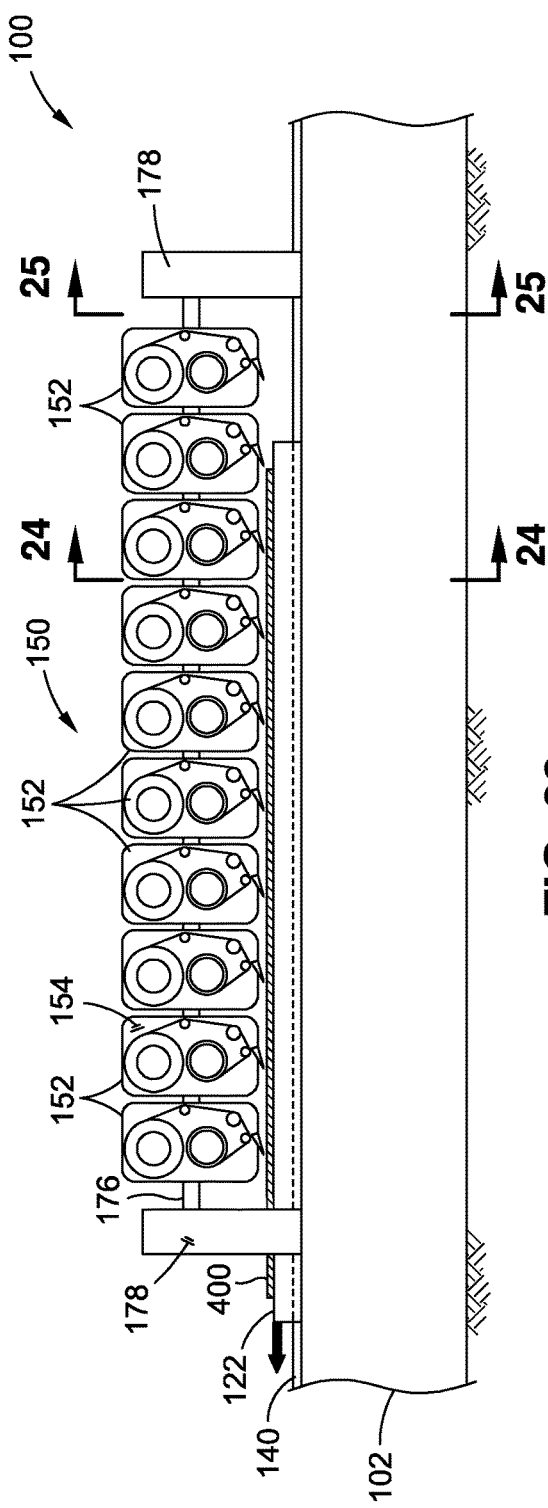
FIG. 23 is a side view of the lamination system of FIG. 22.
Figure 25:
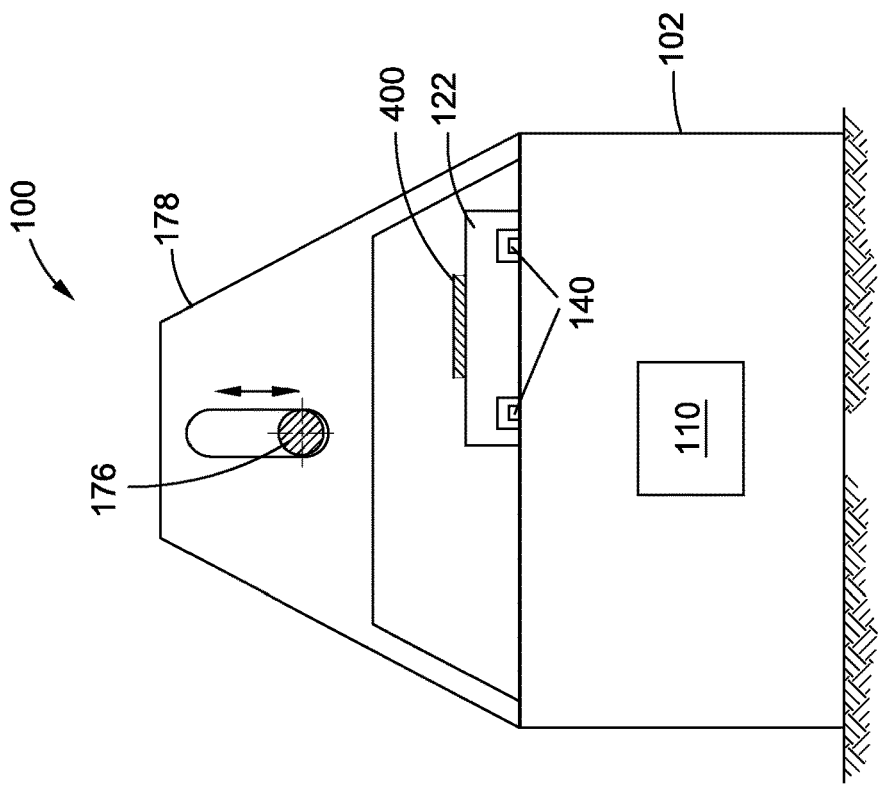
FIG. 25 is a section view taken along line 25 of FIG. 23 and illustrating one of a pair of opposing shaft supports configured to support the horizontal shaft.
Figure 24:
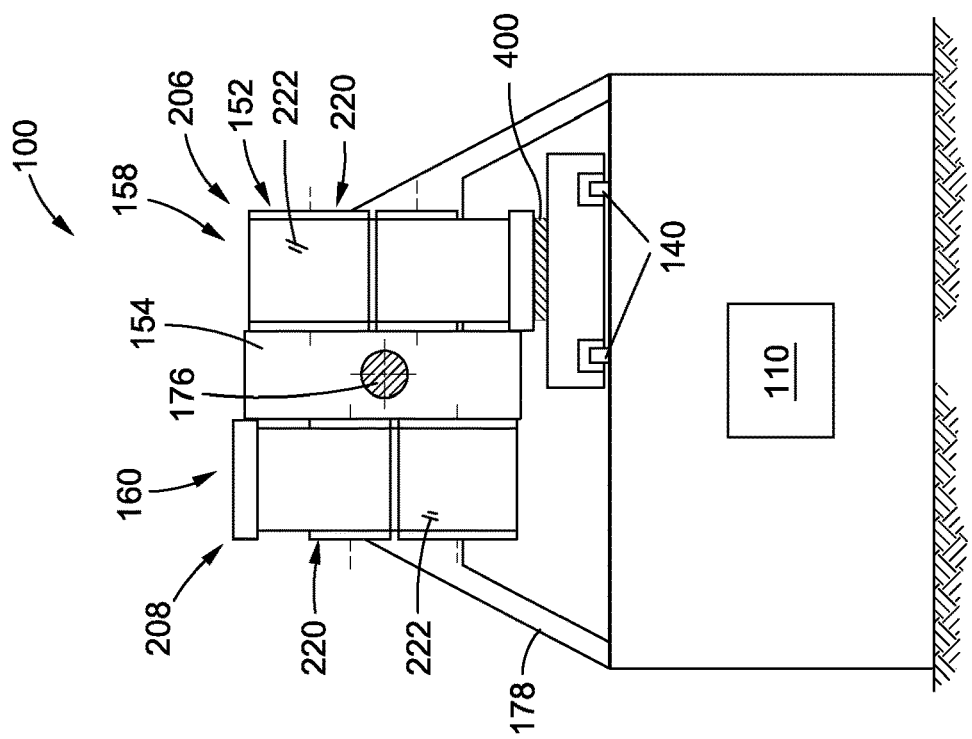
FIG. 24 is a section view taken along line 24 of FIG. 23 and illustrating one of the lamination heads supported on the horizontal shaft.

Referring to FIGS. 22-25, shown in FIG. 22 is a top view of an example of a manufacturing system 100 in which the series of lamination heads 152 are mounted on a horizontal shaft 176. FIG. 23 is a side view of the manufacturing system 100 of FIG. 22. FIG. 24 is a sectional view of the manufacturing system 100 showing one of the lamination heads 152 supported on the horizontal shaft 176. FIG. 25 is a sectional view showing one of a pair of opposing shaft supports 178 configured to support the horizontal shaft 176 which may extend between the opposing shaft supports 178. Each one of the shaft supports 178 may include a linear actuation mechanism which may be operated in cooperation with each other to vertically translate the horizontal shaft 176 and thereby vertically translate the lamination heads 152 prior to and after rotation of one or more of the lamination heads 152 above the horizontal shaft 176.

As shown in FIG. 24, the mounting frame 154 of each one of the lamination heads 152 may be rotatably coupled to the horizontal shaft 176. As described above, one or more of the lamination heads 152 in a lamination station 150 may have a first side 158 and a second side 160 each configured to dispense layup material 228 (FIG. 7). In the example of FIGS. 22-28, the arrangement of the head components 220 on the second side 160 of each lamination head 152 may be inverted relative to the arrangement of the head components 220 of the first side 158 of the lamination head 152. Each one of the lamination heads 152 may be independently rotatable by at least 180 degrees about the horizontal shaft 176 in a manner such that the second side 160 of the lamination head 152 is rotated into the position formerly occupied by the first side 158 of the lamination head 152 to allow the second side 160 to dispense layup material 228. Rotation of the lamination head 152 above the horizontal shaft 176 may also move the first side 158 into the material reload position 208 to allow the depleted material roll 224 on the first side 158 to be replaced with a replacement material roll 224 and/or to allow the maintenance of the first side 158. As described above in the examples where the lamination heads 152 are independently rotatable 180 degrees about a vertical axis 174 (e.g., FIGS. 16-19), the ability to rotate one or more lamination heads 152 about the horizontal shaft 176 allows for quickly rotating a depleted side of a lamination head 152 out of alignment of the remaining lamination heads 152 in the lamination station 150, and quickly rotate a side of the lamination head 152 having a full material roll 224 into the material application position 206 to thereby minimize downtime in laying up composite laminates 400 which thereby maximizes throughput of the manufacturing system 100.

Figure 26:
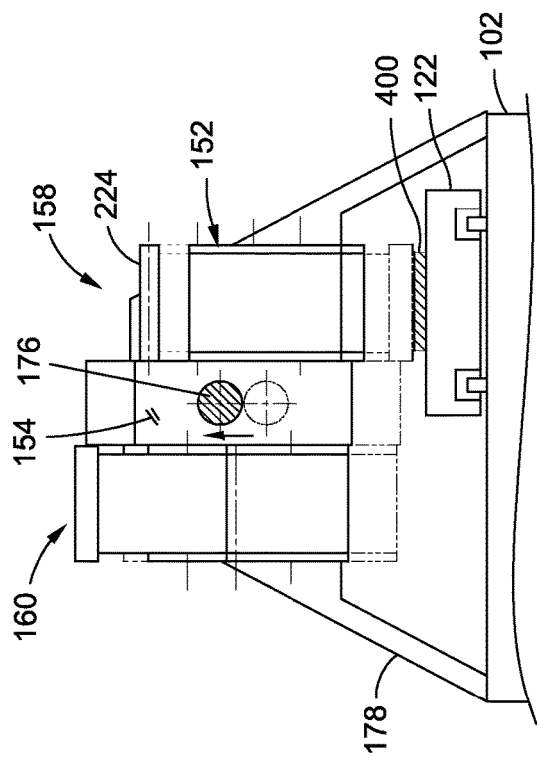
FIG. 26 is a section view of the lamination system of FIGS. 22-23 and illustrating the horizontal shaft and the series of lamination heads being vertically translated upwardly to provide clearance with the lamination mandrel to allow rotation of a lamination head of which the material supply drum is depleted on the first side.
Figure 28:
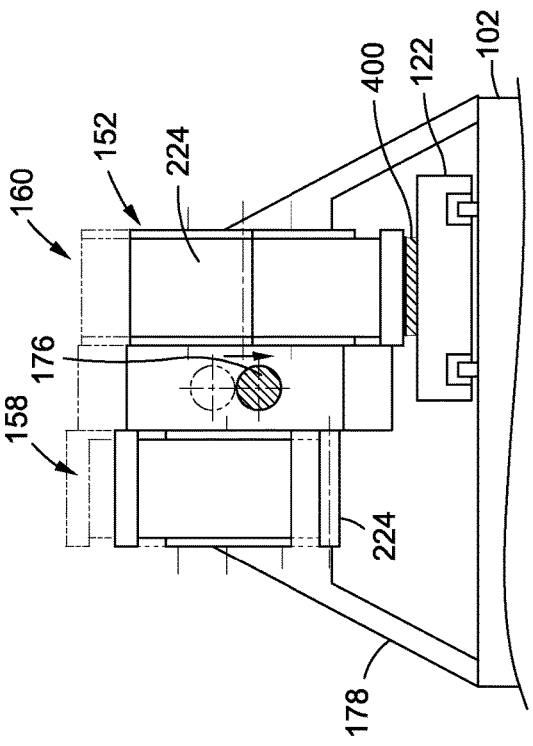
FIG. 28 is a section view of the lamination system of FIG. 27 illustrating the horizontal shaft and the series of lamination head being vertically translated downwardly to allow the second side of lamination head to dispense layup material.
Figure 27:
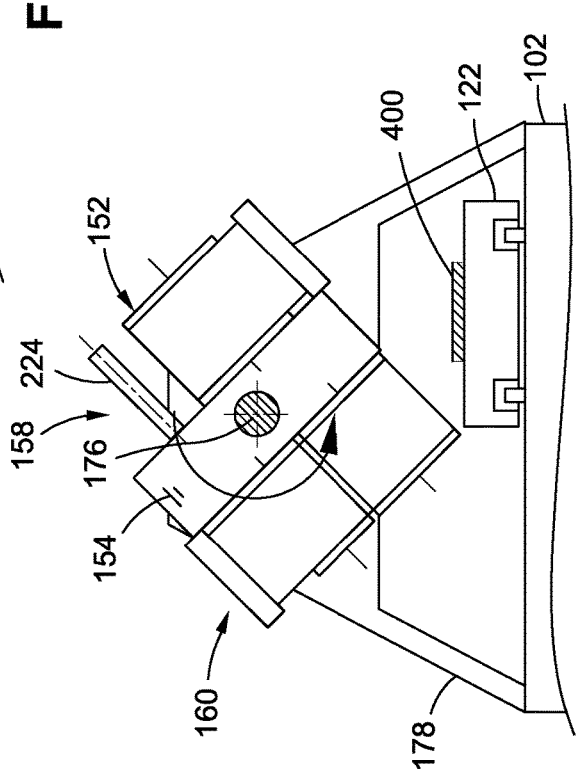
FIG. 27 is a section view of the lamination system of FIG. 26 showing the rotation of one of the lamination heads to rotate the second side of the lamination head into the position formerly occupied by the first side of the lamination head.

Referring to FIGS. 26-28, shown are end views of the lamination station 150 of FIGS. 22-23 illustrating a process of rotating a lamination head 152 about the horizontal shaft 176. The first side 158 of the lamination head 152 contains a depleted material roll 224. FIG. 26 shows the horizontal shaft 176 and the series of lamination heads 152 being translated upwardly to provide clearance for the lamination mandrel 122 during rotation about the horizontal shaft 176. FIG. 27 shows the rotation of one of the lamination heads 152 to rotate the second side 160 of the lamination head 152 into the position formerly occupied by the first side 158 of the lamination head 152. FIG. 28 shows the horizontal shaft 176 and the series of lamination head 152 being translated downwardly to allow the second side 160 of lamination head 152 to dispense layup material 228 along with one or more of the remaining lamination heads 152 in the lamination station 150.

Figure 29:
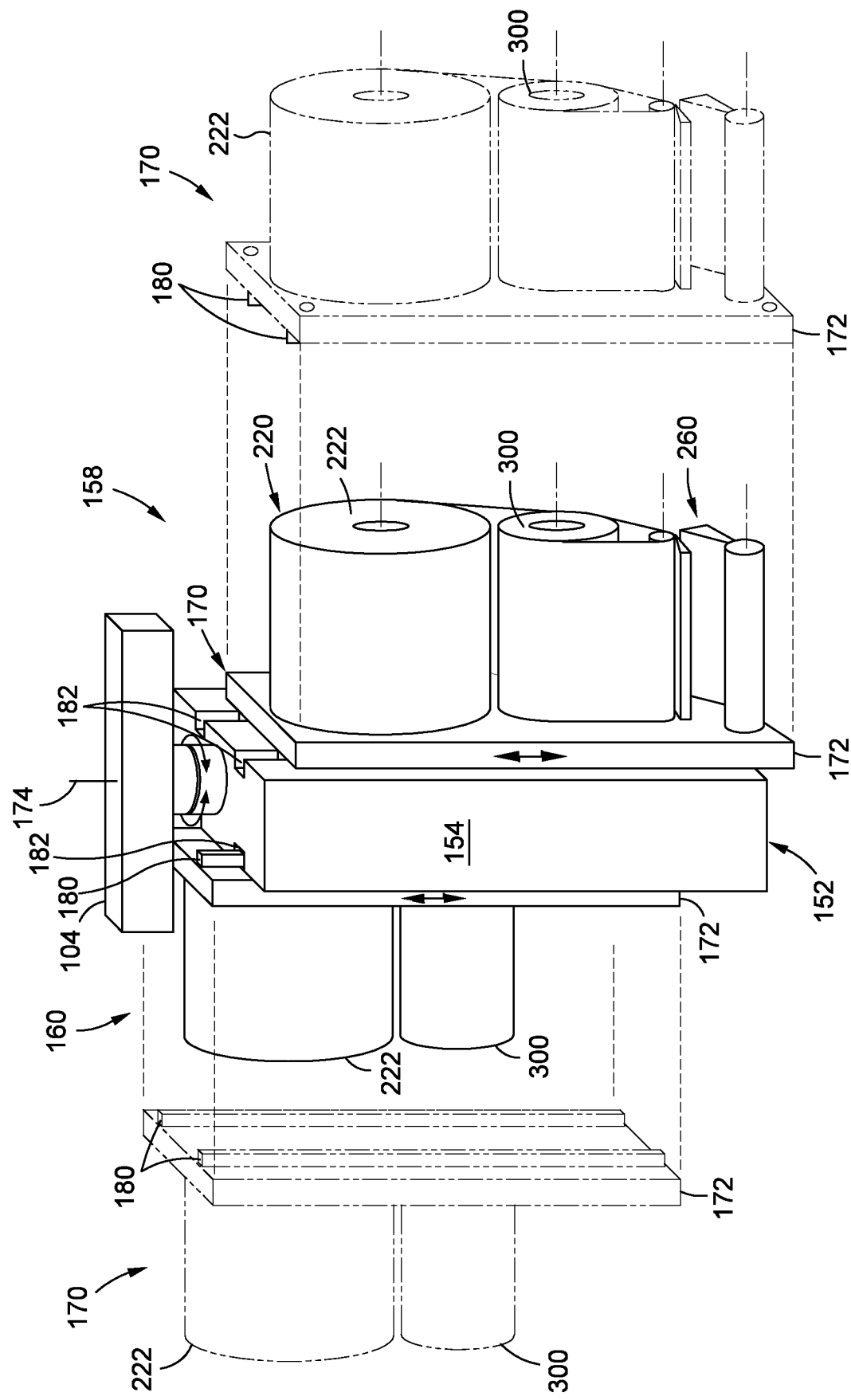
FIG. 29 is a perspective view of an example of a lamination head having a mounting frame and a head module removably couplable to each of opposing sides of the mounting frame and wherein each head module is independently vertically movable on the mounting frame.

Referring to FIG. 29, shown is an example of a lamination head 152 having a mounting frame 154 which has a first side 158 and a second side 160. The lamination head 152 further includes a head module 170 removably coupled to the first side 158 and a head module 170 removably coupled to the second side 160. Each head module 170 includes a frame coupling element 172 to which are mounted the above-described head components 220. Each frame coupling element 172 allows for removable coupling of each head module 170 to the mounting frame 154 which may allow the head module 170 to be removed such as for servicing of the head components 220, replacement of the material roll 224, or replacement of the head module 170 as described below (e.g., FIGS. 30-33). In the example of FIG. 29, the frame coupling element 172 is configured as a plate to which the head components 220 are mounted. However, the frame coupling element 172 may be provided in any one a variety of alternative structural configurations capable of functioning as a structure to which the head components 220 are mounted. Although not shown, the frame coupling element 172 of each head module 170 may be removably attached to the mounting frame 154 using one or more fastening mechanisms (not shown) incorporated into the mounting frame 154 and/or incorporated into the frame coupling element 172, and which may be actuated upon command by the controller 110. In this regard, the fastening mechanisms removably coupling the frame coupling element 172 to the mounting frame 154 may be actuated by any one of a variety of means including electro-mechanically, pneumatically, and/or hydraulically.

In FIG. 29, each head module 170 may be configured to be vertically movable relative to the mounting frame 154. For example, each frame coupling element 172 may include one or more vertical members 180 configured to be vertically slidable within a corresponding number of vertical grooves 182 they may be included with the mounting frame 154. However, the frame coupling element 172 of each head module 170 may be configured with any one of a variety of arrangements enabling vertical movement of each head module 170 relative to the mounting frame 154. In some examples, the head module 170 on one side of the mounting frame 154 may be lockable in an up position 184 to allow for servicing of the head module 170 while the head module 170 on an opposite side of the mounting frame 154 is vertically movable to allow for dispensing of layup material 228. In the example of FIG. 29, the head module 170 on the second side 160 is in the material reload position 208 and is shown locked in an up position 184, while the head module 170 on the first side 158 is in the material application position 206 and is vertically movable in correspondence with the starting and stopping of the dispensing of layup material 228. However, the head module 170 on the first side 158 may be locked in an up position 184 while the head module 170 on the second side 160 is vertically movable for dispensing layup material 228.

In some examples, when a head module 170 is in the material reload position 208 and is locked into the up position 184, such head module 170 may be deactivated such that the head components 220 are prevented from moving (e.g., rotating) and/or the head module 170 is prevented from moving and/or dispensing layup material 228 to allow for servicing or replacement of the head module 170 such as by a technician. As mentioned above, the lamination head 152 may be rotatable 180 degrees about a vertical axis 174 to allow for positioning the head module 170 of the first side 158 or second side 160 in the material application position 206 while positioning the head module 170 of the remaining first side 158 or second side 160 in the material reload position 208. In some examples, each lamination head 152 may include a rotatable electrical contact mechanism (not shown) configured for automatically electrically disconnecting (e.g., cutting power and/or control signals to) the head components 220 of the head module 170 being rotated into the material reload position 208, and automatically electrically connecting (e.g., providing power and/or control signals to) the head module 170 on the side being rotated into the material application position 206. The technical effect of rotating a lamination head 152 to selectively position the first side 158 or second side 160 in the material reload position 208 or material application position 206 is the ability to service (e.g., replace a material roll 224, repair and/or replace head components 220, replace a head module 170, etc.) a lamination head 152 within the lamination station 150 without disrupting the laying up of a composite laminate. In this regard, the ability to selectively rotate the first side 158 and second side 160 of the lamination head 152 between the material application position 206 and material reload position 208 minimizes downtime of the manufacturing system 100 which thereby maximizes throughput of the manufacturing system.

Referring to FIGS. 30-33, shown are top views of a portion of the lamination station 150 in which each one of the lamination heads 152 has a head module 170 mounted to a mounting frame 154 similar to the arrangement described above with regard to FIG. 29. FIGS. 30-33 illustrate the process of one of the lamination heads 152 being translated laterally out of alignment from the remaining lamination heads 152 in the lamination station 150 to allow for replacement of the head module 170 of the laterally-translated lamination head 152. However, in an example not shown, the lamination station 150 may be provided in an arrangement in which the series of lamination heads 152 are spaced far enough apart from each other such that each lamination head 152 has clearance for 180-degree rotation about a vertical axis 174 without the need for translating the lamination head 152 out of alignment from the remaining lamination heads 152 in the lamination station 150.

Figure 31:
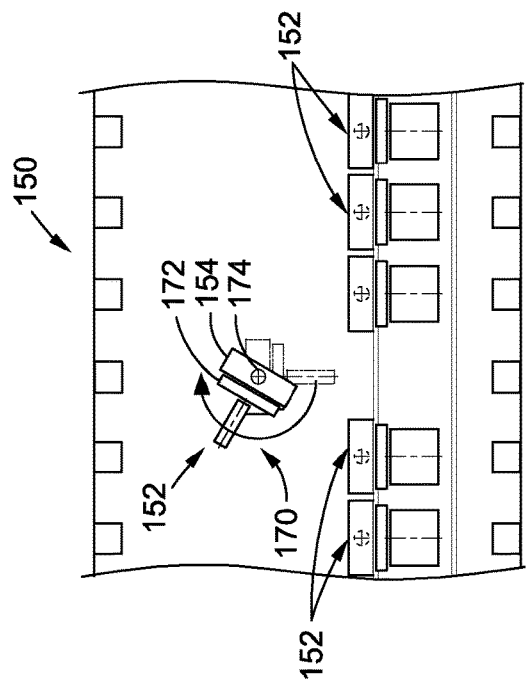
FIG. 31 is a top view of the lamination station of FIG. 30 showing the lamination head being rotated 180 degrees about a vertical axis such that the head module faces away from the series of lamination heads.
Figure 30:
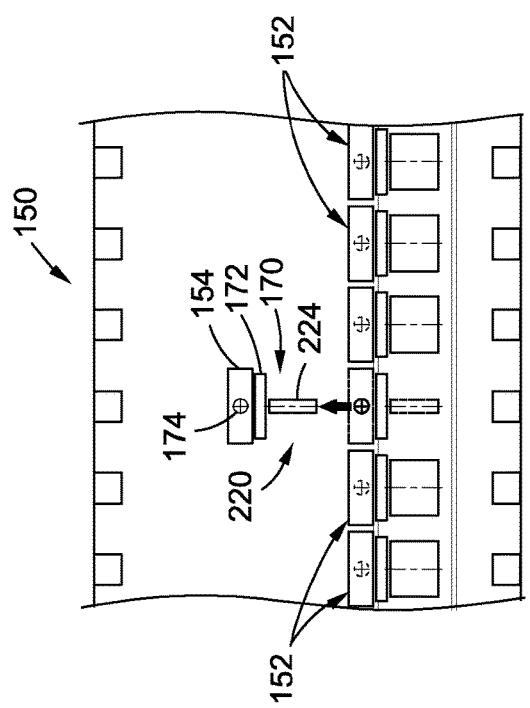
FIG. 30 is a top view of a portion of a lamination station of a manufacturing system in which each one of the series of lamination heads has a detachable head module and illustrating one of the lamination heads being laterally translated out of alignment from the series of lamination heads to allow for replacement of the head module.
Figure 33:
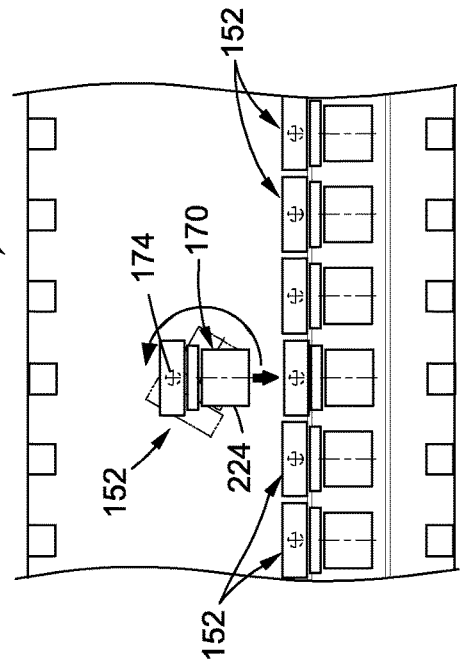
FIG. 33 is a top view of the lamination station of FIG. 32 showing the lamination head being translated back into alignment with the series of lamination heads.
Figure 32:
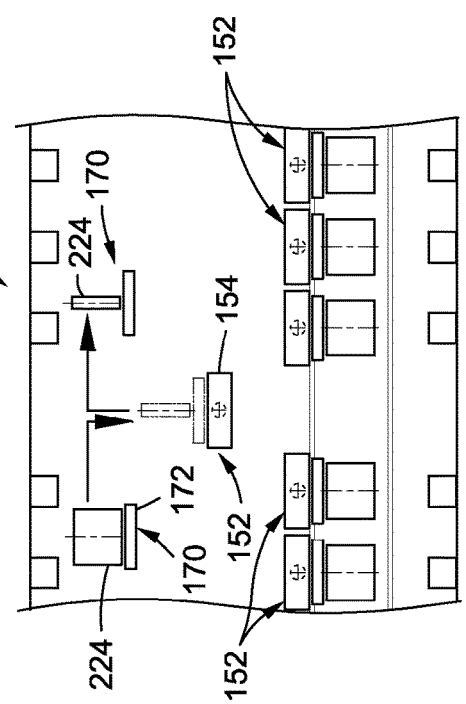
FIG. 32 is a top view of the lamination station of FIG. 31 showing the head module having a depleted material roll being replaced with a head module having a new material roll.

Referring still to FIGS. 30-33, the head module 170 may be replaced for any number of reasons including replacing the head module 170 in the event of a depleted material roll 224 and/or replacing the head module 170 if maintenance of the head components 220 is required or if a different configuration of head components 220 is required. FIG. 30 shows a lamination head 152 being laterally translated out of alignment from the series of lamination heads 152. FIG. 31 shows the lamination head 152 being rotated 180 degrees about the vertical axis 174 (FIG. 14) such that the head module 170 faces away from the series of lamination heads 152. FIG. 32 shows the head module 170 with depleted material roll 224 being replaced by a head module 170 having a new material roll 224. FIG. 33 shows the lamination head 152 being translated back into alignment with the series of lamination heads 152. Replacement of the head module 170 may be performed manually or replacement of the head module 170 may be performed autonomously by a reloading system 450 configured similar to the reloading system 450 described below and illustrated in FIGS. 34-39.

As mentioned above with regard to the examples of FIGS. 16-19 and 20-21, the ability to quickly rotate a lamination head 152 and replace a head module 170 after depleting a material roll 224 in FIGS. 30-33 minimizes the amount of downtime of the manufacturing system 100 which thereby maximizes throughput. In addition, the above-described arrangement of a frame coupling element 172 (FIG. 29) detachably coupling a head module 170 to the first side 158 and/or second side 160 of the mounting frame 154 of a lamination head 152 provides the ability to quickly install different types of head modules 170 on any one of the lamination heads 152 with minimal downtime of the manufacturing system 100 and with minimal hardware cost. For example, a head module 170 having head components 220 configured for dispensing backed material 226 may be quickly replaced (e.g., FIGS. 30-33) with a head module 170 having head components 220 configured for dispensing non-backed layup material 228 such as metallic mesh or non-tacky processing layers. In this regard, any one of the embodiments disclosed herein in which a lamination head 152 is rotated (e.g., FIGS. 16-19, 20-21, 22-28, 29-33) or replaced (FIGS. 34-39) provides maximum flexibility with regard to material replenishment, material replacement and/or lamination head maintenance while minimizing overall hardware costs.

In some examples of the manufacturing system 100 (e.g., FIG. 40), one or more replacement head modules 170 may be stored in close proximity to the lamination station 150 to allow for quick change out of head modules 170 such as in the event of a depleted material roll. In some examples, replacement head modules 170 may be stored as a replacement for lamination heads 152 dispensing layup material 228 that has relatively high demand based on the ply stacking sequence of the composite laminate 400 being laid up. In contrast, replacement head modules 170 may not be stored as a replacement for lamination heads 152 dispensing layup material 228 that are of relatively low demand based on the ply stacking sequence. However, in some examples, it may be desirable for the manufacturing system 100 to store replacement head modules 170 dispensing low-demand layup material 228 predicted to be nearing depletion at approximately the same time as the lamination heads 152 dispensing high-demand layup material 228. In this regard, head modules 170 dispensing low-demand layup material 228 nearing depletion may be replaced at the same time as the head modules 170 dispensing high-demand layup material 228 a means to minimize the number of times that the manufacturing system 100 is paused for head module 170 replacement which may advantageously minimize downtime of the manufacturing system. In addition, such an arrangement may minimize hardware costs that would otherwise be incurred if the manufacturing system 100 is configured to store a replacement head module 170 for each lamination head 152 regardless of demand for the layup material based on the ply stacking sequence of the composite laminate.

Referring to FIGS. 34-35, shown is an example of a reloading system 450 that may be included with the manufacturing system 100 to perform automated (e.g., without manual intervention) replacement of a lamination head 152. In one example, the reloading system 450 may be actuated by the controller 110 to replace a lamination head 152 upon depletion of the material roll 224 of lamination head 152 and/or when a lamination head 152 requires maintenance. FIG. 34 is a side view of the manufacturing system 100 showing the reloading system 450 which may extend at least along the length of the lamination station 150. FIG. 35 is a top view of the manufacturing system 100 of FIG. 34. In the example shown, each one of the lamination heads 152 is configured such that a single side (e.g., a first side 158) of the lamination head 152 contains the head components 220 for applying layup material 228 (FIG. 7) to the lamination surface 120, and an opposing side (e.g., the second side 160) of the lamination head 152 may be devoid of head components 220. The reloading system 450 may include a head transfer mechanism 452 which is shown as a generally vertically oriented structural element (e.g., a vertically oriented plate) that may be movable via a linear transfer mechanism (not shown) along one or more horizontal rails 457 extending along a lengthwise direction of the lamination station 150. For example, the horizontal rails 457 may extend between a reloading station 460 and a holding station 462 of the reloading system 450. The reloading station 460 may be configured to support a replacement lamination head 466. The holding station 462 may be configured to support a removed lamination head 468.

In the example of FIGS. 34-37, the reloading system 450 includes a vertically spaced pair of horizontal rails 457 extending between the reloading station 460 and the holding station 462. The head transfer mechanism 452 is configured to move along the horizontal rails 457 and remove one of the lamination heads 152 from the lamination station 150, transport the removed lamination head 468 to the holding station 462 (FIG. 34), retrieve a replacement lamination head 466 from the reloading station 460 (FIG. 34), install the replacement lamination head 466 in the lamination station 150 in place of the removed lamination head 468, and transport the removed lamination head 468 from the holding station 462 to the reloading station 460 for servicing. As mentioned above, servicing a removed lamination head 468 may involve replacing a depleted material roll 224 on the removed lamination head 468 and may additionally involve performing maintenance on the removed lamination head 468. Advantageously, automated replacement of a lamination head 152 may be performed relatively rapidly which may reduce downtime of the manufacturing system 100 and may thereby increase the rate at which composite laminates 400 are manufactured.

FIG. 36 shows an example of a head holder 463 located at the reloading station 460 for supporting a replacement lamination head 466. The manufacturing system 100 may also include a head holder 463 at the holding station 462 for supporting a removed lamination head 468. In the example of FIG. 36, the head holder 463 comprises a cantilevered beam extending laterally outwardly from the reloading system 450. Each head holder 463 may include a reloader coupling element 464 configured to detachably couple to a head coupling element 156 (FIG. 37) that may be included with each lamination head 152. Each reloader coupling element 464 may the detachably coupled to a head coupling element 156 using any one of variety of means including magnetic coupling and/or mechanical coupling. The reloader coupling element 464 of a head holder 463 may be actuated upon command of the controller 110 to attach to and detach from the head coupling element 156 of a lamination head 152.

Figure 39:
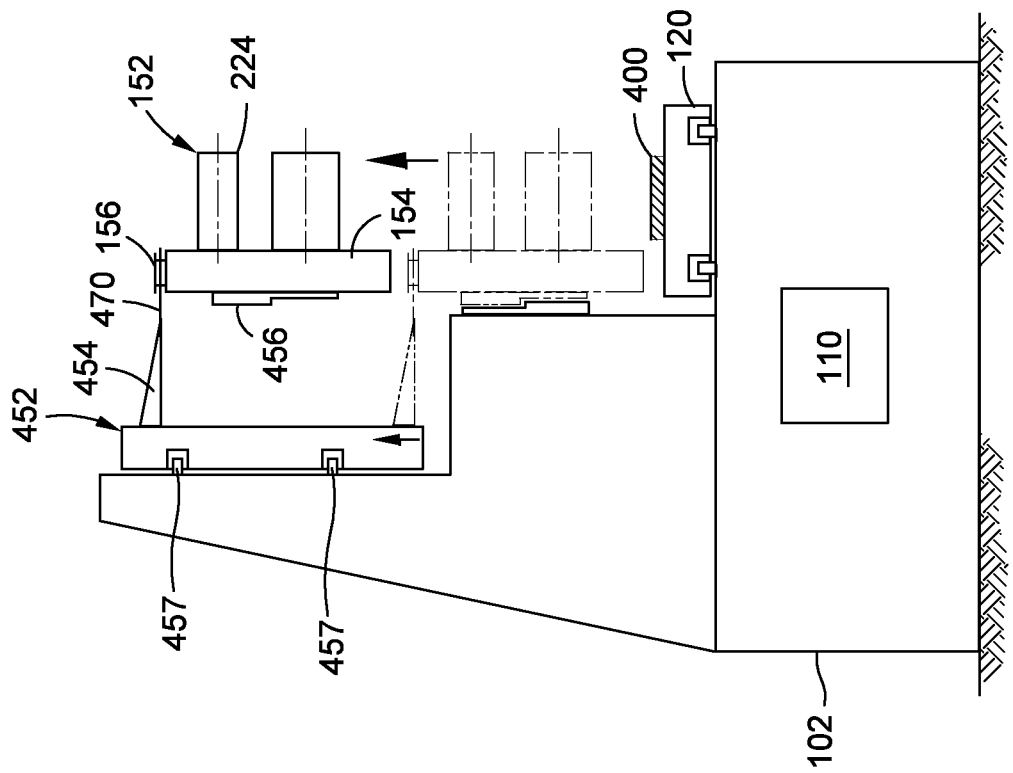
FIG. 39 is a section view of the manufacturing system of FIG. 38 showing the head transfer mechanism vertically translating the lamination head up to the level of the head holder.
Figure 38:
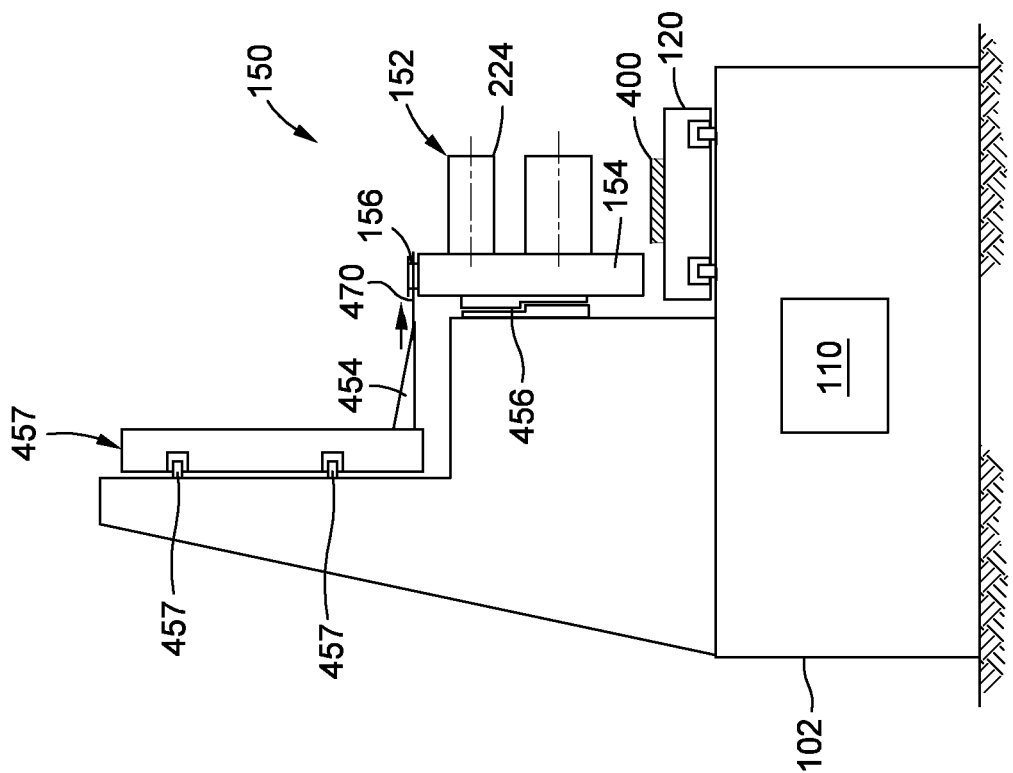
FIG. 38 is a section view of the manufacturing system of FIG. 34-35 showing the head transfer mechanism engaging one of the lamination heads.

In FIGS. 37-39, the head transfer mechanism 452 may include a head engagement beam 454 which may extend laterally outwardly from the head transfer mechanism 452 (e.g., FIG. 37). The head engagement beam 454 may be vertically movable on the head transfer mechanism 452 by means of a linear actuation mechanism (not shown). For example, as shown in FIG. 34, the head transfer mechanism 452 may include one or more vertical rails 458 (FIG. 34) along which the head engagement beam 454 may be vertically translated. Each one of the lamination heads 152 may be detachably supported on a head support beam 456. The head support beam 456 may extend along a lengthwise direction of the lamination station 150 and may be configured to support a series of lamination heads 152 in alignment with each other over the lamination surface 120. In the example shown, the head support beam 456 comprises an assembly in which each one of the lamination heads 152 is independently detachable from the head support beam 456 as the head transfer mechanism 452 engages the head coupling element 156 of one of the lamination heads 152 and upwardly translates the lamination head 152 as described below.

Referring still to FIG. 37-39, the head engagement beam 454 of the head transfer mechanism 452 may include a reloader engagement element 470 (FIGS. 38-39) which may be laterally extendable from the head engagement beam 454 via a linear actuation mechanism (not shown). As shown in FIG. 38, the free end of the reloader engagement element 470 may be configured to engage the head coupling element 156 of one of the lamination heads 152 within the series of lamination heads 152. Once the head coupling element 156 of one of the lamination heads 152 is engaged to the reloader engagement element 470, the head engagement beam 454 may be translated vertically upwardly (FIG. 39) to lift the removed lamination head 468 (FIGS. 34-35) up to the level of the reloader coupling element 464 (FIGS. 34-35) of the head holder 463 at the holding station 462 (FIGS. 34-35).

As shown in FIG. 34 and mentioned above, the head transfer mechanism 452 is configured to transport the removed lamination head 468 to the holding station 462 (FIGS. 34-35) whereupon the reloader coupling element 464 of the head holder 463 may be actuated by the controller 110 to couple with the head coupling element 156 of the removed lamination head 468, thereby transferring the removed lamination head 468 from the head transfer mechanism 452 to the head holder 463. The empty head transfer mechanism 452 may then translate from the holding station 462 to the reloading station 460 whereupon the reloader coupling element 464 of the head holder 463 may be actuated by the controller 110 to release the replacement lamination head 466 to the head transfer mechanism 452. The head transfer mechanism 452 may transport the replacement lamination head 466 from the reloading station 460 to the location within the series of lamination heads 152 formerly occupied by the removed lamination head 468. The head engagement beam 454 may then be translated vertically downwardly to bring the replacement lamination head 466 down to the same level as the remaining lamination heads 152 within the lamination station 150 until the replacement lamination head 466 engages and is supported by the head support beam 456 which may position the replacement lamination head 466 in alignment with the series of lamination heads 152. The reloader engagement element 470 may then be laterally retracted.

Figure 40:
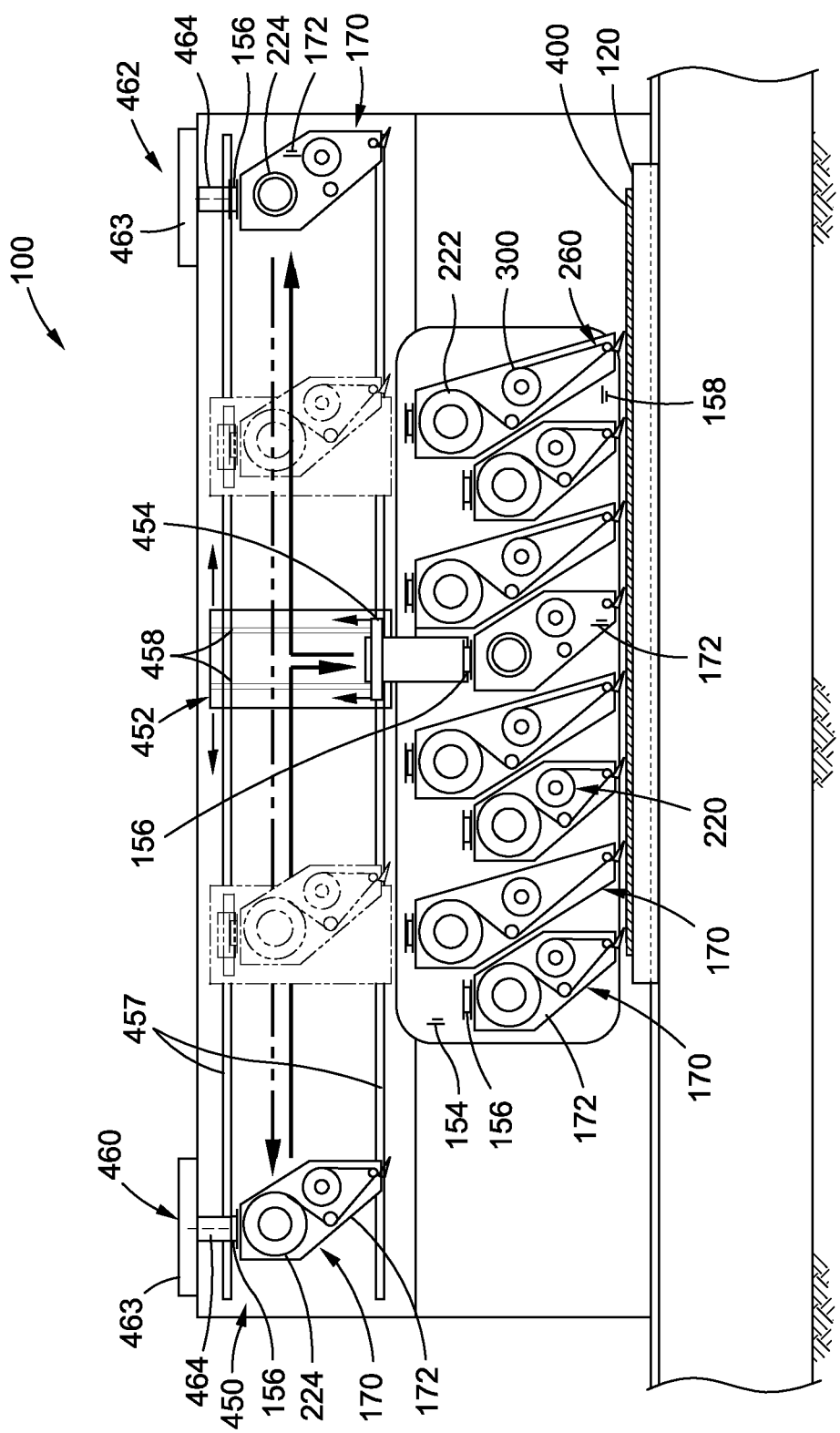
FIG. 40 is a side view of an example of a manufacturing system in which the series of lamination heads is comprised of a series of head modules removably attached to a single head support beam.

Referring to FIG. 40, shown is an example of a manufacturing system 100 having a reloading system 450 and a series of lamination heads 152 configured as head modules 170. The head modules 170 may be coupled to a single, common mounting frame 154. Each one of the head modules 170 may be configured similar to the arrangement of the head module 170 shown in FIG. 29 and described above. For example, each head module 170 in FIG. 40 may have a frame coupling element 172 (e.g., a plate) to which head components 220 (e.g., material supply drum 222, backing layer collection drum 300, material dispensing mechanism 260, etc.) are mounted. The frame coupling element 172 of each head module 170 may include a head coupling element 156 mounted on top of the frame coupling element 172 similar to the head coupling element 156 in FIG. 37. In FIG. 40, the frame coupling element 172 is configured to be removably attached to a single side (e.g., a first side 158 of the mounting frame 154) and the opposing side (e.g., the second side 160) of the mounting frame 154 may be devoid of a frame coupling element 172 and head components 220.

In FIG. 40, the mounting frame 154 of FIG. 40 may be configured similar to the head support beam 456 shown in FIGS. 37-39 and described above. For example, the mounting frame 154 of FIG. 40 may support a series of head modules 170 in alignment with each other over the lamination surface 120 for laying up a composite laminate 400. Each head module 170 may be independently detachable from the mounting frame 154. As described above, the head transfer mechanism 452 may be configured to remove one of the head modules 170 from the mounting frame 154 by engaging the head coupling element 156 and upwardly translating the head module 170. The head transfer mechanism 452 may transport the removed head module 170 to a holding station 462 (e.g., FIG. 34), retrieve a replacement head module 170 from the head holder 463 at a reloading station 460 (e.g., FIG. 34), install the replacement head module 170 in the position formerly occupied by the removed head module 170, and transport the removed head module 170 from the holding station 462 to the reloading station 460 for servicing such as replacing the material roll 224 on the removed head module 170 and/or performing maintenance on the head components 220 of the removed head module 170.

Referring to FIGS. 41-44, shown are a series of top views of an example of a manufacturing system 100 in which the composite laminate 400 is laid up during translation of the lamination surface 120 along a first direction of travel 128 through the lamination station 150 and in which the composite laminate 400 is concurrently trimmed, after which the lamination surface 120 and composite laminate 400 are translated back through the lamination station 150 in an opposite direction along a second direction of travel 130. For example, FIG. 41 shows the initial position of the lamination mandrel 122 in a lamination surface home position 134 after the lamination mandrel 122 has been laterally moved from the lamination surface staging position 132 to the lamination surface home position 134. FIG. 42 shows the lamination mandrel 122 moving through the lamination station 150 along a first direction of travel 128 while the composite laminate 400 is being laid up by lamination heads 152. In one example, the lamination heads 152 may be limited to applying layup material 228 to the lamination surface 120 moving along a single direction of travel (e.g., the first direction of travel 128), and the lamination heads 152 may be incapable of applying layup material 228 to the lamination surface 120 when moving along the second direction of travel 130 opposite the first direction of travel 128.

Alternatively, in an embodiment not shown, the lamination heads 152 may be limited to applying layup material 228 to the lamination surface 120 moving along the second direction of travel 130, and the lamination heads 152 may be incapable of applying layup material 228 to the lamination surface 120 moving along the first direction of travel 128. In FIG. 42, the composite laminate 400 is shown being trimmed by trimming devices 312 as the lamination mandrel 122 exits the lamination station 150 and passes through the trimming station 310 located between the lamination station 150 and the lamination surface aft position 136, and illustrating concurrent lamination and trimming of the composite laminate 400. FIG. 43 shows the lamination mandrel 122 in the lamination surface aft position 136 and supporting the composite laminate 400 in a trimmed condition.

FIG. 44 shows the lamination mandrel 122 after translating along a second direction of travel 130 back through the lamination station 150 to the lamination surface home position 134. In some examples, the lamination heads 152 may apply additional layup material 228 onto the composite laminate 400 as the lamination mandrel 122 moves through the through the lamination station 150 along a second direction of travel 130 which may require that one or more of the lamination heads 152 have bi-directional layup capability as described below. In FIG. 44, the lamination mandrel 122 may be laterally transferred from the lamination surface home position 134 to a lamination surface off-loading position 138 via a conveyor system (not shown) or a robotic system (not shown). With the lamination mandrel 122 in the lamination surface off-loading position 138, the lamination mandrel 122 with composite laminate 400 may be off-loaded to another manufacturing site or location for further processing of the composite laminate 400 such as secondary trimming, debulking, forming, and/or curing. Alternatively, the composite laminate 400 may be off-loaded or removed from the lamination mandrel 122, and the lamination mandrel 122 may be circulated back to the lamination surface staging position 132. In some examples prior to off-loading, the composite laminate 400 may be pre-kitted with materials and components used in post-processing of the composite laminate 400. For example, the composite laminate 400 may be pre-kitted with peel ply, release film, breather cloth, bagging film, bladders, edge sealant, vacuum fittings, caul plates, radius fillers, and any one or more of a variety of other materials and/or components that may be used in any one a variety of post-processing operations.

Figure 45:
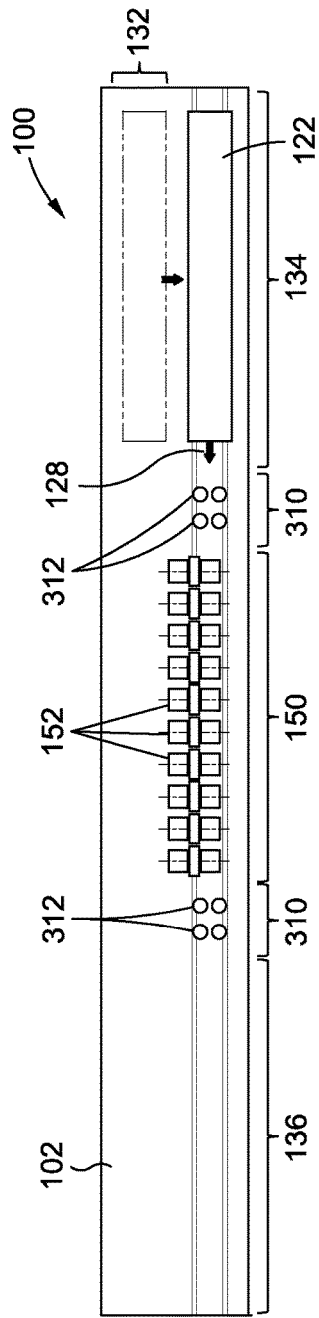
FIG. 45 is a top view of an example of a manufacturing system showing a lamination mandrel in a lamination surface home position during an initial stage of manufacturing a composite laminate involving lamination of the composite laminate as the lamination mandrel moves through the lamination station along a second direction of travel.
Figure 46:
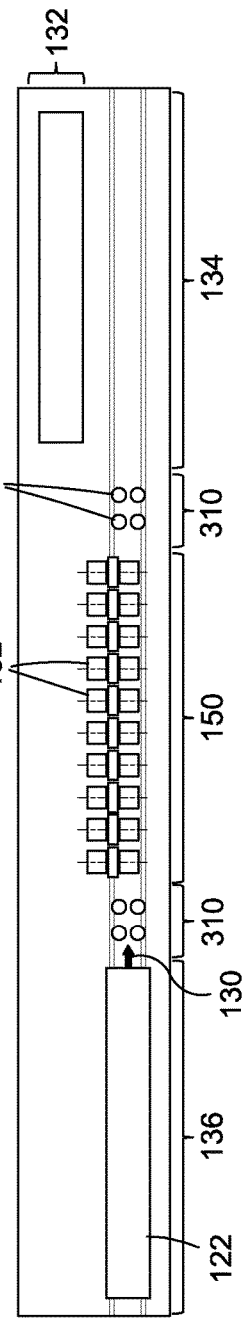
FIG. 46 is a top view of the manufacturing system of FIG. 45 showing the lamination mandrel in the lamination surface aft position and supporting a composite laminate in an untrimmed condition.

Referring to FIGS. 45-48, shown are a series of top views of an example of a manufacturing system 100 having lamination heads 152 which, in some examples, may be limited to dispensing layup material 228 along a single dispensing direction 204 (FIG. 7). However, in an embodiment not shown, the lamination heads (not shown) may have bi-directional layup capability in which the head components 220 are configured to dispense layup material 228 in either of opposing directions. In FIGS. 45-48, a composite laminate 400 is translated along the first direction of travel 128 through the lamination station 150 without any of the lamination heads 152 applying layup material 228, after which the lamination mandrel 122 is laid up while being translated back through the lamination station 150 along the second direction of travel 130. Also shown is the composite laminate 400 being trimmed while exiting the lamination station 150 and moving toward the lamination surface home position 134. FIG. 45 shows the lamination mandrel 122 initially located in the lamination surface home position 134. FIG. 46 shows the lamination mandrel 122 in the lamination surface aft position 136 after passing through the lamination station 150 without any of the lamination heads 152 applying layup material 228.

Figure 47:
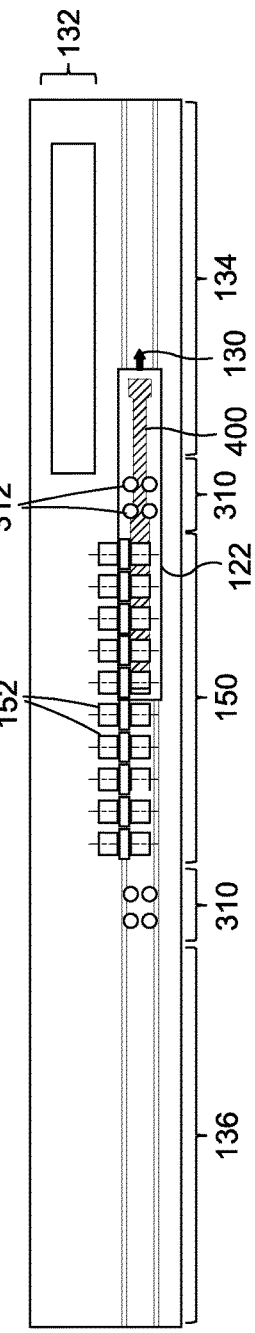
FIG. 47 is a top view of the manufacturing system of FIG. 46 showing the lamination mandrel moving along the second direction of travel from the lamination station through a trimming station back toward the lamination surface home position.
Figure 48:
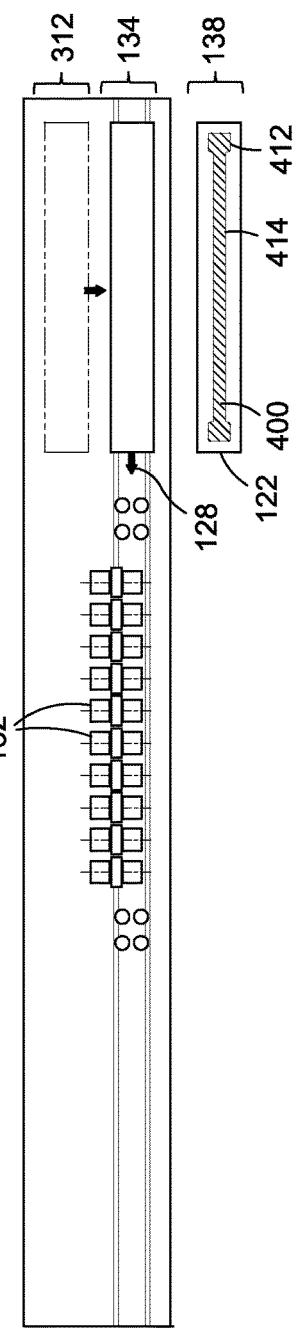
FIG. 48 is a top view of the manufacturing system of FIG. 47 showing the lamination mandrel in a lamination surface off-loading position and supporting a composite laminate in the trimmed condition.

FIG. 47 shows the lamination mandrel 122 moving along the second direction of travel 130 while the lamination heads 152 are applying layup material 228 to lay up a composite laminate 400 which is being trimmed by the trimming station 310 as the lamination mandrel 122 exits the lamination station 150 and moves toward the lamination surface home position 134. FIG. 48 shows the lamination mandrel 122 in the lamination surface off-loading position 138 after having been laterally moved from the lamination surface home position 134.

Advantageously, the example of the manufacturing system 100 of FIGS. 45-48 allows for the loading and unloading of lamination mandrels 122 at the same location (e.g., the lamination surface home position 134) which may reduce the amount of factory floorspace required for operating the manufacturing system 100 relative to an arrangement in which the lamination mandrel 122 is loaded onto the manufacturing system 100 at one end of the manufacturing system 100 (e.g., at the lamination surface home position 134) and the lamination mandrel 122 is off-loaded from the manufacturing system 100 at an opposite end of the manufacturing system 100.

Although the manufacturing systems 100 in FIGS. 41-44, 45-48, and 51-54 include a trimming station 310 at each of opposing ends of the lamination station 150, a manufacturing system 100 may be limited to a single trimming station 310 located proximate one of opposing ends of the lamination station 150. For example, a manufacturing system 100 may be provided with a single trimming station 310 located on the end of the lamination station 150 that is downstream of the end from which the composite laminate 400 exits the lamination station 150, such that trimming may occur concurrent with the laying up of the composite laminate 400. However, by providing trimming stations 310 at each of opposing ends of the lamination station 150, the manufacturing system 100 may be operated in a manner allowing the laying up of composite laminates 400 on a lamination surface 120 moving along the first direction of travel and/or along the second direction of travel and which may provide flexibility regarding location and/orientation for installing the manufacturing system 100 within a manufacturing facility based on available floorspace and/or direction of production flow within the manufacturing facility.

Referring to FIG. 49, shown is an end view of an example of a manufacturing system 100 configured to laterally move lamination mandrels 122 in an in-plane direction between the lamination surface staging position 132, the lamination surface home position 134, and the lamination surface off-loading position 138. For example, the manufacturing system 100 may include a conveyor system (not shown) or a system of rails (not shown) and a linear actuator mechanism (not shown) for in-plane movement of a first lamination mandrel 122*a* from the lamination surface staging position 132 to the lamination surface home position 134 prior to translating the first lamination mandrel 122*a* through the lamination station 150 for laying up and trimming a first composite laminate 400*a*. After the first lamination mandrel 122*a*/first composite laminate 400*a* has returned to the lamination surface home position 134, the manufacturing system 100 (e.g., conveyor system, system of rails—not shown) may be configured for in-plane movement of the first lamination mandrel 122*a*/first composite laminate 400*a* from the lamination surface home position 134 to the lamination surface off-loading position 138 as shown in FIG. 49, and a second lamination mandrel 122*b* may be moved into the lamination surface home position 134 prior to being translated through the lamination station 150 for laying up a second composite laminate 400*b* while the first composite laminate 400*a* is off-loaded from the first lamination mandrel 122*a* followed by in-plane translation of the first lamination mandrel 122*a* to the lamination surface staging position 132. The above-described process of alternatingly laying up a composite laminate 400 on a first lamination mandrel 122*a* and a second lamination mandrel 120*b* may be repeated any number of times.

Referring to FIG. 50, shown is an end view of an example of an embodiment of a manufacturing system 100 having a lamination surface home position 134 and a lamination surface off-loading position 138, and lacking a lamination surface staging position 132. The manufacturing system 100 of FIG. 50 may be configured to move lamination mandrels 122 in a combination of in-plane movement and out-of-plane movement (e.g., vertical movement) using one or more of a variety of mechanisms including the above-mentioned conveyor system (not shown), a rail system (not shown), an autonomous vehicle (not shown), and/or using an overhead gantry (not shown), a robotic device (not shown) or other mechanisms. After a first lamination mandrel 122*a* has passed through the lamination station 150 and a first composite laminate 400*a* has been laid up and trimmed and the first lamination mandrel 122*a* has returned to the lamination surface home position 134, the first lamination mandrel 122*a*/first composite laminate 400*a* may be laterally moved in an in-plane direction from the lamination surface home position 134 to the lamination surface off-loading position 138 as shown in FIG. 50, and the first composite laminate 400*a* may be off-loaded from the first lamination mandrel 122*a* while a second lamination mandrel 122*b* is moved into the lamination surface home position 134 prior to passing the second lamination mandrel 122*b* through the lamination station 150 for laying up a second composite laminate 400*b* after which the second lamination mandrel 122*b*/second composite laminate 400*b* return to the lamination surface home position 134. The second lamination mandrel 122*b*/second composite laminate 400*b* may be laterally moved in an in-plane direction from the lamination surface home position 134 to the lamination surface off-loading position 138 while the first lamination mandrel 122*a* is lifted off of the lamination surface off-loading position 138 and lowered onto the lamination surface home position 134. The above-described process of alternatingly laying up a composite laminate 400 on two different lamination mandrels 122 may be repeated any number of times.

The technical effect of the arrangements shown in FIGS. 49 to 50 is the ability to increase the rate at which composite laminates 400 are laid up by circulating multiple lamination mandrels 122 between the lamination surface home position 134, lamination surface staging position 132, and lamination surface off-loading position 138 (FIG. 49) or between the lamination surface home position 134 and the lamination surface off-loading position 138 (FIG. 50). Selection between the arrangement of FIG. 49 and the arrangement of FIG. 50 may be based on the configuration of the production facility into which the manufacturing system 100 is to be installed, and may include a consideration of a variety of factors such as floor space limitations and/or vertical space constraints. In an embodiment not shown, a manufacturing system 100 may include a single lamination mandrel 122 for laying up a composite laminate 400 and which may involve moving the lamination mandrel 122/composite laminate 400 from the lamination surface home position 134 to the lamination surface off-loading position 138 for offloading of the composite laminate, followed by moving the off-loaded lamination mandrel 122 back to the lamination surface home position 134 in preparation for another pass through the lamination station 150 for laying up another composite laminate 400.

In any one of the embodiments disclosed herein, the manufacturing system 100 may be operated in a manner such that at least two (2) lamination mandrels 122 (e.g., a first lamination mandrel 122a and a second lamination mandrel 122b) are shifted between two (2) or more positions such as the lamination surface home position 134 and an adjacent position (e.g., the lamination surface staging position 132 and/or the lamination surface off-loading position 138). By operating the manufacturing system 100 in the above-described manner with at least two (2) lamination mandrels 122, the manufacturing system 100 may have one lamination mandrel 122 moving through the manufacturing system 100 (e.g., through the lamination station 150) for laying up a new composite laminate 400 while the remaining lamination mandrel 122 is being cleared (e.g., off-loaded) of a just-completed composite laminate 400 which may be transported to another location (not shown) for further processing such as secondary trimming, debulking, forming, and/or curing.

Figure 51:
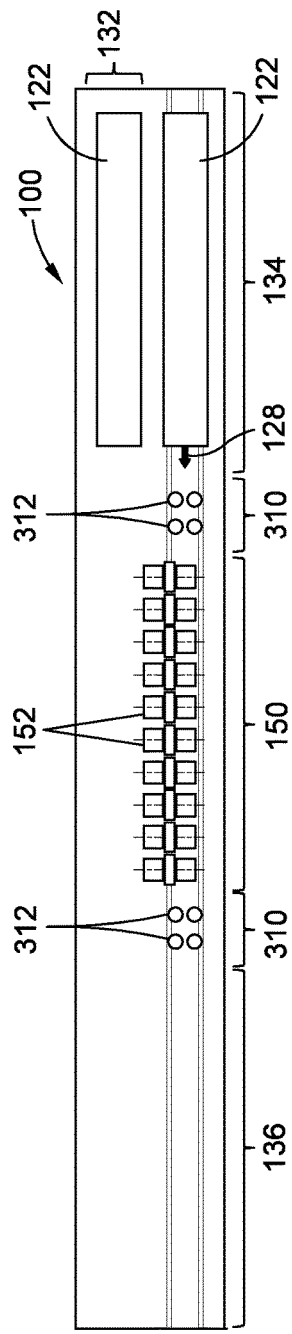
FIG. 51 is a top view of an example of a manufacturing system showing a lamination mandrel in the lamination surface home position during an initial stage of manufacturing a composite laminate involving concurrent lamination and trimming of the composite laminate during movement of the lamination mandrel along a first direction of travel, followed by movement of the lamination mandrel back to the lamination mandrel home position and bypassing the lamination station.
Figure 52:
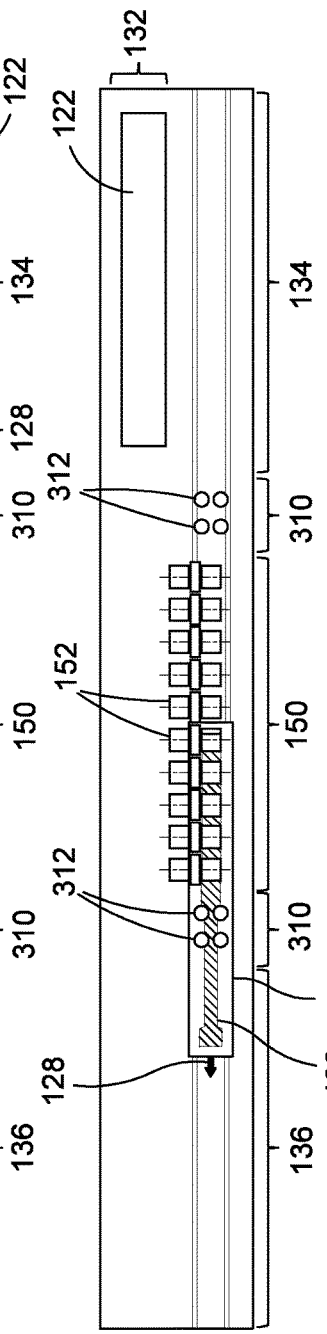
FIG. 52 is a top view of the manufacturing system of FIG. 51 showing the lamination mandrel moving along the first direction of travel through the lamination station and trimming station toward the lamination surface aft position.
Figure 53:
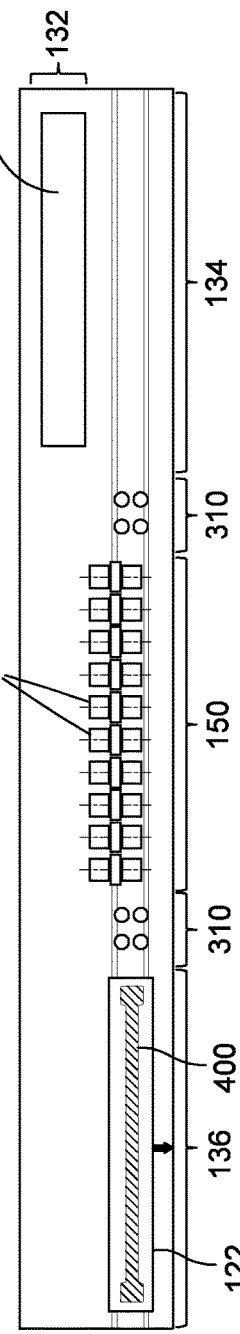
FIG. 53 is a top view of the manufacturing system of FIG. 52 illustrating the lamination mandrel in the lamination surface aft position and supporting a composite laminate in a trimmed condition.
Figure 54:
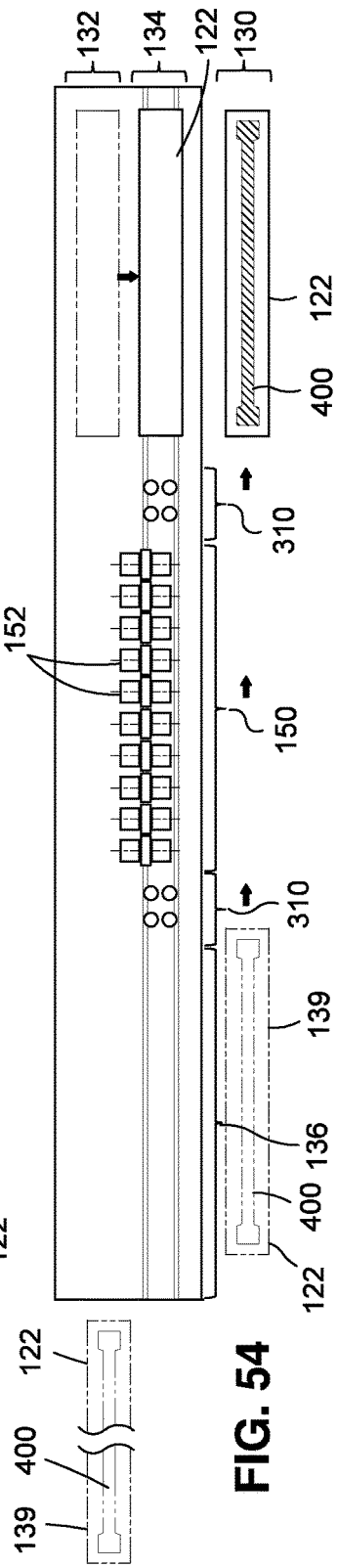
FIG. 54 is a top view of the manufacturing system of FIG. 53 after movement of the lamination mandrel back to the lamination mandrel home position and bypassing the lamination station.

Referring to FIGS. 51-54, shown are a series of top views of an example of a manufacturing system 100 in a loop method of laying up a composite laminate 400 during which the lamination mandrel 122 is translated through the lamination station 150 along a first direction of travel 128, and bypasses the lamination station 150 during the return back to the lamination surface home position 134. For example, FIG. 51 shows the initial position of the lamination mandrel 122 after having been laterally moved from the lamination surface staging position 132 to the lamination surface home position 134. FIG. 52 shows the lamination mandrel 122 moving along the first direction of travel 128 through the lamination station 150 and trimming station 310 toward the lamination surface aft position 136. FIG. 53 shows the lamination mandrel 122 in the lamination surface aft position 136 and supporting a composite laminate 400 in a trimmed condition. FIG. 54 shows the lamination mandrel 122 back in the lamination mandrel 122 home position after bypassing the lamination station 150. Although not shown, the manufacturing system 100 may include one or more conveyor systems, robotic devices, or other mechanisms as mentioned above for transferring the lamination mandrel 122 from the lamination surface aft position 136 to the lamination surface off-loading position 138 while bypassing the lamination station 150. As mentioned above, a manufacturing system 100 may be limited to a single trimming station 310 located proximate one of opposing ends of the lamination station 150. For example, a manufacturing system 100 may be limited to a single trimming station 310 located downstream of the exit of a composite laminate 400 from the lamination station 150.

Figure 55:
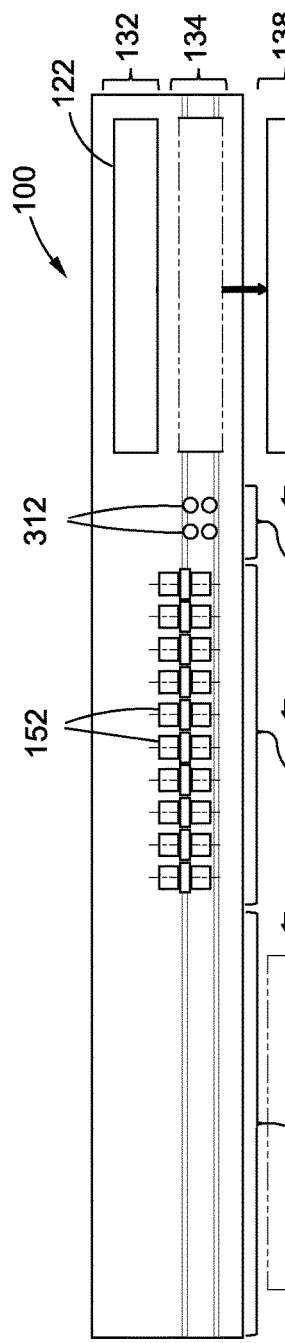
FIG. 55 is a top view of an example of a manufacturing system showing a lamination mandrel in the lamination surface home position during an initial stage of manufacturing a composite laminate involving concurrent lamination and trimming of the composite laminate during movement of the lamination mandrel bypassing the lamination station toward the lamination station aft position, followed by movement of the lamination mandrel along a second direction of travel for concurrent lamination and trimming of the composite laminate.

Referring to FIGS. 55-58, shown are a series of top views of an example of a manufacturing system 100 in an alternative loop method of laying up a composite laminate 400 during which the lamination mandrel 122 initially bypasses the lamination station 150 while moving along a first direction of travel 128, and the composite laminate 400 is laid up and trimmed as the lamination mandrel 122 moves through the lamination station 150 along a second direction of travel 130. FIG. 55 shows the initial position of the lamination mandrel 122 after having been moved from the lamination surface home position 134 to the lamination surface off-loading position 138. As mentioned above with regard to FIGS. 51-54, the manufacturing system 100 may include one or more mechanism such as conveyor systems (not shown) and/or robotic devices (not shown) for transferring the lamination mandrel 122 from the lamination surface off-loading position 138 to the lamination surface aft position 136 while bypassing the lamination station 150.

Figure 56:
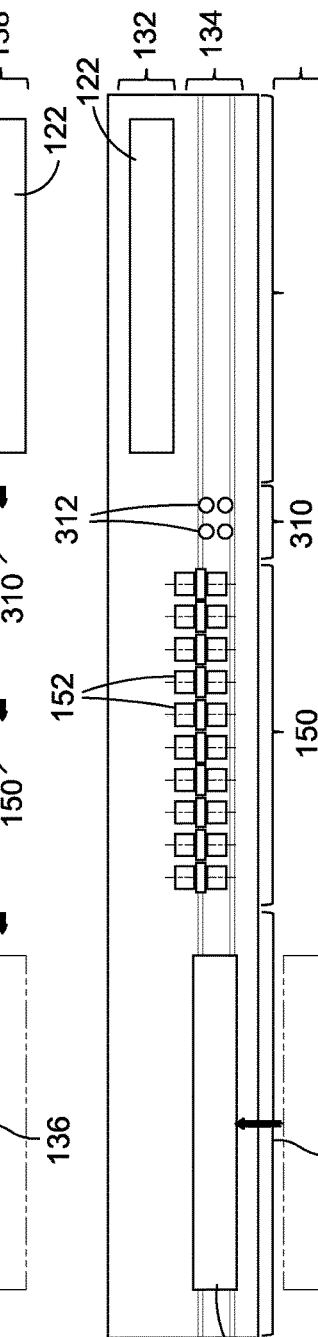
FIG. 56 is a top view of the manufacturing system of FIG. 55 showing the lamination mandrel in the lamination surface aft position.
Figure 57:
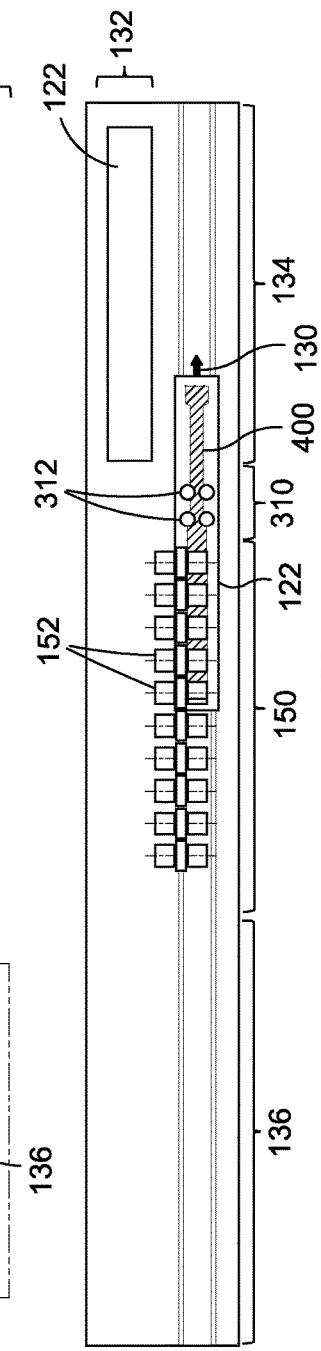
FIG. 57 is a top view of the manufacturing system of FIG. 56 showing the concurrent lamination and trimming of the composite laminate during movement of the lamination mandrel along the second direction of travel through the lamination station and trimming station.
Figure 58:
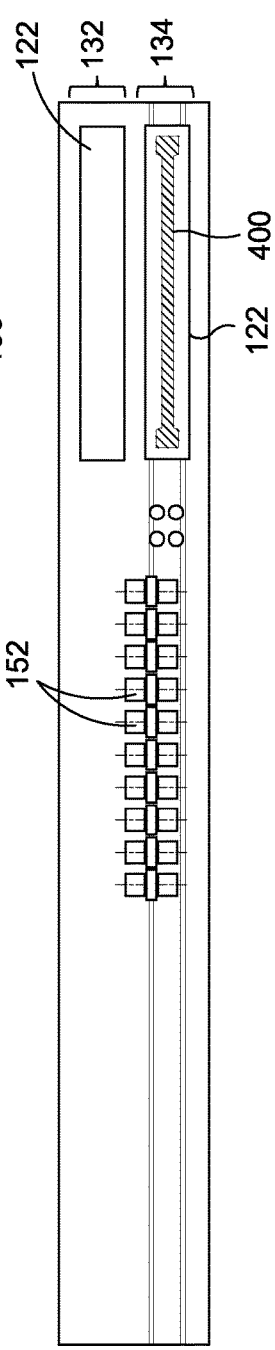
FIG. 58 is a top view of the manufacturing system of FIG. 57 showing the lamination mandrel in the lamination surface home position and supporting a composite laminate in a trimmed condition.

FIG. 56 shows the lamination mandrel 122 in the lamination surface aft position 136 after bypassing the lamination station 150. FIG. 57 shows concurrent lamination and trimming of the composite laminate 400 during movement of the lamination mandrel 122 along the second direction of travel 130 through the lamination station 150 and the trimming station 310 toward the lamination surface home position 134. FIG. 58 shows the lamination mandrel 122 in the lamination surface home position 134 and supporting the composite laminate 400 in the trimmed condition. Advantageously, the above-described loop method of laying up a composite laminate 400 as illustrated in FIGS. 51-54 and in FIGS. 55-58 may allow for relatively high rates of manufacturing of composite laminates 400 enabled by the increased frequency with which lamination mandrels 122 may be translated through the lamination station 150.

As mentioned above, one or more of the lamination heads 152 may have bi-directional layup capability in which the lamination head 152 is capable of dispensing layup material 228 onto a lamination surface 120 moving along both the first direction of travel 128 and along the second direction of travel 130. Advantageously, bi-directional layup capability allows a lamination head 152 to dispense layup material 228 as one or more lamination mandrels 122 pass through the lamination station 150 along both a first direction of travel 128 and along a second direction of travel 130, and which allows for laying up a composite laminate 400 having a larger laminate thickness in a shorter period of time than would be achievable if the lamination station 150 included lamination heads 152 that were limited to dispensing layup material 228 onto one or more lamination mandrels 122 moving along a single direction (e.g., only the first direction of travel 128 or only the second direction of travel 130). Example lamination head 152 may be implemented in any one of the above-described manufacturing system 100 embodiments. Additionally, in some examples, the lamination head 152 may have self-threading capability allowing for autonomous (e.g., without manual intervention) threading of backed material 226 (e.g., layup material 228 backed by a backing layer 230) through the lamination head 152 as may be required each time a new material roll 224 is installed on the material supply drum 222. A lamination head 152 lacking bi-directional layup capability but having self-threading capability may be used in any one of the manufacturing systems 100 disclosed herein. Likewise, a lamination head 152 lacking self-threading capability but having bi-directional layup capability may be used in any one of the manufacturing systems 100 disclosed herein.

Figure 59:
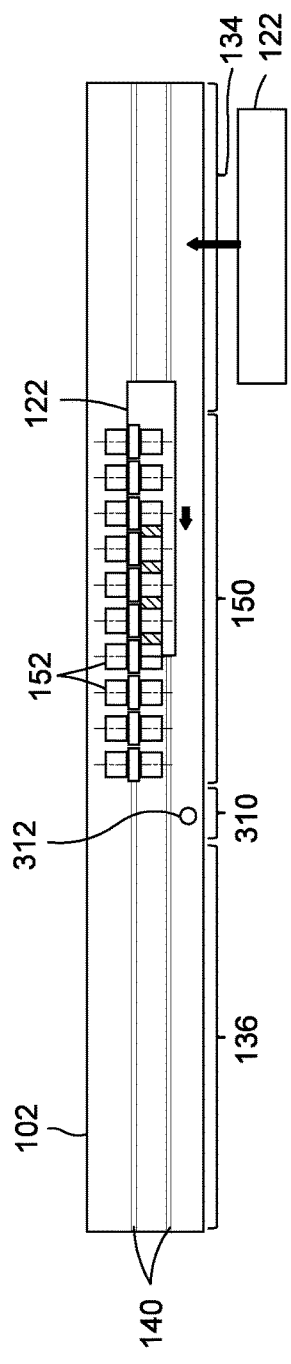
FIG. 59 is a top view of an example of a manufacturing system in an initial stage of continuous layup of a composite laminate on an end-to-end series of lamination mandrels continuously movable through the lamination station.

Referring to FIGS. 59-62, shown is an example of manufacturing system 100 in which the lamination heads 152 are configured to continuously dispense layup material 228 onto the lamination surface 120. The manufacturing system 100 includes one or more trimming devices 312 configured to periodically cut the composite laminate 400 along a transverse direction to divide the composite laminate 400 into end-to-end lengthwise segments 401. In FIGS. 59-62, the lamination surface 120 comprises a series of lamination mandrels 122 arranged in end-to-end relation to each other. The series of end-to-end lamination mandrels 122 may optionally the linked or coupled together such as via a mechanical linkage (not shown) between each adjacent pair of lamination mandrels 122. As mentioned above, the lamination mandrels 122 may be slightly spaced apart or may be butted against each other. The manufacturing system 100 is configured for continuous laying up of a composite laminate 400 on the end-to-end lamination mandrels 122. The one or more trimming devices 312 are configured to form transverse cuts 314 in the composite laminate 400 exiting the lamination station 150, and thereby divide the continuous composite laminate 400 into a series of end-to-end lengthwise segments 401. FIG. 59 is a top view of the manufacturing system 100 during an initial stage of the process of laying up a composite laminate 400 showing a lamination mandrel 122 moving along the base member 102 from the lamination surface home position 134 into the lamination station 150. Additional lamination mandrels 122 may be mounted on the base member 102 in butted end-to-end relation to each lamination mandrel 122 currently entering the lamination station 150.

Figure 60:
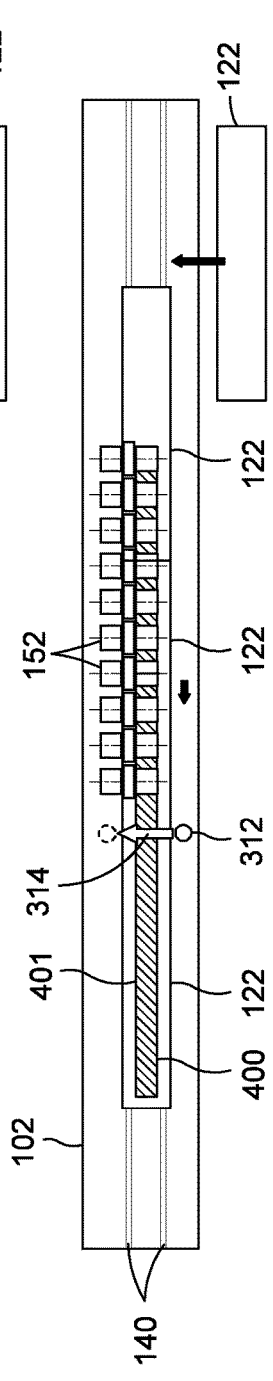
FIG. 60 is a top view of the manufacturing system of FIG. 59 showing the layup of a composite laminate on the series of lamination mandrels and also showing a trimming device forming a transverse cut in the composite laminate to divide the composite laminate into end-to-end lengthwise segments.
Figure 61:
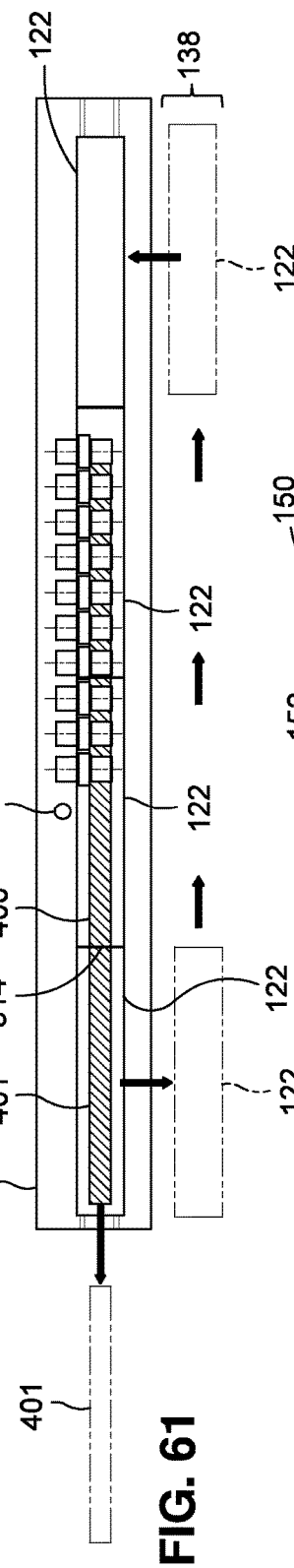
FIG. 61 is a top view of the manufacturing system of FIG. 59 showing one of the lamination mandrels in the lamination surface aft position and illustrating in phantom lines a lengthwise segment of the composite laminate after off-loading from the lamination mandrel.
Figure 62:
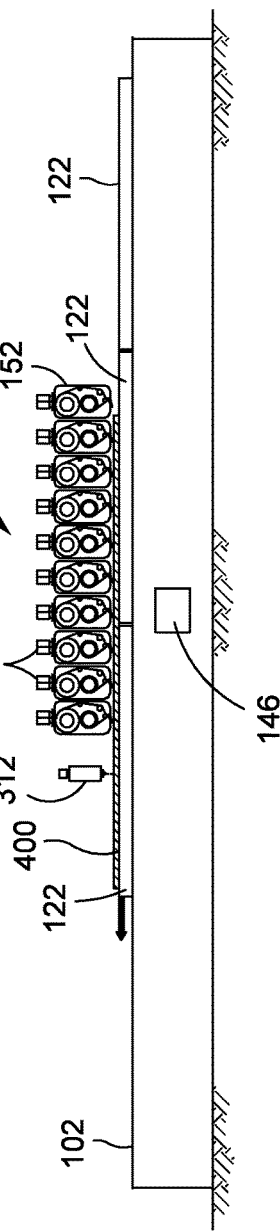
FIG. 62 is a side view of the manufacturing system of FIG. 61 showing the continuous laying up of a composite laminate on the end-to-end series of lamination mandrels moving through the lamination station.

For example, as shown in FIG. 60, additional lamination mandrels 122 may be sequentially mounted on the base member 102 in butted end-to-end relation to each other for continuous movement through the lamination station 150. Also shown in FIG. 60 is a portion of the composite laminate 400 supported on lamination mandrels 122 exiting the lamination station 150. In addition, shown is a trimming device 312 configured to move along a transverse direction relative to the lengthwise direction of the composite laminate 400 to form a transverse cut 314 in the composite laminate 400 to divide the composite laminate 400 into end-to-end lengthwise segments 401. Although FIG. 60 illustrates the trimming device 312 forming a transverse cut 314 in the composite laminate 400 at a location where a pair of lamination mandrels 122 are butted against each other, a transverse cut 314 may be formed at any location along the composite laminate 400 for dividing the composite laminate 400 into lengthwise segments 401 of any length regardless of the length of each individual lamination mandrel 122. FIG. 61 is a top view of the manufacturing system 100 showing one of the lamination mandrels 122 in the lamination surface aft position 136 and showing a lengthwise segment 401 positioned on top of the lamination mandrel 122. Also shown in phantom lines is a lamination mandrel 122 after off-loading from the base member 102. In addition, shown in phantom lines is a lengthwise segment 401 of the composite laminate 400 after off-loading from the lamination mandrel 122. FIG. 62 is a side view of the manufacturing system 100 showing the series of end-to-end lamination mandrels 122 moving through the lamination station 150 and illustrating the continuous laying up of the composite laminate 400 on the lamination mandrels 122.

In FIGS. 59-62, the lengthwise segments 401 may be sequentially off-loaded from the lamination surface 120 as each lengthwise segment 401 arrives at the lamination surface aft position 136. In one example, each lengthwise segment 401 may be off-loaded by a segment removal mechanism (not shown) such as a pick-and-place machine located at the lamination surface aft position 136. Alternatively, the lengthwise segments 401 may be off-loaded using one or more robotic devices or any one of a variety of other means configured to lift each lengthwise segment 401 off of a lamination mandrel 122 for optional transporting to another location for post-processing. In a still further example, the lengthwise segments 401 may be manually off-loaded using one or more technicians. After off-loading of one or more lengthwise segments 401 supported on a lamination mandrel 122, the lamination mandrel 122 may be circulated via a conveyor system (not shown), robotic device and (not shown), autonomous vehicle (not shown), manual transportation, or other mechanism back to the lamination surface home position 134 and may be re-mounted on the base member 102 in line behind the rearmost lamination mandrel 122 on the manufacturing system 100.

In an embodiment not shown, one or more trimming devices 312 may be configured to form transverse cuts 314 to divide the composite laminate 400 while the lamination surface 120 continues moving the composite laminate 400 along the manufacturing system 100. Alternatively, the movement of the lamination surface 120 may be temporarily halted to allow a trimming device 312 to move across the width of the composite laminate 400 to form a transverse cut 314. Although not shown, the manufacturing system 100 may include additional trimming devices 312 configured to trim the side edges of a composite laminate 400 prior to, during, or after the composite laminate 400 is divided into lengthwise segments 401.

During the laying up of the composite laminate 400 and/or during the cutting and/or trimming of the composite laminate, the composite laminate 400 may be secured to the lamination mandrels 122 via vacuum pressure generated by a vacuum pressure source 146 (FIG. 62) fluidly coupled to a plurality of apertures 144 (FIG. 6) that may optionally be formed in the outer surface of the lamination mandrels 122. As described above, a layer of peel ply (not shown) may be applied to the lamination mandrels 122 prior to the dispensing of layup material 228 by the lamination heads 152. The vacuum pressure may secure the peel ply to the lamination mandrels 122, and the layup material 228 may have a level of tackiness that adheres to the peel ply to prevent shifting of the layup material 228 during dispensing onto the lamination mandrel 122 and/or during cutting or trimming of the composite laminate 400. Alternatively, the peel ply may be omitted and the vacuum pressure may be applied directly to the first layer of layup material dispensed onto the lamination mandrels 122.

Referring to FIGS. 63-66, shown is a further example of a manufacturing system 100 configured for continuous lamination of a composite laminate 400. The manufacturing system 100 has a series of lamination heads 152 statically positioned in end-to-end relation to each other and defining a lamination station 150. Each lamination head 152 within the series is configured to dispense layup material 228 along a dispensing direction 204 (FIG. 7). The manufacturing system 100 includes a lamination belt 124 having an outer surface that is movable underneath the lamination station 150 along a direction generally aligned with the dispensing direction 204. The lamination heads 152 are configured to sequentially apply the layup material 228 onto the outer surface of the lamination belt 124 and onto previously applied layup material 228 as the outer surface of the lamination belt 124 moves through the lamination station 150 to thereby form a composite laminate 400 having a stack of composite plies arranged in a desired ply stacking sequence defined by positions of the lamination heads 152 relative to each other within the lamination station 150.

Figure 63:
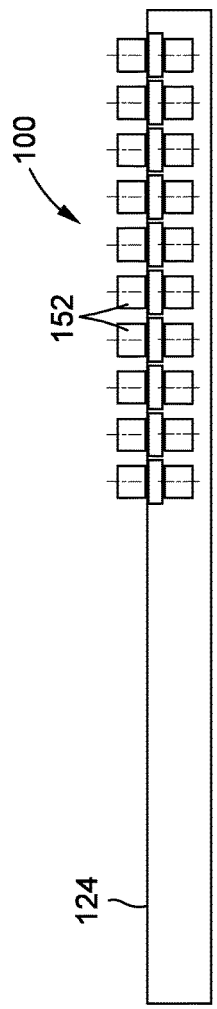
FIG. 63 is a top view of an example of a manufacturing system in an initial stage of continuous layup of a composite laminate on a continuous loop lamination belt.

The manufacturing system 100 additionally includes one or more trimming devices 312 located downstream of the lamination station 150 and configured to periodically form transverse cuts 314 in the composite laminate 400 to divide the composite laminate 400 into lengthwise segments 401. FIG. 63 is a top view of the manufacturing system 100 prior to the dispensing of layup material 228 onto the moving lamination belt 124. In some examples, one of the lamination heads 152 in the lamination station 150 may be configured to dispense a protective layer of peel ply onto the outer surface of the lamination belt 124 prior to the dispensing of layup material 228 by the remaining lamination heads 152 in the lamination station 150. Similar to the above-described optional arrangement for the lamination mandrels 122, the lamination belt 124 may include a plurality of apertures 144 (FIG. 6) which may be fluidly coupled to a vacuum pressure source 146 (FIG. 66) for generating vacuum force between the outer surface of the lamination belt 124 and the layup material 228 dispensed by the lamination heads 152. The vacuum force may secure the peel ply to the lamination belt 124, and the layup material 228 may adhere to the peel ply to thereby prevent shifting of the composite laminate 400 relative to the lamination belt 124 during the process of laying up, trimming and/or cutting the composite laminate 400.

Figure 64:
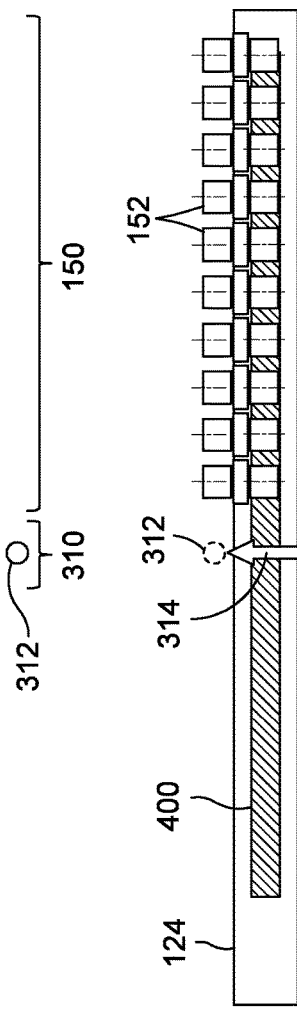
FIG. 64 is a top view of the manufacturing system of FIG. 63 showing the showing the continuous laying up of a composite laminate and also showing a trimming device forming a transverse cut in the composite laminate to divide the composite laminate into end-to-end lengthwise segments.

FIG. 64 is a top view of the manufacturing system 100 showing the continuous laying up of a composite laminate 400 within the lamination station 150 and showing a portion of the composite laminate 400 after exiting the lamination station 150. Also shown is a trimming device 312 forming a transverse cut 314 in the composite laminate 400 to divide the composite laminate 400 into end-to-end lengthwise segments 401. As mentioned above with regard to the manufacturing system 100 embodiment illustrated in FIGS. 59-62, the one or more trimming devices 312 in the manufacturing system 100 of FIGS. 63-66 may be configured to transversely cut the composite laminate 400 while the movement of the lamination belt 124 is temporarily paused, after which the lamination belt 124 may be restarted. Alternatively, the one or more trimming devices 312 may be configured to form transverse cuts 314 while the lamination belt 124 continues moving, as described above. In addition to forming transverse cuts 314, the manufacturing system 100 may include one or more trimming devices 312 configured to trim the composite laminate 400 such as trimming the side edges or other portions of the composite laminate 400.

Figure 65:
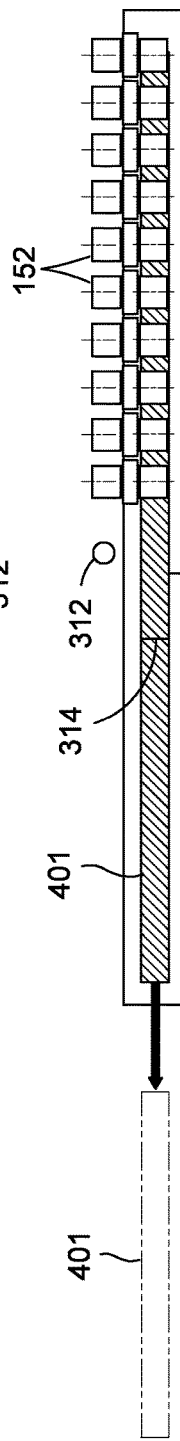
FIG. 65 is a top view of the manufacturing system of FIG. 64 showing in phantom lines a lengthwise segment of the composite laminate after off-loading from the lamination belt.
Figure 66:
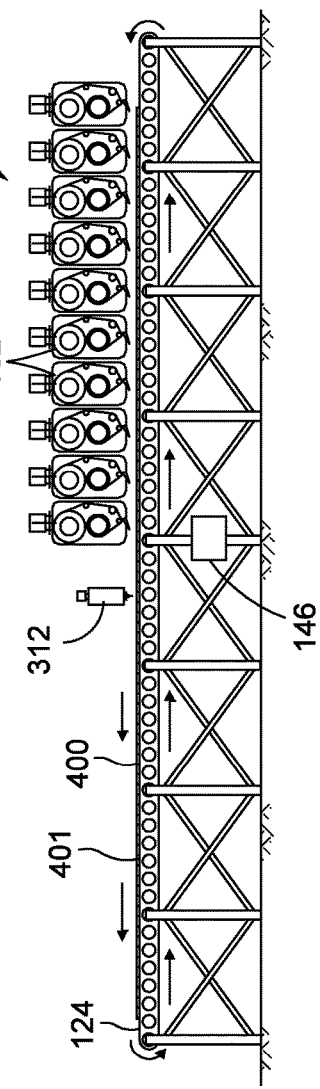
FIG. 66 is a side view of the manufacturing system of FIG. 65 showing the continuous laying up of a composite laminate on the lamination belt.

FIG. 65 is a top view of the manufacturing system 100 showing the location of a transverse cut 314 formed in the composite laminate 400 by the trimming device 312 and which divides the composite laminate 400 into lengthwise segments 401. Also shown in phantom lines is a lengthwise segment 401 after off-loading from the lamination belt 124. Each lengthwise segment 401 may be off-loaded using robotic devices (not shown), a conveyor system (not shown), manual off-loading, or using any one of a variety of other means. FIG. 66 is a side view of the manufacturing system 100 showing the continuous laying up of a composite laminate 400 on the lamination belt 124.

Although the lamination stations 150 of FIGS. 59-66 are comprised of lamination heads 152 that are vertically movable as a unit during the dispensing of layup material 228, any one of the manufacturing system 100 embodiments may include lamination heads 152 configured with vertically movable and/or detachable head modules 170 similar to that described above and/or shown in FIGS. 29-33. Alternatively or additionally, any one of the manufacturing system 100 configurations of FIGS. 59-66 may include the capability for rotating one or more of lamination heads 152 as described above and/or as shown in FIGS. 14, 16-21, to allow for quick replacement of a lamination head 152, a head module 170 and/or quick replacement of a material roll 224 and/or to allow for maintenance of a lamination head 152 or head module 170 without interrupting the lamination of a composite laminate 400. Advantageously, the ability to continuously lay up a composite laminate 400 on a moving series of end-to-end lamination mandrels 122 or on a lamination belt 124 maximizes throughput of the manufacturing system 100.

Figure 67:
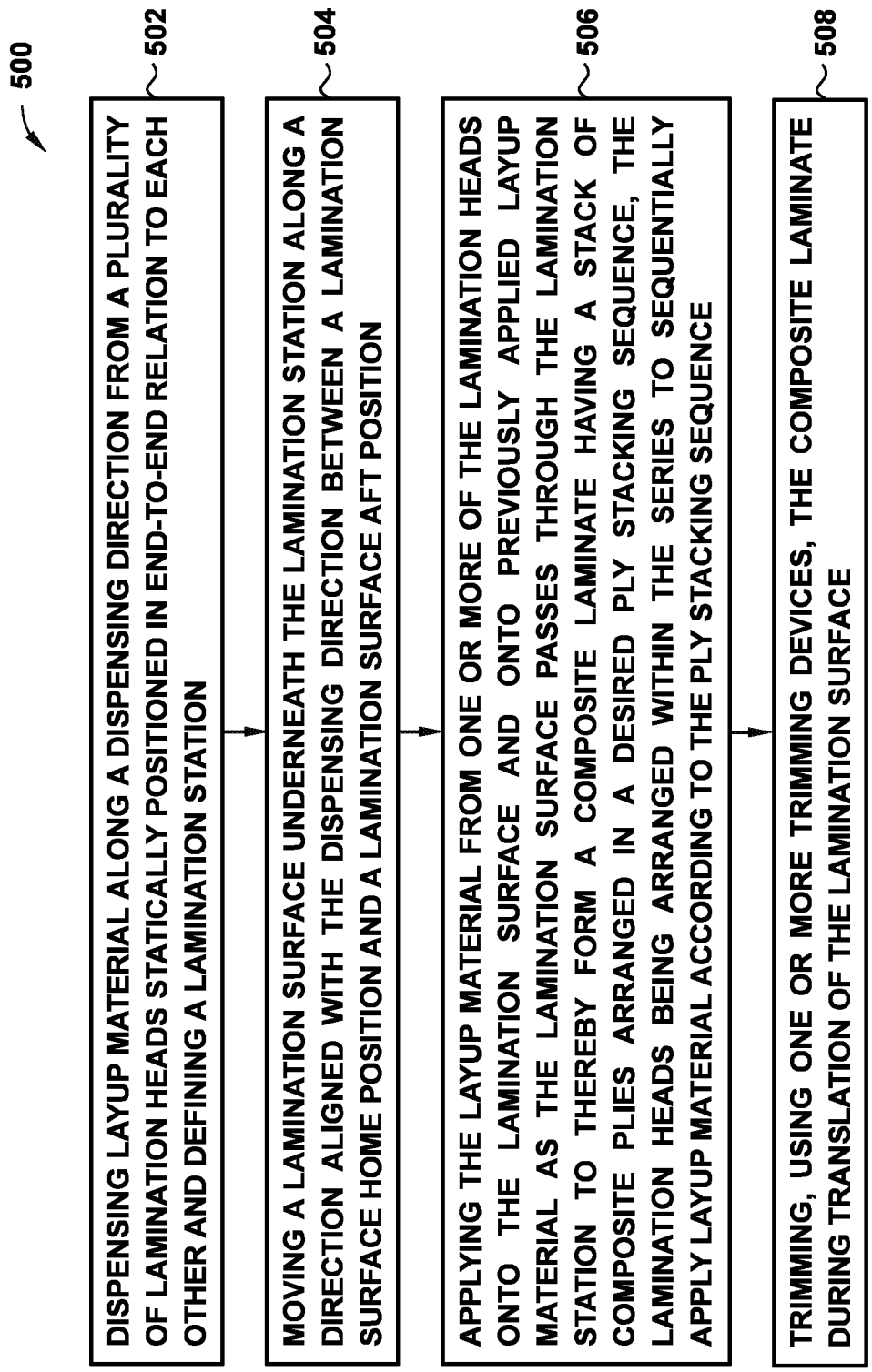
FIG. 67 is a flowchart of operations included in a method of manufacturing a composite laminate.

Referring to FIG. 67, shown is a flowchart of operations included in a method 500 of manufacturing a composite laminate 400. Step 502 includes dispensing layup material 228 along a dispensing direction 204 from a plurality of lamination heads 152 statically positioned in end-to-end relation to each other and defining a lamination station 150 (e.g., FIGS. 1-6). As described above, each lamination head 152 has head components 220 including at least one material supply drum 222 configured to support a material roll 224 of backed material 226, at least one material dispensing mechanism 260 configured to receive the backed material 226 from the material supply drum 222 and separate the backing layer 230 from the layup material 228, and at least one backing layer collection drum 300 configured to take up the backing layer 230 after separation from the layup material 228. One or more of the lamination heads 152 (e.g., FIGS. 1-7) in a lamination station 150 may be configured to dispense layup material 228 onto a lamination surface 120 moving along a single direction of travel (e.g., either the first direction of travel 128 or the second direction of travel 130). Alternatively, one or more of the lamination heads 152 in a lamination station 150 may have bi-directional layup capability for dispensing layup material 228 onto a lamination surface 120 moving along both a first direction of travel 128 and a second direction of travel 130 as described below.

Step 504 of the method 500 includes moving the lamination surface 120 underneath the lamination station 150 along a direction aligned with the dispensing direction 204 (FIG. 7) of the lamination heads 152. The lamination surface 120 is moved between a lamination surface home position 134 and a lamination surface aft position 136. As mentioned above, the lamination surface 120 may be moved along a linear direction as shown in the figures. Alternatively, in an embodiment not shown, the lamination surface 120 may be moved along a non-linear direction such as along an arc. The lamination heads 152 may be arranged complementary to the linear direction or non-linear direction of the movement of the lamination surface 120 for laying up a composite laminate 400 respectively having a linear shape (e.g., straight shape) or a non-linear shape (e.g., arc shape).

The step 504 of moving the lamination surface 120 under the lamination station 150 may include translating one or more rigid lamination mandrels 122 (e.g., FIGS. 1-4) along at least one direction (e.g., along a first direction of travel 128 and/or along a second direction of travel 130) underneath the lamination heads 152 while applying layup material 228 to an outer surface of the one or more lamination mandrels 122 and/or onto layup material 228 previously applied onto the lamination mandrels 122. As mentioned above, in an embodiment, the method may include moving a series of lamination heads 152 arranged in spaced end-to-end relation to each other or in butted end-to-end relation to each other (FIGS. 59-62) along at least one direction. For example, a series of lamination mandrels 122 may be coupled end-to-end and may be spaced apart from each other by up to several inches and a composite laminate 400 may be laid up on each one of the series of lamination mandrels 122 moving continuously through the lamination station 150.

In an alternative embodiment, the step 504 of moving the lamination surface 120 underneath the lamination station 150 may include moving a continuous loop lamination belt 124 (e.g., FIG. 5) underneath the lamination heads 152 while applying layup material 228 to an outer surface of the lamination belt 124 and/or onto layup material 228 previously applied onto the outer surface of the lamination belt 124. In some examples, the manufacturing system 100 may be configured such that the lamination surface 120 (e.g., a lamination mandrel 122) is movable from a lamination surface staging position 132 (e.g., FIGS. 41, 45, 51, 55) to a lamination surface home position 134 prior to passing through the lamination station 150 for laying up a composite laminate 400. By positioning a lamination mandrel 122 in a lamination surface staging position 132, the lamination mandrel 122 can be quickly moved to the lamination surface home position 134 for starting the layup of a new composite laminate 400 after completion of a composite laminate 400 on a lamination mandrel 122 previously occupying the lamination surface home position 134.

Translation of one or more lamination mandrels 122 along at least one direction underneath the lamination heads 152 may include the one or more lamination mandrels 122 making two passes through the lamination station 150. For example, as shown in FIGS. 41-44 and in FIGS. 45-48, the method may include translating a lamination mandrel 122 along a first direction of travel 128 from the lamination surface home position 134 through the lamination station 150 and to the lamination surface aft position 136, followed by translating the lamination mandrel 122 along a second direction of travel 130 from the lamination surface aft position 136 back through the lamination station 150 and to the lamination surface home position 134, and applying layup material 228 to the lamination surface 120 during translation of the lamination mandrel 122 along the first direction of travel 128 and/or along the second direction. FIGS. 41-44 illustrate an embodiment in which a composite laminate 400 is laid up and trimmed as a lamination mandrel 122 moves along the first direction of travel 128 from the lamination surface home position 134 to the lamination surface aft position 136, with no layup or trimming occurring as the lamination mandrel 122 moves back through the lamination station 150 along the second direction of travel 130 from the lamination surface aft position 136 to the lamination surface home position 134.

FIGS. 45-48 illustrate an embodiment in which a lamination mandrel 122 moves through the lamination station 150 along the first direction of travel 128 with no layup or trimming occurring, after which the composite laminate 400 is laid up and trimmed as the lamination mandrel 122 moves along the second direction of travel 130 from the lamination surface aft position 136 to the lamination surface home position 134. In a further embodiment not shown, a composite laminate 400 may be laid up as a lamination mandrel 122 passes through the lamination station 150 along the first direction of travel 128 and additional layup material 228 may be applied to the composite laminate 400 as the lamination mandrel 122 passes back through the lamination station 150 along the second direction of travel 130.

In still further embodiments of the method, translation of the lamination mandrel 122 along at least one direction underneath the lamination heads 152 may include one or more lamination mandrels 122 making a single pass through the lamination station 150. For example, as shown in FIGS. 51-54, the method may include translating one or more lamination mandrels 122 along the first direction of travel 128 from the lamination surface home position 134 through the lamination station 150 and to the lamination surface aft position 136 and applying layup material 228 to the lamination surface 120 during translation through lamination station 150, followed by translating the one or more lamination mandrels 122 from the lamination surface aft position 136 to the lamination surface home position 134 while bypassing the lamination station 150. In FIGS. 51-54, trimming of the composite laminate 400 may be performed as the one or more lamination mandrels 122 exit the lamination station 150 while moving along the first direction of travel 128 toward the lamination surface aft position 136.

FIG. 55-58 illustrate an embodiment in which the lamination mandrel 122 is moved from the lamination surface home position 134 to the lamination surface aft position 136 while bypassing the lamination station 150, followed by translating the lamination mandrel 122 along the second direction of travel 130 from the lamination surface aft position 136 through the lamination station 150 and to the lamination surface home position 134 and applying layup material 228 to the lamination surface 120 during translation through lamination station 150. In FIGS. 55-58, trimming of the composite laminate 400 may be performed as the lamination mandrel 122 exits the lamination station 150 while moving along the second direction of travel 130 toward the lamination surface home position 134. In any one of the presently-disclosed manufacturing system 100 embodiments having trimming stations 310 located at each of opposing ends of the lamination station 150, the trimming devices 312 may be configured to trim the composite laminate 400 as the composite laminate 400 exits the lamination station 150 while moving in a first direction of travel 128, and then trim the composite laminate 400 a second time after the composite laminate 400 reverses direction and passes through and exits the lamination station 150 moving in a second direction of travel 130.

Step 506 of the method 500 includes sequentially applying the layup material 228 from any one or more of the lamination heads 152 onto the lamination surface 120 and onto previously applied layup material 228 as the lamination surface 120 passes through the lamination station 150 to thereby form a composite laminate 400 having a stack of plies 402 arranged in a desired ply stacking sequence 410. As described above with regard to FIGS. 8-9, the lamination heads 152 are arranged to sequentially apply layup material 228 according to the ply stacking sequence 410. In this regard, each one of the lamination heads 152 in the series is assigned and loaded with a layup material 228 having a material configuration 406 (FIG. 8) that corresponds to the ply stacking sequence 410 of the composite laminate 400 to be manufactured. As shown in FIGS. 8-9, the ply stacking sequence 410 of a composite laminate 400 is defined by the relative positions of the lamination heads 152 within the lamination station 150. However, a composite laminate 400 may be formed in which one or more of the lamination heads 152 is deactivated (i.e., not dispensing layup material 228) along at least a portion of the length of total length of the composite laminate 400.

In this regard, step 506 of sequentially applying the layup material 228 from one or more of the lamination heads 152 may include independently starting, independently stopping and/or independently restarting the application of layup material 228 by any one of the lamination heads 152 while continuing the application of layup material 228 by one or more of the other lamination heads 152 within the lamination station 150. For example, FIG. 11 illustrates the Head Number 2 (FIG. 8) momentarily stopping and then restarting the application of layup material 228 while the remaining lamination heads 152 continuously apply layup material 228, and which results in a gap 404 in Ply 2 (e.g., a partial ply) of the composite laminate 400, and resulting in the laminate thickness varying or being non-constant along the length of the composite laminate 400. In a further embodiment not shown, any one of more of the lamination heads 152 may be intentionally delayed from starting to dispense layup material 228 after the remaining lamination heads 152 have started to dispense layup material 228. For example, a composite laminate 400 may be laid up in which Head Number 1 is initially and temporarily delayed in starting to dispense layup material 228 onto a lamination surface 120, while the remaining lamination heads 152 (e.g., Head Numbers 2-10) start dispensing layup material 228 at a common location on the lamination surface 120 moving through the lamination station 150. In a still further embodiment not shown, a composite laminate 400 may be laid up in which one or more of the lamination heads 152 are deactivated and are not dispensing layup material 228 during the entire time of the laying up of a composite laminate 400, and resulting in a composite laminate 400 having a reduced quantity of plies 402 similar to the composite laminate 400 of FIG. 13 which contains a total of five (5) plies 402.

Referring briefly to FIGS. 12-13, step 506 of sequentially applying the layup material 228 from one or more of the lamination heads 152 may include applying, from at least one of the lamination heads 152, layup material 228 having different material widths 408 than the material width dispensed by at least one of the other lamination heads 152 in the lamination station 150. As mentioned above, one or more of the lamination heads 152 may be loaded with a material roll 224 containing layup material 228 that has a different material width than the layup material 228 loaded onto other lamination heads 152. For example, the layup material 228 loaded onto one or more lamination heads 152 may be pre-slit prepreg tape having a reduced material width 408 relative to the material width 408 on other lamination heads 152. In the example of FIGS. 12-13, the series of lamination heads 152 are loaded with layup material 228 having material widths 408 arranged such that the lamination heads 152 lay up an uncured composite laminate 400 having beveled side edges 414 on the side edges 414 of the composite laminate 400. The lamination heads 152 within the lamination station 150 may be aligned with one another such that the centerlines (not shown) of the layup material 228 dispensed by the lamination heads 152 are coincident, resulting in the composite laminate 400 having a transverse cross-section that is symmetrical about a vertical axis (not shown). However, one or more of the lamination heads 152 may be laterally offset from other lamination heads 152 such that the centerline of the layup material 228 dispensed by the lamination head 152 is laterally offset from the centerline of the layup material 228 dispensed by the other lamination heads 152, and resulting in the composite laminate 400 having a transverse cross-section that is asymmetric.

In some examples, the material widths 408 of the layup material 228 loaded onto the lamination heads 152 may be selected such that when the completed composite laminate 400 is viewed in transverse cross section, the side edges 414 are formed at a desired bevel angle 416. For example, in FIG. 12, the material widths 408 of the composite laminate 400 containing ten (10) plies 402 are such that the side edges 414 of the composite laminate 400 are each formed at a bevel angle 416 of approximately 20 degrees. FIG. 13 shows an example of a composite laminate 400 containing only five (5) plies 402 and resulting in a bevel angle 416 of approximately 10 degrees on each one of the side edges 414. In an embodiment not shown, the material widths 408 of layup material 228 loaded onto the lamination heads 152 may be selected such that the side edges 414 have a non-linear shape when the composite laminate 400 is viewed in transverse cross-section.

Step 508 of the method 500 includes trimming, using one or more trimming devices 312, the composite laminate 400. As mentioned above, the manufacturing system 100 may include one or more trimming devices 312 defining at least one trimming station 310. For example, FIGS. 1-2 illustrate a manufacturing system 100 having a trimming station 310 located at each of opposing ends of the lamination station 150. The trimming of a composite laminate 400 may include trimming at least one side edge 414 of the composite laminate 400. Trimming may be performed during movement of the lamination surface 120 from the lamination station 150 to the lamination surface aft position 136 as shown in FIG. 42, and/or trimming may occur during movement of the lamination surface 120 from the lamination station 150 to the lamination surface home position 134 as shown in FIG. 47. The step 508 of trimming the composite laminate 400 may include trimming the composite laminate 400 using one or more ultrasonic knives, laser devices, mechanical cutter blades, or any one a variety of other cutting mechanisms. The trimming devices 312 may be configured to cut at least one side edge 414 of the composite laminate 400 as a bevel cut oriented non-perpendicular to the lamination surface 120 or as a perpendicular cut oriented perpendicular to the lamination surface 120. However, as mentioned above, the trimming devices 312 may be operated in a manner to form any one of a variety of geometric features in the composite laminate 400, and are not limited to forming bevel cuts or perpendicular cuts on the side edge 414 of a composite laminate 400.

After completing the laying up and trimming of a composite laminate 400, the method may include moving a lamination mandrel 122 from the lamination surface home position 134 to the lamination surface off-loading position 138 as shown in FIGS. 44 and 48. Moving the lamination mandrel 122 to the lamination surface off-loading position 138 may allow another lamination mandrel 122 to be moved into the lamination surface home position 134 to allow another composite laminate 400 to be laid up and trimmed while a just-completed composite laminate 400 is further processed or off-loaded in the lamination surface off-loading position 138. Referring briefly to FIG. 49, in some examples, the method may include laterally moving at least two (2) lamination mandrels 122 in an in-plane direction between the lamination surface staging position 132, the lamination surface home position 134, and the lamination surface off-loading position 138.

In an alternative embodiment, FIG. 50 illustrates out-of-plane movement of two (2) lamination mandrels 122 between the lamination surface home position 134 and the lamination surface off-loading position 138. Advantageously, the use of at least two (2) lamination mandrels 122 allows for at least one lamination mandrel 122 to be passed through the lamination station 150 for laying up a composite laminate 400 while the remaining lamination mandrel 122 is being processed in the lamination surface off-loading position 138. As mentioned above, processing of a lamination mandrel 122 in the lamination surface off-loading position 138 may include removing a just-completed composite laminate 400 from the lamination mandrel 122 and/or pre-kitting a composite laminate 400 with materials and/or components that may be required for further processing (e.g., secondary trimming, debulking, forming, and/or curing) of the composite laminate 400 at a another location (not shown).

Referring to FIGS. 16-28, the method may include moving (e.g., autonomously) one or more of the lamination heads 152 into a material reload position 208 to allow for servicing of the lamination head 152 such as replacing a depleted material roll 224, performing maintenance on the head components 220, or for other purposes. A lamination head 152 may be moved into a material reload position 208 for material replenishment or maintenance at any point in time prior to, during, or after the laying up of a composite laminate 400. For example, as described below, one or more of the lamination heads 152 in the lamination station 150 may be moved into the material reload position 208 to allow for servicing of the head components 220 on one side of the lamination head 152 while the opposite side of the lamination head 152 in the material application position 206 dispenses layup material 228 along with the remaining lamination heads 152 in the lamination station 150. As mentioned above, in some examples, one or more of the lamination heads 152 (e.g., FIG. 6) within the lamination station 150 may have laterally opposing sides including a first side 158 and a second side 160. The first side 158 may have a first lamination assembly 200 of head components 220, and the second side 160 may have a second lamination assembly 202 of head components 220. As described above, the head components 220 on the first side 158 and the head components 220 on the second side 160 may be mounted to a mounting frame 154.

Referring to FIGS. 16-19, the method may include moving the second side 160 into a material application position 206 that is aligned with the dispensing direction 204 of the remaining lamination heads 152 within lamination station 150. In the material application position 206, the second side 160 may dispense layup material 228 onto a lamination surface 120 or onto previously applied layup material 228. Moving the second side 160 into the material application position 206 may result in moving the first side 158 into a material reload position 208 to allow for replacing the material roll 224 on the material supply drum 222 on the first side 158 and/or for performing maintenance on the first side 158. As an alternative to moving the second side 160 of the lamination head 152 into the material application position 206, the method may include moving the first side 158 of a lamination head 152 into the material application position 206 aligned with the dispensing direction 204 of the remaining lamination heads 152 within the lamination station 150, and moving the second side 160 into the material reload position 208 such as for replacing the material roll 224 on the second side 160 and/or for performing maintenance on the second side 160.

Referring still to FIG. 16-19, the step of moving the first side 158 or second side 160 into the material application position 206 while moving the remaining one of the first side 158 or second side 160 into the material reload position 208 may include independently rotating the lamination head 152 by an amount of 180 degrees about a vertical axis 174 to position either the first side 158 or the second side 160 in the material application position 206 while positioning the remaining one of the first side 158 or second side 160 in the material reload position 208. For example, FIG. 17 illustrates rotation of a lamination head 152 about a vertical axis 174 (FIG. 14). For lamination heads 152 that are spaced in relatively close proximity to each other, it may be necessary to laterally translate the lamination head 152 out of alignment from the remaining lamination heads 152 in the lamination station 150 to provide clearance for rotating the lamination head 152. In this regard, the lamination head 152 may be horizontally translated and/or vertically translated out of alignment with the remaining lamination heads 152 provide space for rotating the lamination head 152. However, in other examples, the lamination heads 152 within lamination station 150 may be spaced apart from each other by a distance that allows each lamination head 152 to rotate 180 degrees about a vertical axis 174 without contacting adjacent lamination heads 152 and without horizontally translating or vertically translating the lamination head 152 out of alignment from the remaining lamination heads 152.

FIG. 16 shows one of the lamination heads 152 being laterally translated out of alignment from the remaining lamination heads 152 prior to rotating the lamination head 152 by an amount of 180 degrees as shown in FIG. 17. In an embodiment, a lamination head 152 may be laterally translated along the crossbeam 108 supporting the lamination head 152 as shown in FIG. 14. After being rotated, FIG. 18 illustrates the lamination head 152 being laterally translated back into alignment with the remaining lamination heads 152 in the lamination station 150. As an alternative to lateral translation of a lamination head 152 to provide clearance for rotating the lamination head 152, FIGS. 20-21 illustrate an embodiment in which a lamination head 152 is vertically raised out of alignment from the remaining lamination heads 152 to allow clearance for rotating the lamination head 152, after which the lamination head 152 may be vertically lowered back into alignment with the remaining lamination heads 152. In the example shown, the crossbeam 108 may be vertically translated along the pair of posts 106 supporting the crossbeam 108.

Referring to FIGS. 22-28, in a still further embodiment, the step of moving the first side 158 or second side 160 of the lamination head 152 into the material application position 206 while moving the remaining one of the first side 158 or second side 160 into the material reload position 208 may include rotating the lamination head 152 by an amount of 180 degrees about a horizontal shaft 176 oriented parallel to a series of lamination heads 152. As described above, the lamination head 152 may be mounted in series to the horizontal shaft 176 which may be supported at opposing ends by a pair of shaft supports 178. The manufacturing system 100 may include one or more motors (not shown) controlled by the controller 110 for independently rotating any one or more of the lamination heads 152 in order to position the first side 158 or the second side 160 in the material reload position 208 for replacing a material roll 224 or for performing maintenance on the head components 220. In any of the embodiments disclosed herein, rotating a lamination head 152 to position the first side 158 or second side 160 in the material reload position 208 may provide improved physical access to the head components 220 of the side in the material reload position 208.

Referring to FIGS. 29-33, some examples of the method may include replacing a head module 170 on a first side 158 and/or a second side 160 of the lamination head 152. In the example of FIG. 29, the lamination head 152 includes a mounting frame 154 having a head module 170 removably coupled to the first side 158 and a head module 170 removably coupled to the second side 160. As described above, each head module 170 includes a frame coupling element 172 (e.g., a plate or frame) to which the head components 220 may be mounted. In such an arrangement, the method may further include replenishing the material roll 224 or removing and replacing the head module 170 on one of the first side 158 or second side 160 of the mounting frame 154 while dispensing layup material 228 from the head module 170 on the remaining one of the first side 158 or second side 160 of the mounting frame 154. For example, as mentioned above and shown in FIGS. 30-33, a lamination head 152 may be rotated 180 degrees about the vertical axis 174 (FIG. 7) as a means to position either the first side 158 or the second side 160 in the material application position 206 while positioning the remaining one of the first side 158 or second side 160 in the material reload position 208.

FIG. 30 shows a lamination head 152 being translated horizontally out of alignment from the remaining lamination heads 152 in the lamination station 150. FIG. 31 shows rotation of the lamination head 152 by 180 degrees about a vertical axis 174. FIG. 32 shows removal of the head module 170 from the mounting frame 154 of the lamination head 152, and installation of a replacement head module 170 on the mounting frame 154 prior to horizontally translating the lamination head 152 back into alignment with the remaining lamination heads 152 as shown in FIG. 33. The head module 170 in the material reload position 208 faces away from the series of series of lamination heads 152 which may allow physical access for removal of the head module 170 as may be required in the event of a depleted material roll 224, to perform maintenance on the head components 220, or to replace the current head module 170 with a head module 170 configured to dispense a different type of layup material 228. The replacement of a head module 170 may be performed manually or the replacement of a head module 170 may be performed autonomously such as by a reloading system 450 as described below and illustrated in FIG. 40.

Referring to FIG. 29, in some examples, the head module 170 on one or both sides of the mounting frame 154 may be vertically movable. For example, the head module 170 on each of the first side 158 and second side 160 of the mounting frame 154 of the lamination head 152 are each vertically movably coupled to the mounting frame 154. In the example shown, the frame coupling element 172 of each head module 170 has vertical members 180 configured to be vertically slidable within vertical grooves 182 included on each of opposing sides of the mounting frame 154. In such an arrangement, the method may include allowing the head module 170 on the first side 158 and/or the second side 160 to vertically move in correspondence with starting and stopping of the dispensing of layup material 228, and preventing vertical movement of the head module 170 on the remaining one of the first side 158 of the second side 160 to allow for servicing of the head module 170. In the example of FIG. 29, the head module 170 on the second side 160 is shown in an up position 184 while the head module 170 on the first side 158 is vertically movable in correspondence with the starting and stopping of layup material 228 from the head module 170 on the first side 158.

As mentioned above, the head module 170 in the material reload position 208 may be locked in the up position 184 to prevent movement of any of the head components 220 and thereby allow a technician to service the head module 170. In this regard, the head module 170 in the material reload position 208 may be deactivated or non-powered while the head module 170 in the material application position 206 is activated and/or capable of dispensing layup material 228. As mentioned above, the lamination head 152 may be configured to autonomously electrically disconnect (e.g., power and/or control signals to) the head module 170 on the side being rotated into the material reload position 208, and autonomously electrically connect the head module 170 on the side being rotated into the material application position 206. As mentioned above, the technical effect of servicing a head module 170 in the material reload position 208 while allowing the head module 170 in the material application position 206 to continue dispensing layup material 228 is avoiding downtime of the lamination head 152 that would otherwise occur if the lamination head 152 were taken out of service. In this regard, the above-described arrangement illustrated in FIG. 29 minimizes downtime of the manufacturing system 100 and thereby maximizes throughput. In addition, the removability of the head modules 170 provides flexibility with regard to rapid replenishment or replacement of material rolls 224 and/or rapid substitution of head modules 170 having different configurations of head components 220 for dispensing different types of layup material 228.

Referring to FIGS. 34-39, in some examples, the method may include removing and replacing one of the lamination heads 152 from the lamination station 150 using a head transfer mechanism 452 of a reloading system 450. As described above, the reloading system 450 may include a head transfer mechanism 452 that is movable along a lengthwise direction of the manufacturing system 100. In addition, the reloading system 450 may include one or more head holders 463 configured to hold a lamination head 152 as shown in FIGS. 34-35. For example, the reloading system 450 may include a reloading station 460 having a head holder 463 for holding a replacement lamination head 466 (FIG. 36). In addition, the reloading system 450 may include a holding station 462 having a head holder 463 for holding a removed lamination head 468.

As shown in FIG. 38, the method may include using the head transfer mechanism 452 to remove one of the lamination heads 152 from the series of lamination heads 152. For example, FIGS. 37-39 illustrate a head engagement beam 454 extending laterally outwardly and engaging a head coupling element 156 of a lamination head 152 for vertically lifting the lamination head 152 out from alignment with the remaining lamination heads 152 as shown in FIG. 39. As shown in FIG. 34, the method may include transporting the removed lamination head 468 to the head holder 463 at the holding station 462, retrieving the replacement lamination head 466 from the head holder 463 at the reloading station 460, transporting the replacement lamination head 466 to the location formerly occupied by the removed lamination head 468, and installing the replacement lamination head 466 in place of the removed lamination head 468. The head transfer mechanism 452 may then transport the removed lamination head 468 from the holding station 462 to the reloading station 460 where the removed lamination head 468 may be serviced which may include replacing the material roll 224 on the material supply drum 222, performing maintenance on the head components 220, or other operations.

Referring to FIG. 40, in an embodiment described above, the lamination station 150 may include a plurality of head modules 170 coupled by a frame coupling element 172 (e.g., a plate) to a common mounting frame 154. Each one of the head modules 170 may include a frame coupling element 172 to which the head components 220 are mounted. The frame coupling element 172 of each head module 170 may be removably coupled to the mounting frame 154. The method may include removing and/or replacing one or more of the head modules 170 using a reloading system 450 similar to that which is described above with regard to FIGS. 34-39. For example, the head transfer mechanism 452 of the head module 170 reloading system 450 may be configured to engage and vertically lift the frame coupling element 172 of one of the head modules 170 out of alignment from the remaining head modules 170, transport the removed head module 170 to the holding station 462, retrieve a replacement head module 170 from the reloading station 460, transport the replacement head module 170 to the position formerly occupied by the removed head module 170, and vertically lower the replacement head module 170 into alignment with the remaining head modules 170 of the lamination station 150. The head transfer mechanism 452 may transport the removed head module 170 from the holding station 462 to the reloading station 460 for servicing. Advantageously, the ability to autonomously remove and replace a lamination head 152 or a head module 170 allows for continued layup of composite laminates 400 while the removed lamination head 468 or removed head module 170 is serviced.

Referring to FIGS. 59-66, in some examples, step 506 of applying the layup material 228 from one or more of the lamination heads 152 may include continuously applying layup material 228 from the lamination heads 152 onto a lamination surface 120. For example, in FIGS. 59-62, the method may include continuously applying layup material 228 onto the series of end-to-end lamination mandrels 122 to form a continuous composite laminate 400, as described above. In FIGS. 63-66, the method may include continuously applying layup material 228 onto a lamination belt 124 continuously moving underneath the lamination station 150. In such examples, step 508 of trimming the composite laminate 400 may include forming, using the one or more trimming devices 312, at least one transverse cut 314 in the composite laminate 400 to divide the composite laminate 400 into end-to-end lengthwise segments 401. As described above, the movement of the lamination surface 120 (e.g., a series of lamination mandrels 122, a lamination belt 124) may either be temporarily halted to allow the trimming devices 312 to cut the composite laminate, or the trimming devices 312 may be configured to cut the composite laminate 400 while moving. For the examples shown in FIGS. 59-66, the method may additionally include sequentially off-loading the lengthwise segments 401 from the lamination surface 120 (e.g., FIGS. 57 and 61) using an automated mechanism or device (not shown) or by manually off-loading the lengthwise segments 401. For the example of FIGS. 59-62, the method may include recirculating each lamination mandrel 122 from the lamination surface aft position 136 back to the lamination surface home position 134 whereupon each lamination mandrel 122 may be mounted behind the last lamination mandrel 122 in the series prior to entering the lamination station 150.

Figure 68:
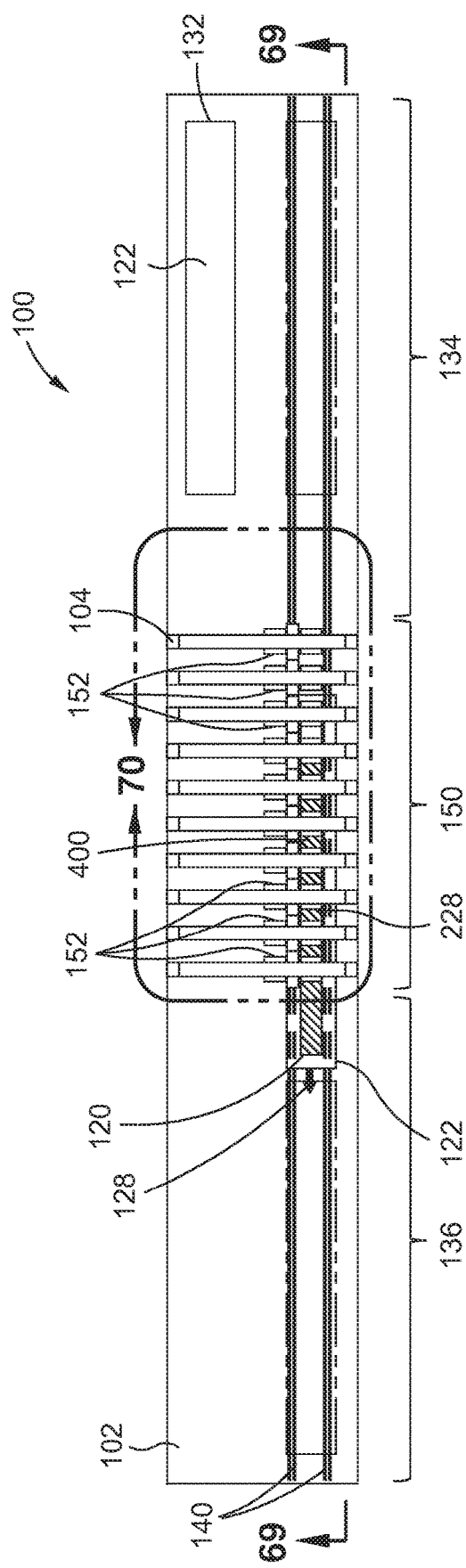
FIG. 68 is a top view of an example of a manufacturing system having a stationary lamination station comprising a plurality of lamination heads statically positioned in end-to-end relation to each other.
Figure 69:
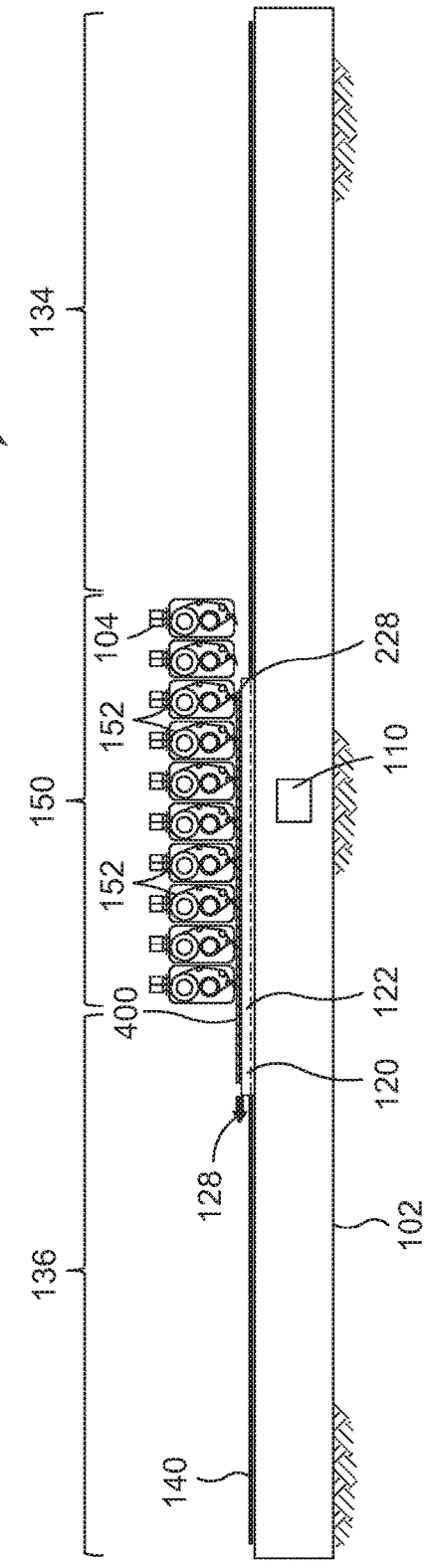
FIG. 69 is a side view of the manufacturing system of FIG. 68.

Referring now to FIGS. 68-71, shown in FIG. 68 is a top view of an example of a manufacturing system 100 for manufacturing an uncured composite laminate 400. FIG. 69 is a side view of the manufacturing system 100 of FIG. 68. FIG. 70 is a magnified view of the lamination station 150 showing a lamination surface 120 configured as a lamination mandrel 122 movable underneath the lamination station 150 and receiving layup material 228 applied by the series of lamination heads 152. FIG. 71 is a side view of the portion of the manufacturing system 100 of FIG. 70.

The manufacturing system 100 of FIGS. 68-71 is similar to the above-described manufacturing system 100 shown in FIGS. 1-4, with the exception of the trimming station 310 and the trimming devices 312 which are omitted from the manufacturing system 100 of FIGS. 68-71. The manufacturing system 100 of FIGS. 68-71 may include any one or more of the above-described components and/or may have any one or more of the above-described capabilities of the manufacturing system 100 of FIGS. 1-4, with the exception of the trimming station 310 and trimming capability as mentioned above. For example, the manufacturing system 100 of FIGS. 68-71 includes a plurality of lamination heads 152 statically positioned in end-to-end-to-end relation to each other to define the lamination station 150. As mentioned above, each lamination head 152 is configured to dispense layup material 228 along a dispensing direction 204. The lamination heads 152 are configured to sequentially apply the layup material 228 onto one or more lamination surfaces 120 and onto previously applied layup material 228 during at least one pass of the one or more lamination surfaces 120 through the lamination station 150. Although shown in a linear arrangement for forming a composite laminate 400 having a linear shape, the lamination heads 152 may be arranged non-linearly such as for forming a composite laminate (not shown) having a non-linear shape such as an arc shape. Even further, the lamination heads 152 may be arranged in an array (not shown) of two or more rows of lamination heads, wherein the rows are in side-by-side relation to each other.

As described above, the lamination heads 152 are arranged in end-to-end relation to each other to form at least one series of lamination heads 152 which collectively dispense multiple plies 402 (e.g., FIGS. 11-12) of layup material 228 as the lamination surface 120 passes underneath the lamination heads 152 for bulk lamination of a composite laminate 400 according to a desired ply stacking sequence 410 (e.g., FIG. 9). In this regard, each one of the lamination heads 152 in the series may be assigned a layup material 228 having a material configuration that corresponds to the ply stacking sequence 410 of the composite laminate 400 to be laid up. The ply stacking sequence 410 is defined by the relative positions of the lamination heads 152 within the series.

Referring still to FIGS. 68-71, the manufacturing system 100 may include a base member 102 which may have a lamination surface home position 134 on one end of the lamination station 150, and a lamination surface aft position 136 on an opposite end of the lamination station 150. The base member 102 may support the lamination surface 120, which may be an outer surface of one or more movable lamination mandrels 122. As mentioned above, the lamination mandrels 122 may be manually moved, or the lamination mandrels 122 may be autonomously moved. For example, as described above, the lamination mandrel 122 may be slidable (e.g., via a linear translation mechanism—not shown) along longitudinal rails 140 that extend along the length of the base member 102. Although a single lamination mandrel 122 is shown, the manufacturing system 100 of FIG. 68-71 may include any number of lamination mandrels 122 which may be arranged in end-to-end relation to each other.

As an alternative to one or more lamination mandrels 122, the manufacturing system 100 of FIGS. 68-71 may include one or more continuous loop lamination belts 124 which may be configured similar to the above-described example shown in FIG. 5. Regardless of its configuration, the lamination surface 120 is movable along a first direction of travel 128 from the lamination surface home position 134, through the lamination station 150, and to the lamination surface aft position 136. The lamination surface 120 is also movable along a second direction of travel 130 (e.g., FIGS. 46-47) from the lamination surface aft position 136, through the lamination station 150, and to the lamination surface home position 134. As described above, the direction of movement of the lamination surface 120 may be generally aligned with the dispensing direction 204 of the lamination heads 152. As also described above, the manufacturing system 100 of FIGS. 68-71 may include a lamination surface staging position 132 and a lamination surface off-loading position 138 located adjacent to the lamination surface home position 134.

As described above and shown in FIGS. 3-6 and 14, the lamination heads 152 of the manufacturing system 100 of FIGS. 68-71 may be supported on one or more support frames 104 or other support structures. In the example of FIGS. 3-6 and 14, the support frames 104 may be configured to allow for lateral movement of the one or more lamination heads 152 out of alignment from the remaining lamination heads 152 to allow for servicing of the laterally-moved lamination heads 152, as described above. Alternatively or additionally, the support frames 104 may allow for vertical positioning of the lamination heads 152 relative to the lamination surface 120 prior to, during, and/or after the dispensing of layup material 228 by the lamination heads 152 onto the lamination surface 120. In a still further alternative, the support frames 104 may be configured to allow for rotating each lamination head 152 about a vertical axis 174 in order to rotate the first side 158 of each lamination head 152 out of a material application position 206 and into a material reload position 208 for servicing of the head components 220 (e.g., replacing a depleted material roll 224) or performing maintenance on the head components 220, and/or to rotate the second side 160 of the lamination head 152 into the material application position 206 for dispensing layup material 228 before or after servicing of the first side 158.

The lamination heads 152 of the manufacturing system 100 of FIGS. 68-71 may be configured similar to the above-described arrangement shown in FIGS. 6-7. For example, each lamination head 152 may include at least one material supply drum 222 supporting a material roll 224 of layup material 228. The layup material 228 on the material roll 224 may be backed by a backing layer 230. The lamination head 152 may also include a material dispensing mechanism 260, a backing layer collection drum 300, and one or more redirect rollers 234 for guiding the layup material 228 through the head components 220 during dispensing of the layup material 228 from the lamination head 152. As described above, the material dispensing mechanism 260 is configured to receive the backed material 226 from the material supply drum 222, separate the layup material 228 from the backing layer 230, and dispense the layup material 228 onto the lamination surface 120 or onto previously applied layup material 228. The material dispensing mechanism 260 may include a backing layer separation device 264 for separating the layup material 228 from the backing layer 230, a cutter assembly 240 for cutting the layup material 228, and one or more compaction devices 288 for compacting the layup material 228 onto the lamination surface 120 or onto previously applied layup material 228 during dispensing of the layup material 228 from the lamination head 152. The backing layer collection drum 300 is configured to take up the backing layer 230 after separation from the layup material 228.

As described above, the layup material 228 may be a continuous strip of fiber-reinforced polymer matrix material which may be provided in any one of a variety of thicknesses and widths. For example, the layup material 228 may be provided as pre-impregnated tape in widths of up to 12 inches or more. In some examples, the layup material 228 may be provided as a pre-slit net-trimmed layup material as a means to reduce or eliminate the need for trimming the composite laminate 400 after layup. The pre-slit layup material may be unidirectional layup material (e.g., 0-degree unidirectional tape) or multi-directional layup material (e.g., bi-directional woven composite material). In still further examples of the manufacturing system 100, one or more of the lamination heads 152 may be configured to support two (2) material rolls (not shown). However, the material supply drum 222 may also be configured to support a material roll 224 of non-composite material such as metallic foil or a processing material such as release film, tackifier film, breather layer, bleeder layer, peel ply, or any one of a variety of other types of layers, films or adhesives that may be laid up prior to, during, or after the laying up of the composite laminate 400.

In some examples of the manufacturing system 100 of FIGS. 68-71, the lamination heads 152 may be configured in a manner similar to the above-described arrangement shown in FIG. 14 in which one or more of the lamination heads 152 may have head components 220 mounted on opposite sides of the lamination head 152. For example, a lamination head 152 may include a first lamination assembly 200 mounted to a first side 158 of the lamination head 152, and a second lamination assembly 202 mounted to the second side 160 of the lamination head 152. As mentioned above, such a lamination head 152 as shown in FIG. 14 may be configured such that the first side 158 is movable into a material application position 206 for dispensing layup material 228 by the first lamination assembly 200 onto a lamination surface 120, while the second side 160 is in a material reload position 208 to allow for servicing of the second lamination assembly 202 on the second side 160 of the lamination head 152. Alternatively, the second side 160 may be movable into the material application position 206 while the first side 158 is in the material reload position 208, as described above. In the example of FIG. 14, one or more of the lamination heads 152 may be independently rotatable about a vertical axis 174 for moving the first side 158 and second side 160 between the material application position 206 and the material reload position 208.

FIGS. 16-19 as described above illustrate an example of an optional configuration for one or more of the lamination heads 152 of the manufacturing system 100 of FIGS. 68-71 to allow for lateral translation of one or more of the lamination heads 152 out of alignment with the remaining lamination heads 152 to provide clearance for rotating the lamination head 152 about a vertical axis 174 for selectively positioning the first side 158 and/or the second side 160 in the material application position 206 or material reload position 208. FIGS. 20-21 as described above illustrate an example of a further optional configuration for one or more of the lamination heads 152 of the manufacturing system 100 of FIGS. 68-71 to allow for vertical translation of one or more of the lamination heads 152 out of alignment with the series of lamination heads 152 to provide clearance for rotating a lamination head 152 without contacting the remaining lamination heads 152 in the series. FIGS. 22-28 as described above illustrate an example of a still further optional configuration for one or more of the lamination heads 152 of the manufacturing system 100 of FIGS. 68-71 to allow for independent rotation of one or more of the lamination heads 152 about a horizontal shaft 176 in a manner allowing for moving the first side 158 and the second side 160 between the material application position 206 and the material reload position 208.

FIG. 29 as described above illustrates another optional configuration of one or more of the lamination heads 152 of the manufacturing system 100 of FIGS. 68-71 in which a lamination head 152 has a head module 170 removably coupled to a first side 158, and another head module 170 removably coupled to the second side 160. Each one of the head modules 170 may be removed for servicing of the head components 220, replacement of a material roll 224, or replacement of the head module 170. As shown, each head module 170 may be vertically movable relative to a mounting frame 154 to accommodate starting and stopping of the dispensing of layup material 228 during the laying up of a composite laminate 400. In addition, the vertical movability of the head modules 170 may facilitate servicing or removal of a head module 170 on the first side 158 of the mounting frame 154, while the head module 170 on the second side 160 of the mounting frame 154 is in a material application position 206, as described above. FIGS. 30-33 as described above show an optional configuration of the lamination station 150 of the manufacturing system 100 of FIGS. 68-71 in which one or more of the lamination heads 152 is configured to be laterally translatable out of alignment from the remaining lamination heads 152 in the lamination station 150 to allow for replacement of a head module 170 of the laterally translated lamination head 152.

The lamination station 150 of the manufacturing system 100 of FIGS. 68-71 may also optionally be configured for automated replacement of a lamination head 152. For example, the above-described FIGS. 34-39 show an example of a reloading system 450 that may be incorporated into the lamination station 150 of the manufacturing system 100 of FIGS. 68-71. FIG. 40 as described above shows a further example of an optional configuration of the lamination station 150 of the manufacturing system 100 of FIGS. 68-71 to allow for automated reloading of one or more of the lamination heads 152 within the series of lamination heads 152.

Figure 72:
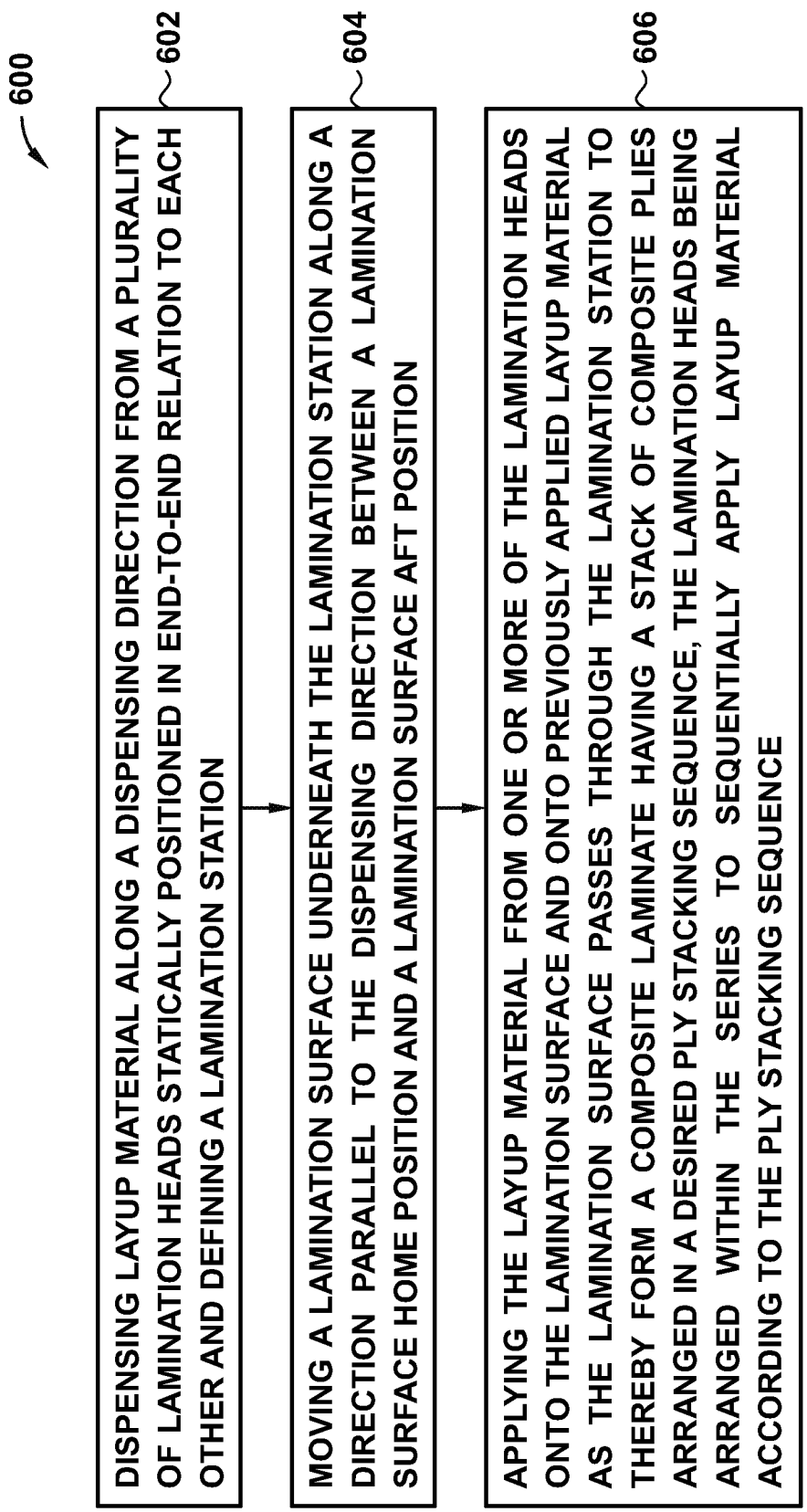
FIG. 72 is a flowchart of operations included in a method of manufacturing a composite laminate using a series of lamination heads.

FIG. 72 is a flowchart of operations included in a method 600 of manufacturing a composite laminate 400 using a series of statically-positioned lamination heads 152. The method 600 may be performed using the manufacturing system 100 shown in the above-described FIGS. 68-71 or using any of the above-described optional configurations of the lamination station 150 of FIGS. 68-71.

Step 602 of the method 600 is similar to the above-described step 502 of the method 500 of FIG. 67, and may include any one or more of the above-described operations associated with step 502. In this regard, step 602 includes dispensing layup material 228 along a dispensing direction 204 from a plurality of lamination heads 152 statically positioned in end-to-and relation to each other and which define the lamination station 150. As mentioned above, one or more of the lamination heads 152 in the lamination station 150 of FIGS. 68-71 may dispense layup material 228 onto a lamination surface 120 moving along a single direction of travel, which may be either a first direction of travel 128 or a second direction of travel 130. Alternatively, one or more of the lamination heads 152 in the lamination station 150 of FIGS. 68-71 may have bi-directional layup capability in which the lamination head 152 may be capable of dispensing layup material 228 onto a lamination surface 120 moving along a first direction of travel 128, and the capability to dispense layup material 228 onto a lamination surface 120 moving along a second direction of travel 130 opposite the first direction of travel 128.

Step 604 of the method 600 is similar to the above-described step 504 of the method 500 of FIG. 67, and may include any one or more of the above-described operations associated with step 504. In this regard, step 604 includes moving the lamination surface 120 underneath the lamination station 150 along a direction aligned with and/or parallel to the dispensing direction 204 of the lamination heads 152. The lamination surface 120 may be moved between the lamination surface home position 134 and the lamination surface aft position 136, as described above. As also mentioned above, the lamination surface 120 may be moved either along a linear direction, or the lamination surface 120 may be moved along a non-linear direction such as along an arc. The step 604 of moving the lamination surface 120 may include moving one or more rigid lamination mandrels 122 (e.g., FIGS. 68-71) while applying layup material 228 onto an outer surface of the one or more rigid lamination mandrels 122 or onto previously applied layup material 228. In an alternative example, step 604 may include moving a continuous loop lamination belt 124 underneath the lamination heads 152 while applying layup material 228 onto an outer surface of the lamination belt 124 and or onto previously applied layup material 228, similar to the above-described arrangement shown in FIG. 5.

As described above, translation of a lamination mandrel 122 underneath the lamination heads 152 may include making a single pass through the lamination station 150 while the lamination heads 152 apply layup material 228 to the lamination surface 120. In a further example, translation of a lamination mandrel 122 underneath the lamination heads 152 may involve making two passes through the lamination station 150, including translating the lamination mandrel 122 along a first direction of travel 128 through the lamination station 150, followed by translating the lamination mandrel 122 along a second direction of travel 130 back through the lamination station 150, with the lamination heads 152 applying layup material 228 during each pass through the lamination station 150.

In this regard, step 606 of the method 600 includes sequentially applying the layup material 228 from one or more lamination heads 152 onto the lamination surface 120 and onto previously applied layup material 228 as the lamination surface 120 passes through the lamination station 150 to thereby form a composite laminate 400 having a stack of plies 402 arranged in a desired ply stacking sequence 410. Step 606 may include any one or more of the above-described operations associated with step 506. As described above, each one of lamination heads 152 in the series may be assigned and loaded with a layup material 228 having a material configuration that corresponds to the ply stacking sequence 410 of the composite laminate 400 to be manufactured. As mentioned above, the ply stacking sequence 410 may be defined by the relative positions of the lamination heads 152 within the series. As also mentioned above, one or more of the lamination heads 152 may be deactivated (i.e., not dispensing layup material 228) along at least a portion of the total length of the composite laminate 400, and which may involve one or more of the lamination heads 152 independently starting, stopping and/or restarting the application of layup material 228 while the remaining lamination heads 152 continue to apply layup material 228. As described above, the result of independently starting, stopping and/restarting the application of layup material 228 is a composite laminate 400 having a laminate thickness that may vary along the length of the composite laminate 400, as shown in the example of FIG. 11.

After completing the laying up of the composite laminate 400 manufactured using the lamination system of FIGS. 68-71 or using one of the above-described alternative lamination system configurations, the method 600 may include moving the lamination mandrel 122 (and composite laminate 400) to a lamination surface off-loading position 138, similar to one of the arrangements shown in FIGS. 48-50. Another lamination mandrel 122 may then be moved into the lamination surface home position 134 in preparation for moving the lamination mandrel 122 through the lamination station 150 for laying up another composite laminate 400.

As mentioned above, the method 600 may include any one or more of the above-described operations shown in FIGS. 16-28 for moving one or more lamination heads 152 of FIGS. 68-71 into a material reload position 208 for servicing a lamination head 152 (e.g., replenishing a material roll 224), performing maintenance on head components 220, or for other purposes. Similarly, the method 600 may include any one or more of the above-described operations shown in FIGS. 29-33 and 40 for replacing a head module 170 of one or more of the lamination heads 152 of FIGS. 68-71. In addition, the method 600 may include any one or more of the above-described operations shown in FIGS. 34-39 for removing and replacing one or more of the lamination heads 152 of FIGS. 68-71 using a head transfer mechanism of a reloading system 450. In another example, any one of the above-described operations and/or movements of the lamination heads 152 may be supported by one or more robotic devices (not shown). For example, any one of the operations for moving one or more lamination heads 152 of FIGS. 68-71 into a material reload position 208 for servicing, performing maintenance on head components 220, replacing a head module 170, and/or removing and replacing a lamination head 152 may be performed using one or more robotic devices (not shown).

In any one of the manufacturing system 100 examples disclosed herein, the method may include securing the composite laminate 400 to the lamination surface 120 using vacuum pressure generated at a plurality of apertures 144 (FIG. 6) formed in the outer surface of the lamination surface 120. For example, as mentioned above, the apertures 144 may be fluidly coupled to a vacuum pressure source 146 (e.g., FIGS. 62 and 66) which, upon command of the controller 110 (FIGS. 2 and 69), may generate vacuum pressure at least prior to or during the dispensation of layup material 228 from the lamination heads 152 as the lamination surface 120 (e.g., one or more lamination mandrels 122, the outer surface of a lamination belt 124) passes through the lamination station 150. Such vacuum pressure may directly or indirectly (e.g., via a layer of peel ply) secure the composite laminate 400 in position on the lamination surface 120 at least during the layup of the composite laminate 400. For manufacturing systems 100 (e.g., FIGS. 1-4) that have trimming devices 312, such vacuum pressure may directly or indirectly (e.g., via a layer of peel ply) secure the composite laminate 400 in position on the lamination surface 120 during trimming (e.g., FIGS. 42, 47, 52 and 57) and/or during transverse cutting (e.g., FIGS. 60 and 64) of the composite laminate 400.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A manufacturing system, comprising:
   a lamination surface movable along a direction of travel generally aligned with a dispensing direction between a lamination surface home position and a lamination surface aft position;
   a plurality of lamination heads statically positioned in end-to-end relation to each other in the direction of travel of the lamination surface and defining a lamination station, each one of the plurality of lamination heads is configured to dispense a layup material along the dispensing direction; and
   wherein each one of the plurality of lamination heads is positioned to lay up the layup material on top of layup material dispensed by one or more upstream ones of the plurality of lamination heads in a single pass, the plurality of lamination heads configured to sequentially apply the layup material onto the lamination surface and onto previously applied layup material as the lamination surface passes through the lamination station to thereby form a composite laminate having a stack of composite plies arranged in a desired ply stacking sequence defined by positions of the plurality of lamination heads relative to each other within the lamination station.

2. The manufacturing system of claim 1, further comprising:
   one or more trimming devices located proximate at least one of opposing ends of the lamination station and configured to trim the composite laminate during at least one of:
   movement of the lamination surface from the lamination station to the lamination surface home position; and
   movement of the lamination surface from the lamination station to the lamination surface aft position.

3. The manufacturing system of claim 2, wherein:
   at least one of the trimming devices is configured as at least one of an ultrasonic knife, a laser device, and a mechanical cutter blade.

4. The manufacturing system of claim 1, wherein the lamination surface comprises one of:
   an outer surface of at least one continuous loop lamination belt movable underneath the plurality of lamination heads;
   an outer surface of at least one rigid lamination mandrel translatable underneath the plurality of lamination heads.

5. The manufacturing system of claim 4, further comprising:
   one or more trimming devices;
   the plurality of lamination heads are configured to continuously dispense layup material onto the outer surface of the lamination surface; and
   the one or more trimming devices are configured to periodically cut the composite laminate along a transverse direction to divide the composite laminate into end-to-end lengthwise segments.

6. The manufacturing system of claim 4, further comprising:
   a vacuum pressure source;
   the lamination surface having a plurality of apertures fluidly coupled to the vacuum pressure source; and the vacuum pressure source configured to generate vacuum pressure at the outer surface to secure the composite laminate to the outer surface at least during application of layup material onto the outer surface or onto layup material previously applied to the outer surface.

7. The manufacturing system of claim 1, wherein:
the plurality of lamination heads each include laterally opposing sides including a first side and a second side each having head components; and
the first side of at least one of the plurality of lamination heads being movable into a material application position aligned with the dispensing direction for applying layup material to the lamination surface while the second side is moved into a material reload position for servicing the second side of the at least one of the plurality of lamination heads; and
the second side being movable into the material application position aligned with the dispensing direction for applying layup material to the lamination surface while the first side is moved into the material reload position for servicing the first side.

8. The manufacturing system of claim 7, wherein:
the plurality of lamination heads are configured to independently rotate at least 180 degrees about a vertical axis to position either the first side or the second side in the material application position and position a remaining one of the first side and second side in the material reload position.

9. The manufacturing system of claim 7, wherein one or more of the plurality of lamination heads comprises:
a mounting frame having the first side and the second side;
at least one head module having a frame coupling element removably coupling the head components to one of the first side and the second side of the mounting frame; and
the head module being removable from the mounting frame at the frame coupling element to allow for replacement of the head module.

10. The manufacturing system of claim 9, wherein at least one of the plurality of lamination heads comprises:
the first side and the second side each have a head module removably coupled to the mounting frame;
each head module being vertically movable relative to the mounting frame;
the head module on the first side being lockable in an up position while the head module on the second side is vertically movable to dispense layup material; and
the head module on the second side being lockable in an up position while the head module on the first side is vertically movable to dispense layup material.

11. The manufacturing system of claim 7, further comprising:
a horizontal shaft oriented parallel to the plurality of lamination heads; and
each of the plurality of lamination heads being rotatable about the horizontal shaft by at least 180 degrees to move the first side and the second side between the material application position and the material reload position.

12. The manufacturing system of claim 1, further comprising:
a reloading system having a head transfer mechanism and a reloading station; and
the head transfer mechanism configured to remove one of the plurality of lamination heads from the lamination station, install a replacement lamination head in place of a removed lamination head, and transport the removed lamination head to the reloading station.

13. The manufacturing system of claim 1, further comprising:
a reloading system having a head transfer mechanism and a reloading station;
at least one mounting frame;
the plurality of lamination heads being configured as head modules each including a frame coupling element removably coupling head components to the mounting frame;
at least one of the head modules being removable from the mounting frame at the frame coupling element to allow for replacement of the head module; and
the head transfer mechanism configured to remove a selected one of the head modules from the lamination station, install a replacement head module in place of a removed head module, and transport the removed head module to the reloading station.

14. The manufacturing system of claim 1, wherein one or more of the plurality of lamination heads includes head components comprising:
at least one material supply drum configured to support a material roll of backed material comprising layup material backed by a backing layer;
at least one material dispensing mechanism configured to receive the backed material from the material supply drum and separate the backing layer from the layup material; and
at least one backing layer collection drum configured to take up the backing layer after separation from the layup material.

15. A manufacturing system, comprising:
a lamination belt having an outer surface movable along a direction of travel generally aligned with a dispensing direction;
a series of lamination heads statically positioned in end-to-end relation to each other in the direction of travel of the lamination belt and defining a lamination station, each one of the lamination heads within the series configured to dispense a layup material along the dispensing direction; and
wherein each one of the series of lamination head is positioned to lay up the layup material on top of layup material dispensed by one or more upstream ones of the series of lamination heads in a single pass, the series of lamination heads configured to sequentially apply the layup material onto the outer surface of the lamination belt and onto previously applied layup material as the outer surface of the lamination belt moves through the lamination station to thereby form a composite laminate having a stack of composite plies arranged in a desired ply stacking sequence defined by positions of the lamination heads relative to each other within the lamination station.

16. A method of manufacturing a composite laminate, comprising:
moving a lamination surface along a direction of travel generally aligned with a dispensing direction between a lamination surface home position and a lamination surface aft position;
dispensing layup material along the dispensing direction from one or more of a series of lamination heads statically positioned in end-to-end relation to each other in the direction of travel of the lamination surface, the series of lamination heads defining a lamination station; and applying the layup material from one or more of the series of lamination heads onto the lamination surface and on top of previously applied layup material dispensed by one or more upstream ones of the series of lamination heads in a single pass as the lamination surface passes through the lamination station to thereby form a composite laminate having a stack of composite plies arranged in a desired ply stacking sequence, the series of lamination heads being arranged relative to each other to sequentially apply layup material according to the ply stacking sequence.

17. The method of claim 16, further comprising:
independently starting, stopping or restarting the application of layup material by any one of the series of lamination heads at any location along the lamination surface while continuing application of layup material by one or more other ones of the series of lamination heads.

18. The method of claim 16, further comprising:
trimming, using one or more trimming devices, the composite laminate during at least one of:
movement of the lamination surface from the lamination station to the lamination surface home position; and
movement of the lamination surface from the lamination station to the lamination surface aft position.

19. The method of claim 18, wherein the step of applying the layup material from one or more of the series of lamination heads and the step of trimming the composite laminate respectively comprise:
continuously applying the layup material from the series of lamination heads onto the lamination surface; and
forming using the one or more trimming devices, at least one transverse cut in the composite laminate to divide the composite laminate into end-to-end lengthwise segments.

20. The method of claim 16, wherein the step of moving the lamination surface underneath the lamination station comprises:
moving at least one continuous loop lamination belt underneath the series of lamination heads while applying layup material to an outer surface of the lamination belt and onto layup material previously applied onto the lamination belt.

21. The method of claim 16, wherein the steps of moving the lamination surface underneath the lamination station and applying the layup material onto the lamination surface comprise:
translating at least one lamination mandrel along at least one direction underneath the series of lamination heads while applying layup material to an outer surface of the lamination mandrel and onto layup material previously applied onto the lamination mandrel.

22. The method of claim 21, wherein translating the lamination mandrel along at least one direction underneath the series of lamination heads comprises one of:
translating the lamination mandrel along a first direction of travel from the lamination surface home position through the lamination station and to the lamination surface aft position, followed by translating the lamination mandrel along a second direction of travel from the lamination surface aft position through the lamination station and to the lamination surface home position, and applying layup material to the lamination surface during translation along at least one of the first direction of travel and the second direction of travel;

translating the lamination mandrel along the first direction of travel from the lamination surface home position through the lamination station and to the lamination surface aft position and applying layup material to the lamination surface during translation through lamination station, followed by translating the lamination mandrel from the lamination surface aft position to the lamination surface home position while bypassing the lamination station; and translating the lamination mandrel from the lamination surface home position to the lamination surface aft position while bypassing the lamination station, followed by translating the lamination mandrel along the second direction of travel from the lamination surface aft position through the lamination station and to the lamination surface home position and applying layup material to the lamination surface during translation through lamination station.

23. The method of claim 16, wherein the series of lamination heads each include laterally opposing sides including a first side and a second side each having head components, the method further comprising one of:
moving the second side into a material application position aligned with the dispensing direction for applying layup material to the lamination surface while moving the first side into a material reload position for replacing a material roll on the first side; and
moving the first side into a material application position aligned with the dispensing direction for applying layup material to the lamination surface while moving the second side into a material reload position for replacing a material roll on the second side.

24. The method of claim 23, wherein moving the second side into the material application position while moving the first side into the material reload position and moving the first side into the material application position while moving the second side into the material reload position comprises:
independently rotating at least one of the series of lamination heads at least 180 degrees about a vertical axis to position either the first side or the second side in the material application position and positioning a remaining one of the first side and second side in the material reload position.

25. The method of claim 23, wherein moving the second side into the material application position while moving the first side into the material reload position and moving the first side into the material application position while moving the second side into the material reload position comprises:
rotating one of the series of lamination head at least 180 degrees about a horizontal shaft oriented parallel to the series of lamination heads to move the first side and the second side between the material application position and the material reload position.

26. The method of claim 24, wherein at least one of the series of lamination heads includes a mounting frame having the first side and the second side and including a head module coupled to the first side and a head module coupled to the second side, the method further comprising:
servicing the head module on one of the first side or second side while dispensing layup material from the head module on the remaining one of the first side or second side.

27. The method of claim 26, wherein the head module on each of the first side and second side is vertically movably coupled to further comprising:

allowing the head module on one of the first side or second side to vertically move in correspondence with starting and stopping of dispensing of layup material; and preventing vertical movement of the head module on the remaining one of the first side of the second side to allow for servicing of the head module.

28. The method of claim 16, further comprising:

removing one of the series of lamination heads from the lamination station using a head transfer mechanism of a reloading system;

installing a replacement lamination head in place of the one of the series of lamination heads removed from the lamination station;

transporting the removed one of the series of lamination heads to a reloading station for at least one of:

replacing a material roll on the removed one of the series of lamination heads; and performing maintenance on the removed one of the series of lamination heads.

29. The method of claim 16, further comprising:

securing the composite laminate to the lamination surface using vacuum pressure generated at a plurality of apertures formed in the lamination surface and fluidly coupled to a vacuum pressure source.

* * * * *